US010656927B2

(12) United States Patent
Hawrylo et al.

(10) Patent No.: US 10,656,927 B2
(45) Date of Patent: May 19, 2020

(54) METHODS, SYSTEMS, AND COMPUTER PROGRAM PRODUCTS FOR AUTOMATING RELEASES AND DEPLOYMENT OF A SOFTAWRE APPLICATION ALONG THE PIPELINE IN CONTINUOUS RELEASE AND DEPLOYMENT OF SOFTWARE APPLICATION DELIVERY MODELS

(71) Applicant: INTUIT INC., Mountain View, CA (US)

(72) Inventors: Kathryn Hawrylo, San Diego, CA (US); Michele Gorostiza, San Diego, CA (US); Chetan Desai, Poway, CA (US)

(73) Assignee: INTUIT INC., Mountain View, CA (US)

( * ) Notice: Subject to any disclaimer, the term of this patent is extended or adjusted under 35 U.S.C. 154(b) by 36 days.

(21) Appl. No.: 15/796,424

(22) Filed: Oct. 27, 2017

(65) Prior Publication Data
US 2019/0129701 A1  May 2, 2019

(51) Int. Cl.
*G06F 8/61* (2018.01)
*G06F 9/445* (2018.01)
(Continued)

(52) U.S. Cl.
CPC .................. *G06F 8/61* (2013.01); *G06F 8/65* (2013.01); *G06F 8/71* (2013.01); *G06F 9/44505* (2013.01)

(58) Field of Classification Search
CPC .......... G06F 8/61; G06F 8/65; G06F 9/44505; G06F 8/71
(Continued)

(56) References Cited

U.S. PATENT DOCUMENTS 5,495,610 A   2/1996  Shing
5,878,258 A *  3/1999  Pizi .......................... G06F 9/451
                                                          719/320
(Continued)

FOREIGN PATENT DOCUMENTS

WO    WO 98/57260    12/1998

OTHER PUBLICATIONS

Radhakrishnan et al., "IT service management for high availability", 2008, IBM Systems Journal, vol. 47, No. 4 (Year: 2008).*
(Continued)

*Primary Examiner* — Wei Y Zhen
*Assistant Examiner* — Junchun Wu
(74) *Attorney, Agent, or Firm* — DLA Piper LLP (US)

(57) ABSTRACT

Various aspects described herein are directed to a method or system that automates the release and deployment of a software application delivery model for the continuous release and deployment of the software application delivery model. These techniques identify a release and pertinent information thereof for a software application delivery model and determine dependencies among at least some of the pertinent information. Tracking records may be generated at least by tracking the release based in part or in whole upon the dependencies. The release or a portion of the release may be advanced from a current stage to a next stage along a release pipeline based in part or in whole upon the tracking records.

30 Claims, 53 Drawing Sheets

(51) Int. Cl.
*G06F 8/71* (2018.01)
*G06F 8/65* (2018.01)

(58) Field of Classification Search
USPC .......................................................... 717/177
See application file for complete search history.

(56) References Cited

U.S. PATENT DOCUMENTS

| | | | |
|---|---|---|---|
| 6,256,773 B1* | 7/2001 | Bowman-Amuah | G06F 8/71 717/168 |
| 7,290,262 B2 | 10/2007 | Blizniak | |
| 7,334,005 B2 | 2/2008 | Sobel | |
| 7,555,551 B1 | 6/2009 | McCorkendale et al. | |
| 8,555,257 B2 | 10/2013 | Balasubramanian et al. | |
| 8,572,547 B1 | 10/2013 | Urh | |
| 8,635,204 B1* | 1/2014 | Xie | G06F 8/74 707/709 |
| 8,677,315 B1* | 3/2014 | Anderson | G06F 8/60 717/174 |
| 8,707,292 B2 | 4/2014 | Little et al. | |
| 8,739,113 B2 | 5/2014 | Packbier et al. | |
| 8,782,632 B1* | 7/2014 | Chigurapati | G06F 8/65 717/172 |
| 9,092,291 B1 | 7/2015 | Adib | |
| 9,128,805 B2 | 9/2015 | Michaely et al. | |
| 9,223,562 B1 | 12/2015 | Sobel | |
| 9,269,376 B1 | 2/2016 | Hess | |
| 9,274,935 B1 | 3/2016 | Lachwani | |
| 9,367,305 B1 | 6/2016 | Kumar | |
| 9,442,709 B1 | 9/2016 | Delker | |
| 9,454,351 B2 | 9/2016 | Anderson | |
| 9,569,204 B2 | 2/2017 | Mansour et al. | |
| 9,606,901 B1 | 3/2017 | Elgarat | |
| 9,665,656 B2 | 5/2017 | Lui | |
| 9,787,779 B2* | 10/2017 | Frank | G06F 8/65 |
| 9,880,837 B2* | 1/2018 | Khazanchi | G06F 8/71 |
| 9,910,654 B1* | 3/2018 | Brigham, II | G06F 8/61 |
| 10,067,754 B2 | 9/2018 | Little et al. | |
| 10,157,044 B2* | 12/2018 | Khazanchi | G06F 8/20 |
| 10,296,327 B2* | 5/2019 | Govindaraju | G06F 8/71 |
| 2002/0188941 A1 | 12/2002 | Cicciarelli | |
| 2003/0037328 A1* | 2/2003 | Cicciarelli | G06F 8/60 717/178 |
| 2003/0084165 A1 | 5/2003 | Kjellberg | |
| 2003/0182652 A1* | 9/2003 | Custodio | G06F 8/61 717/170 |
| 2005/0262501 A1 | 11/2005 | Marinelli | |
| 2006/0048145 A1 | 3/2006 | Celli | |
| 2006/0248116 A1 | 11/2006 | Sobel | |
| 2007/0061782 A1 | 3/2007 | Schreiner | |
| 2007/0250574 A1 | 10/2007 | Tseitlin | |
| 2007/0260629 A1 | 11/2007 | Tseitlin | |
| 2008/0065750 A1 | 3/2008 | O'Connell | |
| 2008/0127166 A1 | 5/2008 | Cockburn | |
| 2008/0189679 A1 | 8/2008 | Rodriguez | |
| 2009/0031004 A1 | 1/2009 | Yagoda | |
| 2009/0172655 A1* | 7/2009 | Ivanov | G06F 8/65 717/173 |
| 2009/0288078 A1 | 11/2009 | Makonahalli | |
| 2009/0300580 A1 | 12/2009 | Heyhoe | |
| 2010/0153920 A1 | 6/2010 | Bonnet | |
| 2011/0004702 A1 | 1/2011 | Tsofi | |
| 2011/0093513 A1 | 4/2011 | Joshi | |
| 2011/0219146 A1 | 9/2011 | Jacobson | |
| 2012/0159434 A1 | 6/2012 | Dang | |
| 2012/0266156 A1* | 10/2012 | Spivak | G06F 9/5055 717/172 |
| 2012/0272205 A1 | 10/2012 | Fox | |
| 2012/0284693 A1* | 11/2012 | Tannous | G06F 8/71 717/121 |
| 2013/0031542 A1 | 1/2013 | Arcilla | |
| 2013/0036402 A1 | 2/2013 | Mutisya | |
| 2013/0042227 A1 | 2/2013 | Little et al. | |
| 2014/0042230 A1 | 2/2014 | Pueschner et al. | |
| 2014/0089896 A1 | 3/2014 | Mansour et al. | |
| 2014/0189641 A1 | 7/2014 | Anderson et al. | |
| 2014/0282353 A1* | 9/2014 | Jubran | G06F 8/00 717/101 |
| 2014/0282400 A1 | 9/2014 | Moorth et al. | |
| 2015/0052501 A1 | 2/2015 | Shani et al. | |
| 2015/0199188 A1 | 7/2015 | Mantripragada | |
| 2015/0220426 A1 | 8/2015 | Spektor | |
| 2015/0235154 A1 | 8/2015 | Utschig | |
| 2016/0034380 A1 | 2/2016 | Shani | |
| 2016/0132324 A1* | 5/2016 | Elder | G06F 8/71 717/170 |
| 2016/0378449 A1 | 12/2016 | Khazanchi | |
| 2017/0163492 A1* | 6/2017 | Khazanchi | H04L 41/0886 |
| 2017/0163518 A1* | 6/2017 | Dube | H04L 41/5054 |
| 2017/0372247 A1* | 12/2017 | Tauber | G06F 8/71 |
| 2018/0012181 A1 | 1/2018 | Blincoe | |
| 2018/0121182 A1* | 5/2018 | Owen | G06F 8/60 |
| 2018/0329738 A1* | 11/2018 | Kasha | G06F 8/71 |

OTHER PUBLICATIONS

Adams et al., "Modern Release Engineering in a Nutshell", 2016, IEEE (Year: 2016).*
Mikita et al., "The Deployment Pipeline", 2012, Education Special Interest Group of the AITP, www.aitp-edsig.org (Year: 2012).*
Lai et al., "TriopusNet: Automating Wireless Sensor Network Deployment and Replacement in Pipeline Monitoring", Apr. 2012, ACM (Year: 2012).*
PCT International Search Report for PCT/US2016/039544, Applicant: Intuit Inc., Form PCT/ISA/210 and 220, dated Mar. 15, 2017 (5pages).
PCT Written Opinion of the International Search Authority for PCT/US2016/039544, Applicant: Intuit Inc., Form PCT/ISA/237, dated Mar. 15, 2017 (10pages).
International Search Report for PCT/US2018/052699 dated Feb. 25, 2019.
Written Opinion for PCT/US2018/052699 dated Feb. 25, 2019.
International Search Report for PCT/US2018/052697 dated Jan. 31, 2019.
Written Opinion for PCT/US2018/052697 dated Jan. 31, 2019.
Ronald Plew et al., "The Database Normalization Process", Jan. 2003.
Magnus Sahlgren, "A Brief History of Word Embeddings", Sep. 2015.
Sonatype "Maven: The Complete Reference", 2008, retrieved from <https://books.sonatype.com/mnref-book/pdf/mnref-pdf.pdf> on Feb. 14, 2019.
Anonymous "Maven—Introduction to the POM" as posted at <https://maven.apache.org/guides/introduction/ introduction-to-the-pom.html> Jun. 2016 and retrieved from the web archive <https://web.archive.org> on Nov. 27, 2018 (Year: 2016).
U.S. Appl. No. 15/192,949, filed Jun. 24, 2016.
U.S. Appl. No. 15/796,395, filed Oct. 27, 2017.
File Wrapper History of U.S. Appl. No. 15/796,395, filed Oct. 27, 2017 (Nov. 6, 2019 to Feb. 6, 2020).
File Wrapper History of U.S. Appl. No. 15/796,395, filed Oct. 27, 2017 (Feb. 6, 2020 to present).
Nidhi Grover, "A Study of Various Fuzzy Clustering Algorithms", International Journal of Engineering Research, vol. 3, Issue No. 3, Mar. 1, 2014, pp. 177-181.

* cited by examiner

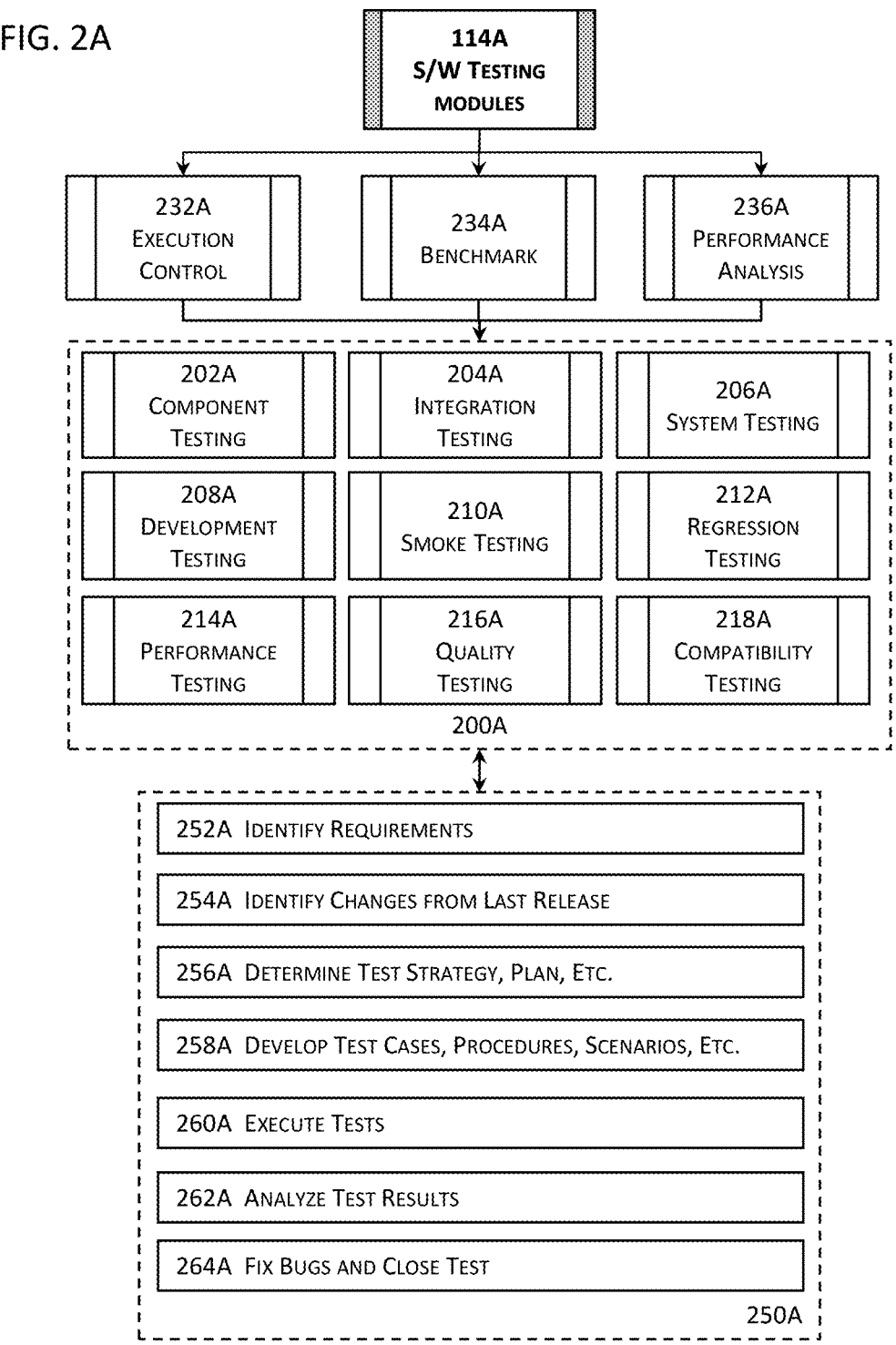

FIG. 5K

| Name | Start | End | Release Candidate | Notable Events |
|---|---|---|---|---|
| TY16-R32 | 05-29-2017 | 06-02-2017 | Timestamp 1 | |
| TY16-R33 | 06-06-2017 | 06-09-2017 | Timestamp 2 | |
| TY16-R34 | 06-13-2017 | 06-16-2017 | Timestamp 3 | |
| TY16-R35 | 06-20-2017 | 06-23-2017 | Timestamp 4 | |
| TY16-R36 | 06-26-2017 | 06-30-2017 | Timestamp 5 | |
| TY16-R37 | 07-03-2017 | 07-07-2017 | Timestamp 6 | |
| TY16-R38 | 07-10-2017 | 07-14-2017 | Timestamp 7 | |
| TY16-R39 | 07-17-2017 | 07-21-2017 | Timestamp 8 | |
| TY16-R40 | 07-24-2017 | 07-28-2017 | Timestamp 9 | |
| TY16-R40 | 07-31-2017 | 08-04-2017 | Timestamp 10 | |
| TY16-R40 | 08-07-2017 | 08-11-2017 | Timestamp 11 | |
| TY16-R40 | 08-14-2017 | 08-18-2017 | Timestamp 12 | |

Rows 1-12 of 12

FIG. 5R

METHODS, SYSTEMS, AND COMPUTER PROGRAM PRODUCTS FOR AUTOMATING RELEASES AND DEPLOYMENT OF A SOFTAWRE APPLICATION ALONG THE PIPELINE IN CONTINUOUS RELEASE AND DEPLOYMENT OF SOFTWARE APPLICATION DELIVERY MODELS

CROSS-REFERENCE TO RELATED APPLICATIONS

The present application is related to U.S. patent application Ser. No. 15/796,395, filed Oct. 27, 2017, entitled "METHODS, SYSTEMS, AND COMPUTER PROGRAM PRODUCTS FOR AN INTEGRATED PLATFORM FOR CONTINUOUS DEPLOYMENT OF SOFTWARE APPLICATION DELIVERY MODELS" and filed concurrently. The contents of the aforementioned patent applications are hereby expressly incorporated by references in their entireties for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A software release life cycle of a software application includes multiple stages from a series of development releases that occur nightly, through the alpha release, the beta release, the release to manufacturing, the release to production, various testing, verifications, etc. and thus requires a joint effort involving multiple teams such as the development team, the quality team, various test teams, the database team, the marketing team, the finance team, the documentation team, etc.

A software release life cycle thus faces several challenges and proceeds through multiple stages before the software application is ready for release to its intended users and is ready for release to manufacturing. For example, different teams may use different tools or systems in different environments in an independent manner. In addition, various teams may require different pieces of information or code to accomplish their respective mission objectives. In reality, each team or developer may be responsible for a task upon which one or more other teams or developers depend. For example, a developer may continue to develop and revise a code module (e.g., a segment of the entire software application) multiple times during a release cycle; and those who rely on this code module would need to wait until this code module is ready to proceed to the next phase in a release cycle. As another example, different test teams may run different tests to ensure that the software application meets their respective goals or standards; and each engineer in the development team may work on individual pieces of code that are to be integrated together to form the entire software application and thus impact one another.

Conventional software release and deployment models rely on a variety of software tools that provide release information (e.g., information pertaining to code development, various testing, etc.), revision tracking, status, various reports and messages, which software components are involved or affected by a particular release, which artifacts are needed or affected by a specific release, which features are newly introduced or revised, whether a revised feature is still compatible with the remaining portion of the software application, approval status, etc. These pieces of information may be closely related to each other during the development of a software release. Conventional approaches often have each member on a team store pertinent information pertaining to the part of the software application that the member is responsible for in a variety of different sources and formats. Different teams may even store such pertinent information at different locations or structures. For example, the development team may have its information stored on a development database; a test team may store its test suites and test results on a test database; etc. As a result, a developer often has to identify the right sources to access desired information (e.g., has a code module needed by the developer been approved?). Also, much of the information requires manual inputs and may thus fall short due to human errors that may cause profound, negative impacts on software deployment.

A conventional software release therefore requires extensive of manual and tedious efforts in creating, maintaining, bookkeeping, communicating, and coordinating various intermediate products among these various teams and is thus error prone and requires a substantial amount time to complete each stage during the software release life cycle. In fact, the mere identification of and access to individual artifacts of the correct versions may require repeated efforts and thus a waste of human as well as computational resources.

When a software application undergoes a revision (e.g., a change in the artifacts, in the code, etc.), conventional software release management systems rely on human efforts to identify the affected portions of the software and to communicate the change to the corresponding responsible developer. This is due to, for example, the large number of disconnections between various client systems that are used by various teams to release a software application. Such disconnections often require some manual efforts (e.g., manual identification of affected portions of a software application and corresponding responsible parties) that are known to be error prone and inefficient. Moreover, some conventional approaches attempt to address these problems, yet these approaches often rely on the purported progress provided by various team members and often stored in an unstructured storage space (e.g., in an unstructured internal wiki) and are thus lagging at best, if not incomplete or even incorrect. Moreover, the accuracy of such unstructured storage of information depends closely upon the completeness of the progress reports (or other information) provided by the developers.

For example, a developer may have developed a code module without necessarily knowing that a component referenced in the code module has already been revised to cause incompatibility with the code module. Even if the developer is aware of such a revision of the component so the developer can revise the code module to cope with the revised component, the developer often does not know when the developer may proceed to revise the code module to cope with the revision of the component. The developer thus needs notification from others or proactive and perhaps consistent checking the status of the component while the code module that needs to be revised to accommodate the revised component occupies unnecessary space on storage and perhaps blocks subsequent tasks that depend on the code module.

Therefore, there exists a need for a method, system, and computer product for an integrated platform for continuous deployment of software application delivery models to address at least the aforementioned challenges. There is also a need for a method, system, and computer product for automating the release and deployment of a software application delivery model at least by tracking and moving the software application along the pipeline for the continuous release and deployment of the software application delivery model.

SUMMARY

Some embodiments relating to methods, systems, and articles of manufacture for an integrated platform for continuous deployment of software application delivery models. The software application delivery models may include, for example, tax preparation software product or software service, financial management software product or software service, payroll software product or software service, accounting software product or software service, etc. In these embodiments, one or more releases and pertinent information of a software application delivery model may be identified or created at a portal on a remote computing system. One or more data structures may be populated for one or more modules hosted on the remote computing system. Tracking records may be generated at least by tracking the one or more releases with at least some of aggregated information identified from a plurality of tenants connected to the portal; and a release of the one or more releases or a portion thereof may be propagated along a release pipeline based in part or in whole upon the tracking records.

In some of these embodiments, the portal may be identified or determined on the remote computing system; and the plurality of tenants connected to the remote computing system may be identified. In addition, one or more versions of the software application delivery model and respective pertinent information about the one or more versions may be identified. Moreover, one or more data structures may be populated with the respective pertinent information for the one or more releases; and the aggregated information may be generated at least by aggregating the pertinent information about the one or more releases into a first data structure managed by a release train module. In addition or in the alternative, a plurality of code modules, artifacts, or the pertinent information may be classified into one or more clusters.

In some of the immediately preceding embodiments, first information pertaining to an artifact, a code module, or at least a portion of the pertinent information may be identified. The first information may be normalized into normalized information. These one or more clusters may be identified or determined at least by applying word or term embedding techniques to the normalized information; and one or more recommendations may also be identified or determined for the one or more clusters. Dependencies may be determined among the one or more releases or one or more portions thereof.

In some embodiments, the one or more releases along respective release pipelines may be tracked to generate at least the tracking records; and a calendar may be populated with at least a portion of the respective pertinent information or the aggregate information. In addition or in the alternative, a release activity or information thereof associated with a release of the one or more releases may be identified; an impact of the release activity or information thereof on one or more other release activities may be assessed; and a score may be determined for the release activity or the information thereof.

In some embodiments, one or more other pieces of pertinent information affected by or affecting the release activity or the information thereof may be identified or determined; and an extent of influence of the release activity or the information thereof may be determined. In addition, a first level of impact of the release activity or the information thereof on the one or more other pieces of pertinent information may be determined; and one or more second levels of impact of the release activity or the information thereof on the release activity of the information thereof may also be determined.

In addition or in the alternative, a release may be identified from the one or more releases of the software application delivery model; one or more tenants and release activities corresponding to the release may also be identified; and respective states of the release activities may be determined. Furthermore, a hindering state that hinders the release of the software application delivery model may be identified; and one or more issues resulting in the hindering state and one or more corresponding tenants that are associated with the one or more issues may be determined.

In some of these embodiments, issue descriptions or issue resolutions concerning the one or more issues may be identified from a database table, an expert system, or a knowledge base; and respective numeric or symbolic scores may be determined for the release activities. Information concerning the one or more tenants, the release activities, the respective states, the hindering state, the one or more issues, the one or more corresponding tenants, the issue descriptions, the issue resolutions, or the respective numeric or symbolic scores may be cross-linked.

Some embodiments are directed to a method for automating the release and deployment of a software application delivery model at least by tracking and moving the software application along the pipeline for the continuous release and deployment of the software application delivery model. In these embodiments, these techniques identify a release and pertinent information thereof for a software application delivery model and determine dependencies among at least some of the pertinent information. Tracking records may be generated at least by tracking the release based in part or in whole upon the dependencies. The release or a portion of the release may be advanced from a current stage to a next stage along a release pipeline based in part or in whole upon the tracking records.

In some of these embodiments, a release and pertinent information thereof for a software application delivery model may be identified by a portal comprising computer-executable instructions stored at partially in memory and executed by at least one microprocessor. Dependencies among at least some of the pertinent information may be determined; and tracking records may be generated at least by tracking the release based in part or in whole upon the dependencies. The release or a portion of the release may then be advanced from a current stage to a next stage along a release pipeline based in part or in whole upon the tracking records.

To determine the dependencies, the at least some of the pertinent information may be clustered into one or more clusters; at least some of the dependencies may be determined using the one or more clusters; and a plurality of artifacts, one or more code modules, a release activity, or relevant information associated with the release may also be identified.

In addition, one or more version identifiers or one or more synonyms may be identified for the plurality of artifacts, the one or more code modules, the release activity, or the relevant information; and some or all of the dependencies may be determined based in part or in whole upon the one or more version identifiers, the one or more synonyms, or code scanning in some embodiments.

In some of these embodiments, a release activity or first information pertaining to the release and one or more version identifiers or one or more common identifiers pertaining to the release activity or the first information may be identified. Moreover, a set of artifacts or code modules that has been branched into a boxset may be identified based in part or in whole upon the one or more version identifiers or the one or more common identifiers; and identifiers or synonyms of the set of artifacts or code modules may also be identified from a database that is managed by a release resource module and maintains detailed information of the release.

To determining some or all of the dependencies, at least some of the dependencies may be determined at least by querying the database to select one or more release activities, artifacts, code modules, or a combination thereof with the identifiers or the synonyms or by code scanning; and pertinent release activities, artifacts, code modules, or a combination thereof may be identified into one or more columns in a dependency data structure or in the database. In some of these embodiments, the dependency data structure or the database may be indexed with one or more key columns that corresponding to the one or more columns for the pertinent release activities, artifacts, code modules, or a combination thereof.

In some embodiments, a plurality of tenants corresponding to the release may be identified; and a plurality of artifacts, a plurality of code modules, or a combination of one or more artifacts of the plurality of artifacts and one or more code modules of the plurality of code modules may be identified. In addition, one or more issues or one or more states may be identified with one or more threshold limits; and the one or more issues or the one or more states may be classified into one or more types.

To generate the tracking records, at least one type of the one or more types may be tracked to generate and store at least some tracking records of the tracking records; and one or more actions may be executed in response to the one or more issues or the one or more states based in part or in whole upon one or more criteria. In addition or in the alternative, one or more branching version identifiers may be identified for the plurality of artifacts, the plurality of code modules, or the combination; and one or more version identifiers may be monitored for the one or more branching version identifiers.

In some of these embodiments, first information pertaining to an issue or a state of the one or more issues or the one or more states may be identified; and one or more dependency relations affecting or affected by the first information may be identified or determined. In addition, a priority level for the issue or the state may be determined based at least in part upon the one or more dependency relations; and the plurality of artifacts, the plurality of code modules, or the combination one or more artifacts and one or more code modules corresponding to the one or more branching version identifiers may be identified.

In addition or in the alternative, one or more states of the branching version identifiers, the plurality of artifacts, the plurality of code modules, or the combination one or more artifacts and one or more code modules for the issue or the state may be tracked; and a first set of one or more artifacts, one or more code modules, or a combination of at least one artifact and at least one code module may be identified based in part or in whole upon a triggering event.

Some embodiments are directed at a system having one or more hardware modules that include and/or function in conjunction with at least one microprocessor as well as other related components or architectures of one or more computing systems and may be invoked to perform any of the methods, processes, or sub-processes disclosed herein. The hardware system may include, for example, {list of my modules} in some embodiments.

Each of these modules may include or function in tandem with electrical circuitry and one or more microprocessors each having one or more processor cores to perform its intended functions. The hardware system may further include one or more forms of non-transitory machine-readable storage media or persistent storage devices to temporarily or persistently store various types of data or information, various design rules, various libraries, selected and selectable targets, or any other suitable information or data, etc. A module may be initialized in a computing system so that the software portion of the module is stored in memory (e.g., random access memory) to be executed by one or more processors or processor cores off the computing system to perform at least a part of the functionality of the module. Some illustrative modules or components of the hardware system may be found in the description below.

Certain embodiments are directed at an article of manufacture having stored thereupon a sequence of instructions which, when executed by a mobile computing or communication device, causes the mobile computing or communication device to perform various processes or to invoke various modules described herein. More details about the article of manufacture will be described in some of the subsequent paragraphs with reference to one or more drawing figures. Some of the aforementioned embodiments are directed to various computer program products and mechanisms for software products or services including one or more of catalog services, order services, subscription services, billing services, account services, entitlement services for tax preparation software product or software service, financial management software product or software service, payroll software product or software service, accounting software product or software service, etc. Some other embodiments are directed to various computer program products and mechanisms for financial management, to the extent that it is severable from any tax strategy or does not limit the use of any tax strategy by any taxpayer or tax advisor.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which:

FIG. 2A illustrates more details about some example of one or more software testing modules illustrated in the high level block diagram in FIG. 1A in one or more embodiments.

FIG. 2I illustrates more details about some example of one or more dependency modules illustrated in the high level block diagram in FIG. 1A in one or more embodiments.

FIG. 2O illustrates more details about an example of one or more enterprise continuous deployment modules illustrated in the high level block diagram in FIG. 2M in one or more embodiments.

DETAILED DESCRIPTION OF ILLUSTRATED EMBODIMENTS

Figure 1A:
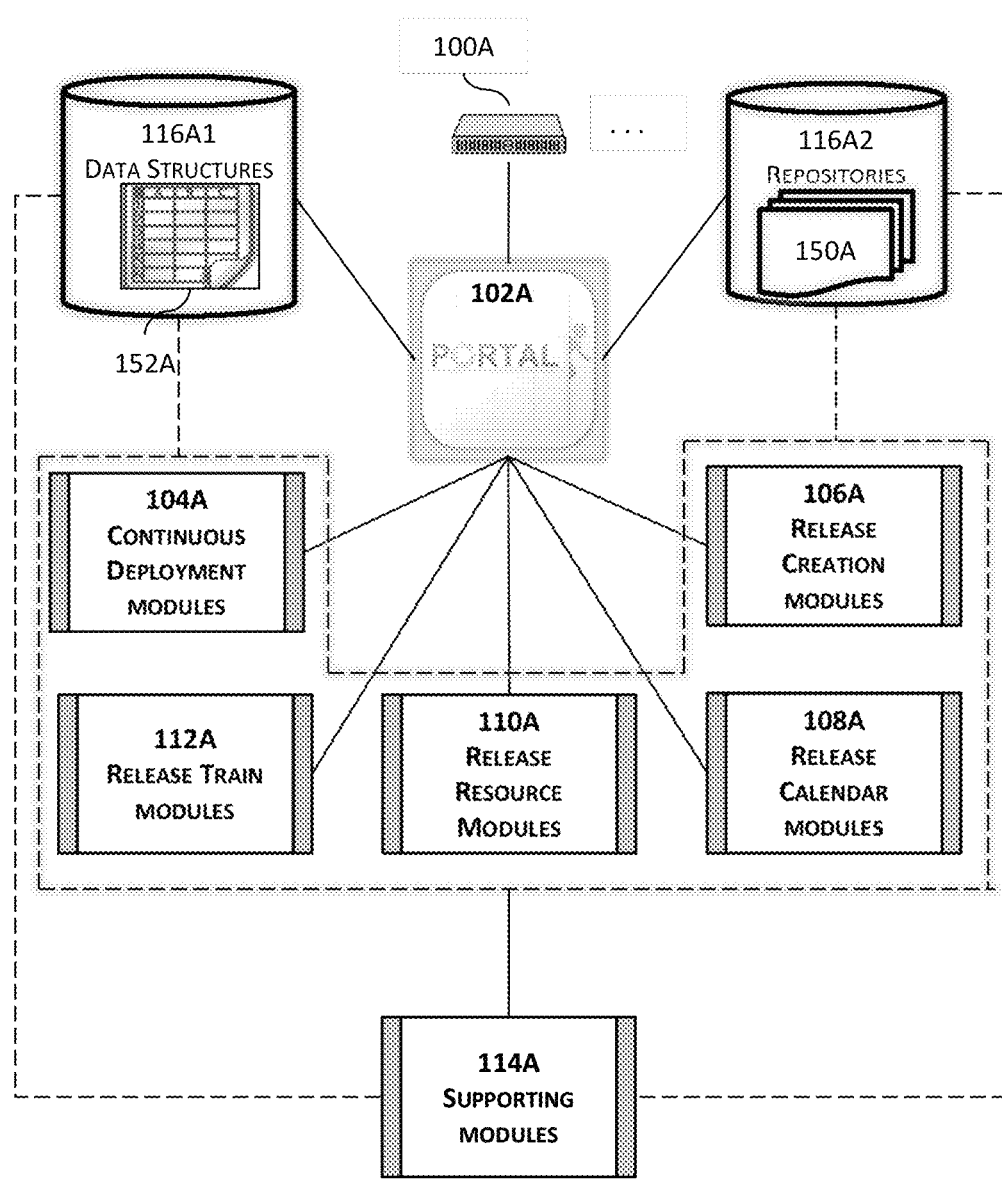
FIG. 1A illustrates a high level system architecture of an integrated platform for continuous deployment of software application delivery models and a system or process for automating the release and deployment of a software application delivery model at least by tracking and moving the software application along the pipeline for the continuous release and deployment of the software application delivery model in one or more embodiments.

Some embodiments generate an integrated continuous delivery platform that directly interfaces with tenants (e.g., various teams responsible for the eventual release of a software application delivery model to manufacturing) and intelligently retrieve pertinent information pertaining to the eventual release of a software application delivery mode. The integrated platform may track various pieces of code modules, artifacts, etc. and determine dependencies among these various pieces of code modules, artifacts, etc. to facilitate the eventual release of a software application delivery model with minimal or no unnecessary delays.

The integrated platform may also determine respective scores of various pieces of information (e.g., code coverage of a software component) pertaining to the eventual release and programmatically generates release data for the software application delivery model. Relevant portions of this programmatically generated data are automatically and/or programmatically populated into various data structures or tenants while the eventual release is being proactively tracked by this integrated platform for continuous delivery. The programmatically and/or automatically generated release information may be presented in an aggregated interface (e.g., a release portal). Moreover, the integrated platform may intelligently determine the dependency and perform intelligent decision making among various stages of the eventual software release and programmatically generate and transmit messages, e-mails, or any suitable forms of notifications together with other pertinent information to relevant parties.

Some embodiments are directed to the integration of all or most aspects related to a software release and deployment into a release portal that provides planning, tracking/monitoring, notification, and decision making capabilities for continuous deployment of software releases. Some embodiments are additionally or alternatively directed to the automatic and/or programmatic generation and aggregation of pertinent information pertaining to a release and deployment of a software application delivery model and streamlining a software release and deployment by enhancing the accuracy and efficiency of release management systems. Moreover, some embodiments are directed to the dynamic, intelligent tracking and dependency determination of various pieces of information (e.g., software components, artifacts, etc.) pertaining to a software release.

Some embodiments integrate various software modules (e.g., branch management, code development, release management, etc.) as well as various sources of development repositories (e.g., code repository include various versions of software code, data repository including data such as the artifacts, etc.), various platforms or environments (e.g., the approval platform, the test platform(s), quality check platform, the manufacturing platform, etc.), as well as other data sources (e.g., databases, libraries, etc.) into a release portal to which a plurality of tenants are connected. In addition to the aggregation of these various sources, some embodiments further directly interact with the plurality of tenants to monitor and track the progression of the development of a software application delivery model and programmatically and/or automatically generate release and deployment management information (e.g., new release(s), release calendar, release trains, etc.) based on the monitoring and tracking results.

In addition to the aggregation, monitoring, and tracking, some embodiments resolve and determine various dependencies among various pieces of information (e.g., which artifacts are involved in a software component or even a specific release, which software component affects other software component(s) or release(s), etc.) These determined dependencies may form the basis for an automated notification system to inform affected tenants with recommended actions. Moreover, some embodiments adopt various logic subsystems (e.g., scorecard system that evaluates various metrics such as code coverage, etc.) to provide automated and programmatic decision making capabilities, without human intervention in some embodiments, for the automated release management system. Various pieces of the software application delivery model may be automatically or programmatically moved along the pipeline of the release and deployment with the built-in intelligence of some of the modules described herein.

Regarding tracking a release of a software application delivery model and determining dependencies, when a tenant initiates a change in a software application (e.g., a change in a software component of a software application), some embodiments identify the affected portion of the software application, analyzes the change, and determines the dependency of this change to identify other portions of the software application that may be affected by the change. For example, the invention may identify such other portions that depend on the software component or are depended upon by the software component that underwent the change. Such a change may be communicated to the affected "tenants" via the automated notification module. Such notifications may also include other related information and recommend actions pertaining to the change. These embodiments may also determine one or more one or more other portions upon which the software component undergoing the change depends from the software application delivery model and performs identical or substantially similar processes accordingly.

This change or the software portion including the change may be tracked throughout the release and various different notifications may be automatically generated and transmitted to the interested tenants. As the software portion is moved along the release process, these embodiments track the change and/or the portion of the software application including the change, analyzes the change according to various requirements associated with the stage the affected portion of the software application is at, and determines the dependency for this affected software portion, and notifies the responsible parties of other portions of the software application for the current stage. The responsible tenants' actions may also be tracked to determine whether the affected software portion or even the entire software application may proceed to the next stage of the release.

For example, these embodiments may determine that a modified software component is not yet accommodated in the code coverage and thus reduces the code coverage evaluation scores of both the modified software component and the software application delivery model. Some of these embodiments may notify, for example, the test or verification engineers and monitor the progress of the test or verification engineers with respect to this modified software component. Once the test or verification engineers performed one or more test suites that execute a threshold percentage of the source code or the affected portion of the source code of the modified software component, these embodiments may automatically change the status of the modified software component and notify various other tenants accordingly.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1A illustrates a high level system architecture of an integrated platform for continuous deployment of software application delivery models and a system or process for automating the release and deployment of a software application delivery model at least by tracking and moving the software application along the pipeline for the continuous release and deployment of the software application delivery model in one or more embodiments.

These embodiments implement a portal 102A that may be hosted on a computing system (e.g., a server) and manage a plurality of repositories 116A2 (e.g., a code repository 150A) and/or a plurality of data structures 116A1 storing thereupon, for example, one or more relational database tables, tables, lists, etc. The portal is interconnected with a plurality of tenants 100A. A tenant may include a team or a member of a team responsible for various activities concerning specification, development, testing, verification, automation, manufacturing, etc. that lead to the eventual release of a software application delivery model.

The portal 102A may also include or function in conjunction with a plurality of modules including, for example, one or more continuous deployment modules 104A including various aspects of processing for continuous deployment of software application delivery models; one or more release creation modules 106A including various aspects of processing for creating a release for a software application delivery model; one or more release calendar modules 108A that provide functions such as incorporating interactive, aggregated information pertaining to a release to tenants in one or more calendar views having respective configurable granularities or resolutions; one or more release train modules 112A providing higher level interactive information for one or more releases of one or more software application delivery models; and/or one or more release resource modules 110A providing interactive, aggregated, and detailed information about a specific release that may be identified, for example, with a direct query into a release data structure (e.g., 116A1) or from a release train module 112A. The portal 102A may also function directly with, or through one or more aforementioned modules, a plurality of supporting modules 114A. More details about the plurality of supporting modules are described below with reference to FIG. 1C.

Figure 1B:
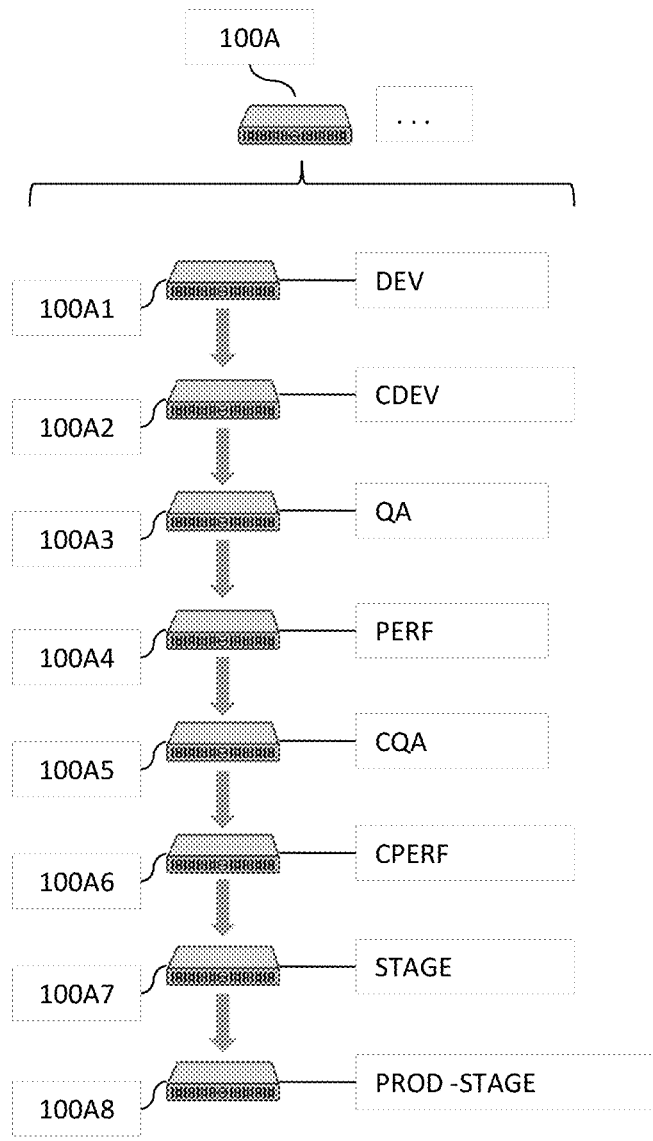
FIG. 1B illustrates some simplified examples of tenant computing systems illustrated in the high level block diagram in FIG. 1A in one or more embodiments.

FIG. 1B illustrates some simplified examples of tenant computing systems illustrated in the high level block diagram in FIG. 1A in one or more embodiments. In these examples, the plurality of tenants 100A may include, for example, a development tenant (DEV) 100A1 that performs the build verification test for a software application delivery model. The plurality of tenants 100A may also include the continuous development tenant (CDEV) 100A2 that performs the continuing build verification test for a software application delivery model; a quality assurance tenant 100A3 (QA) that performs functions such as the build acceptance test, component automation, etc. to ensure that the software application delivery model meets the defined quality level; a performance tenant 100A4 that (PERF) performs component performance test, etc. to ensure that components perform as designed or intended.

The plurality of tenants 100A may further include a continuing quality assurance tenant (CQA) that performs integrated automation, etc. to ensure that the software application delivery model meets the defined quality level; a continuing performance test tenant 110A6 (CPERF) that performs, for example, integrated performance tests to ensure that the integrated components perform their respective functions as designed or intended; and a stage tenant 100A7 (STAGE) that performs UAT (user acceptance testing) automation with respect to, for example, beta audience; and a production stage tenant 100A8 (PROD-STAGE) that further performs the UAT automation for the intended audience, etc.

As described above, a tenant may include a team having a plurality of members or a member of a team responsible for various activities concerning specification, development, testing, verification, automation, manufacturing, etc. that lead to the eventual release of a software application delivery model. The portal 102A in FIG. 1A connects the plurality of tenants 100A (e.g., a plurality of computing systems) and provides an integrated environment for the plurality of tenants 100A to facilitate a more efficient and streamlined platform for releases and deployments of software application delivery models.

Figure 1C:
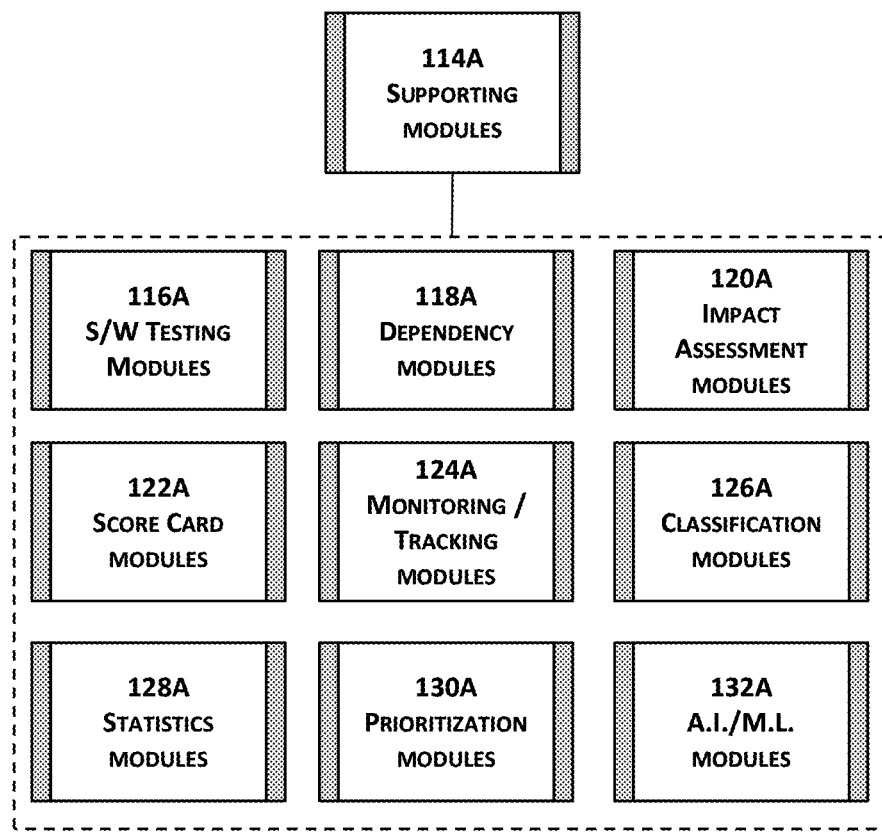
FIG. 1C illustrates more details about some examples of supporting modules illustrated in the high level block diagram in FIG. 1A in one or more embodiments.

FIG. 1C illustrates more details about some examples of supporting modules illustrated in the high level block diagram in FIG. 1A in one or more embodiments. The supporting modules 114A may include, for example, one or more software testing modules 116A, a dependency module 118A, an impact assessment module 120A, a scorecard module 122A, one or more monitoring and/or tracking modules 124A, one or more classification or clustering modules 126A, a statistics module 128A, a prioritization module 130A, one or more artificial intelligence modules and/or one or more machine learning modules 132A, or any combinations thereof.

At a higher level, a software testing module 116A may compose tests, test suites, etc. and autonomously or with the supervision of a human expert execute these tests, test suites, etc. to determine whether a software application or a portion thereof under test performs as designed or intended. A dependency module 118A may determine dependencies among various components, features, artifacts, code modules, etc. of a software application or a portion thereof. An impact assessment module 120A may determine an impact of a portion of a software application on another portion of the software application or of one or more other software applications.

A scorecard module 122A may determine a symbolic or a numeric score for a portion (e.g., an artifact, feature, component, code segment, etc.) of a software application. A monitoring and/or tracking module 124A may track an entity (e.g., an artifact, feature, component, code segment, etc.) of a software application along the pipeline before the eventual release. A classification or clustering module 126A may classify or cluster various entities pertaining to a software application into one or more classes or clusters. A statistics module 128A may determine various statistics of various entities of a software application, sometimes in light of other statistics or historical data.

A prioritization module 130A may determine a priority level of an entity pertaining to a release of a software application. An artificial intelligence module or machine learning may provide the intelligence in various determinations, decisions, etc. so that the integrated platform may autonomously perform its functions, even without human intervention in moving various pieces of elements of a software application delivery model along the pipe line leading to the eventual release of the software application delivery model. More details about each of these support modules will be described below with reference to FIGS. 2A-2T.

Figure 2B:
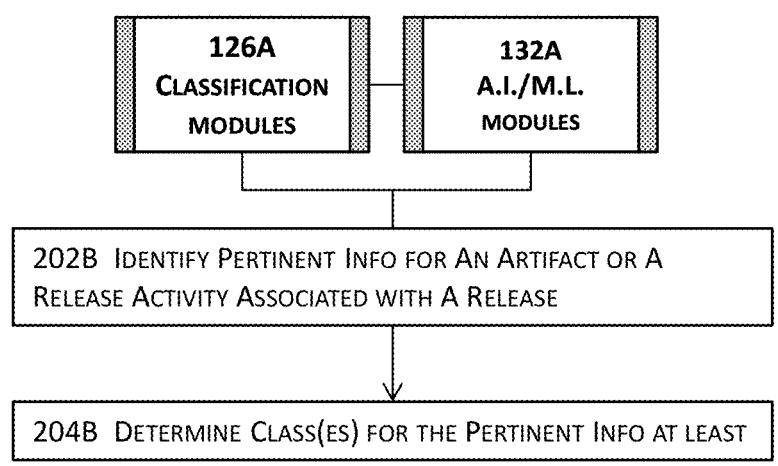
FIG. 2B illustrates more details about some example of one or more classification or clustering modules and artificial intelligence and/or machine learning modules illustrated in the high level block diagram in FIG. 1A in one or more embodiments.
Figure 2C:
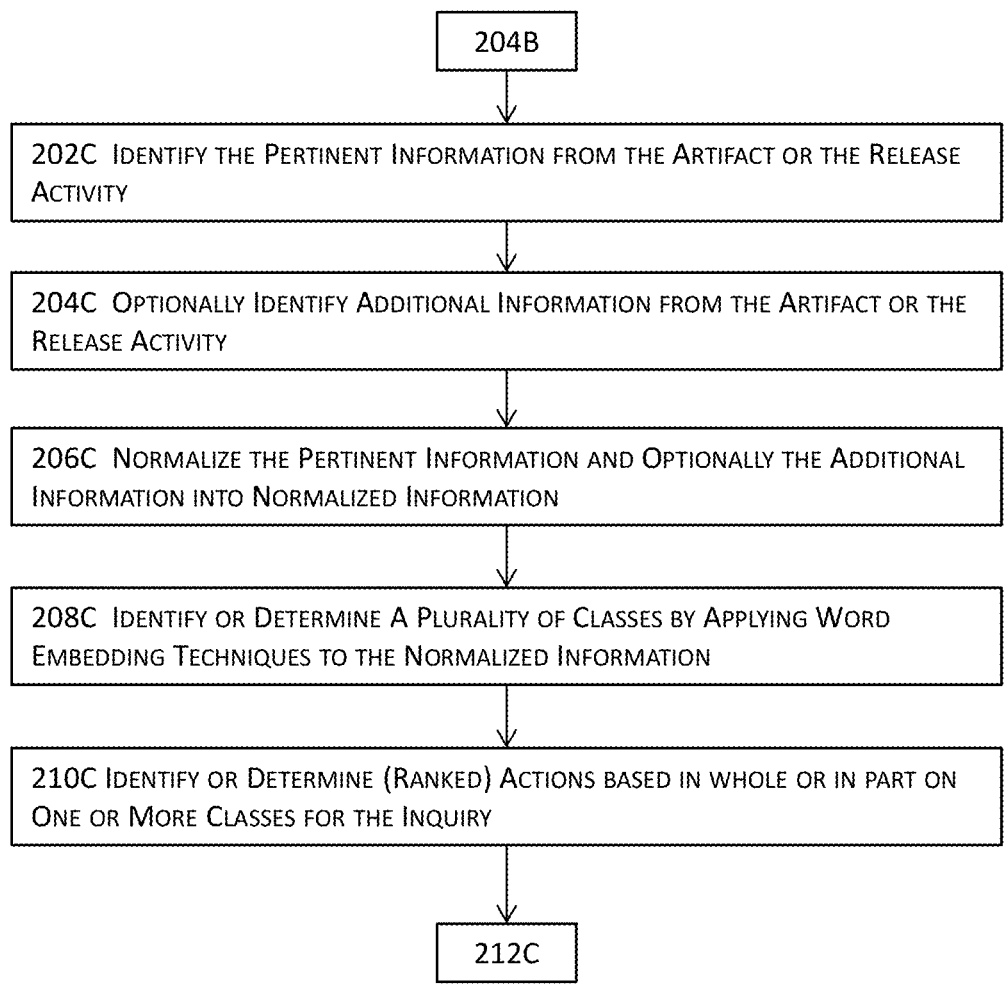
FIGS. 2C-2D jointly illustrate more details about a portion of FIG. 2B in one or more embodiments.
Figure 2D:
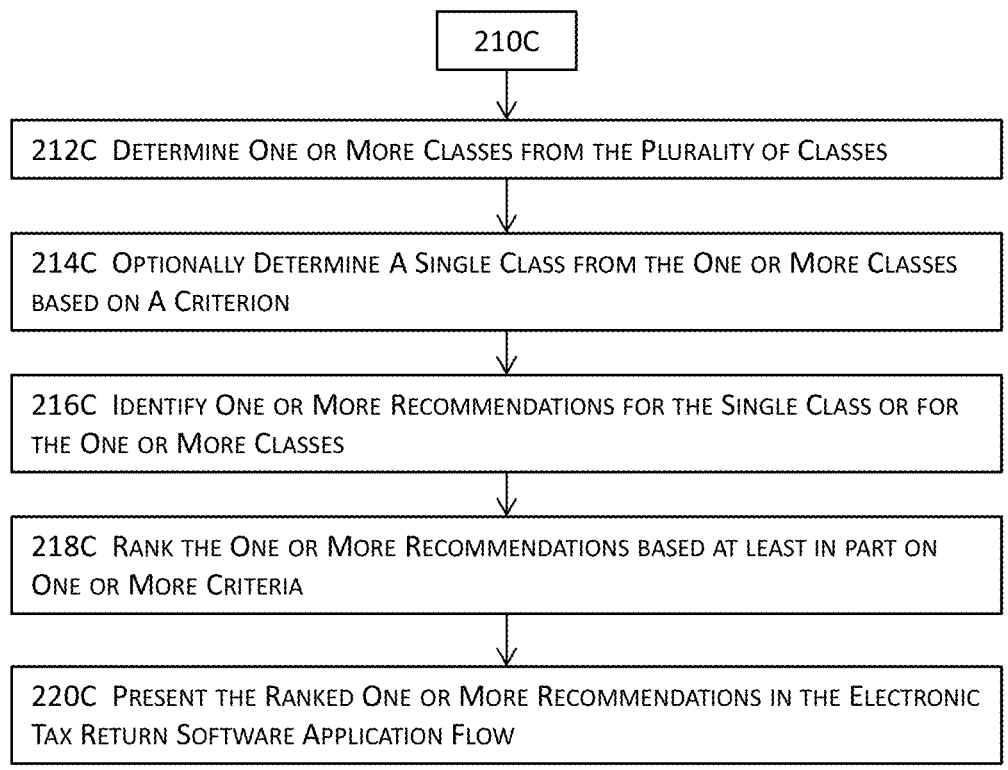
Figure 2E:
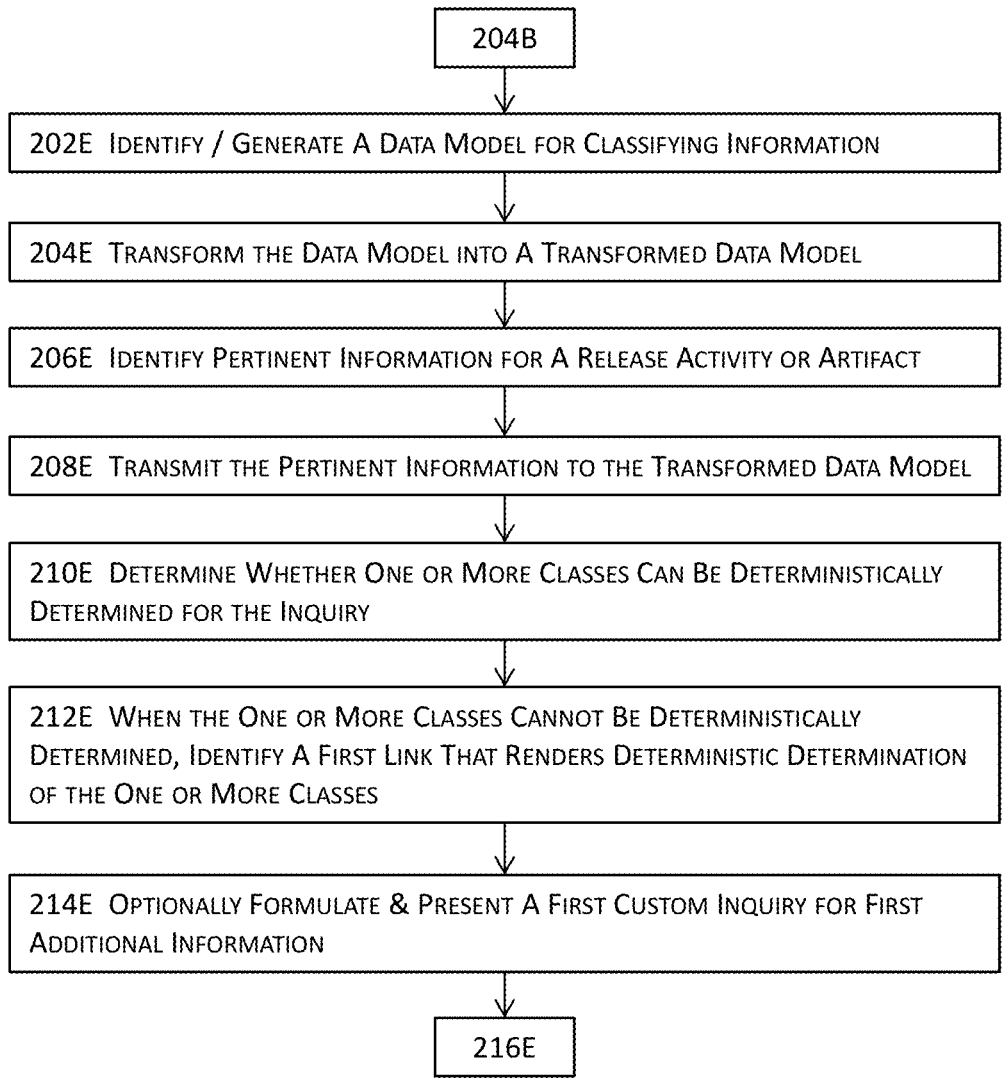
FIGS. 2E-2G jointly illustrate more details about a portion of FIG. 2B in one or more embodiments.
Figure 2F:
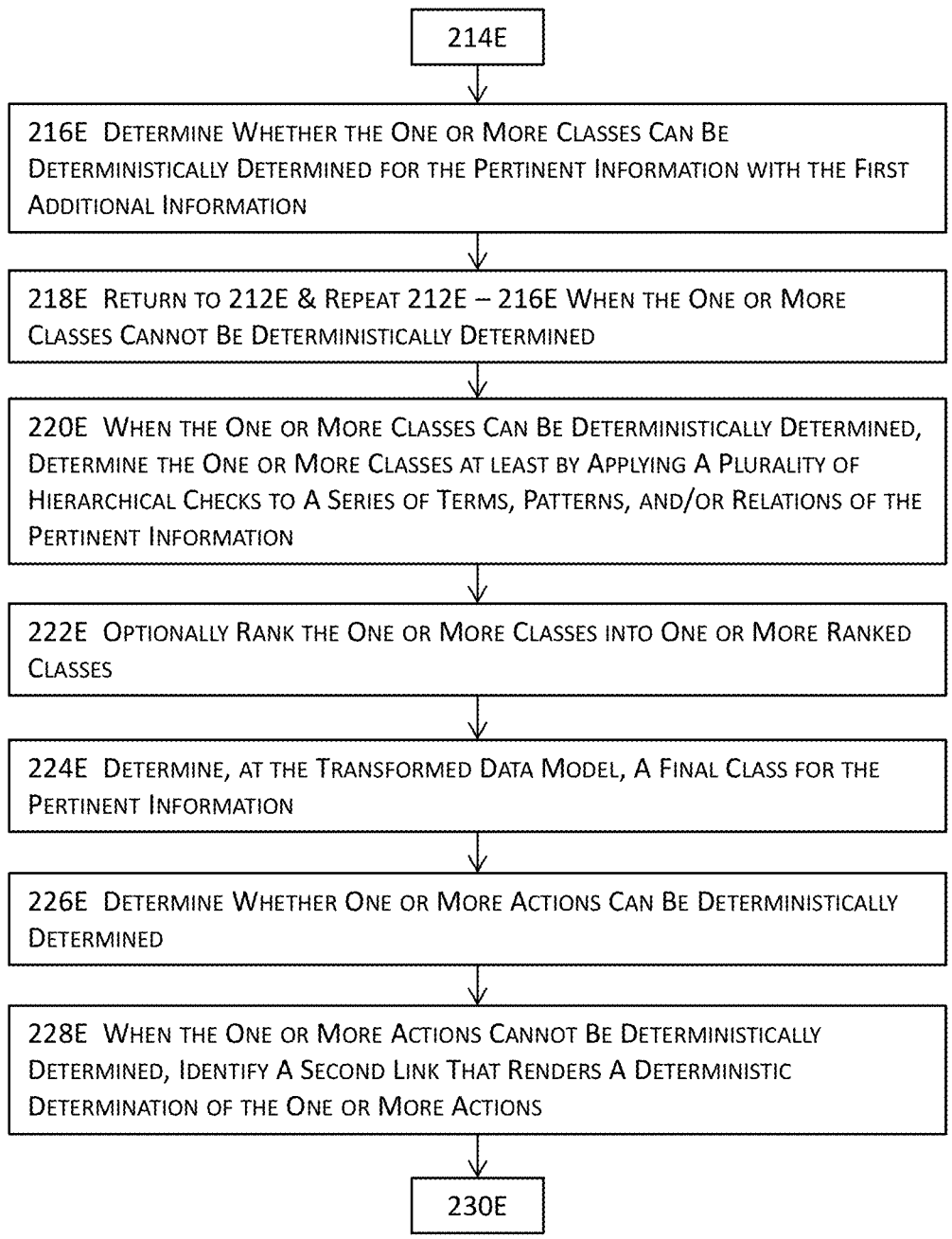
Figure 2G:
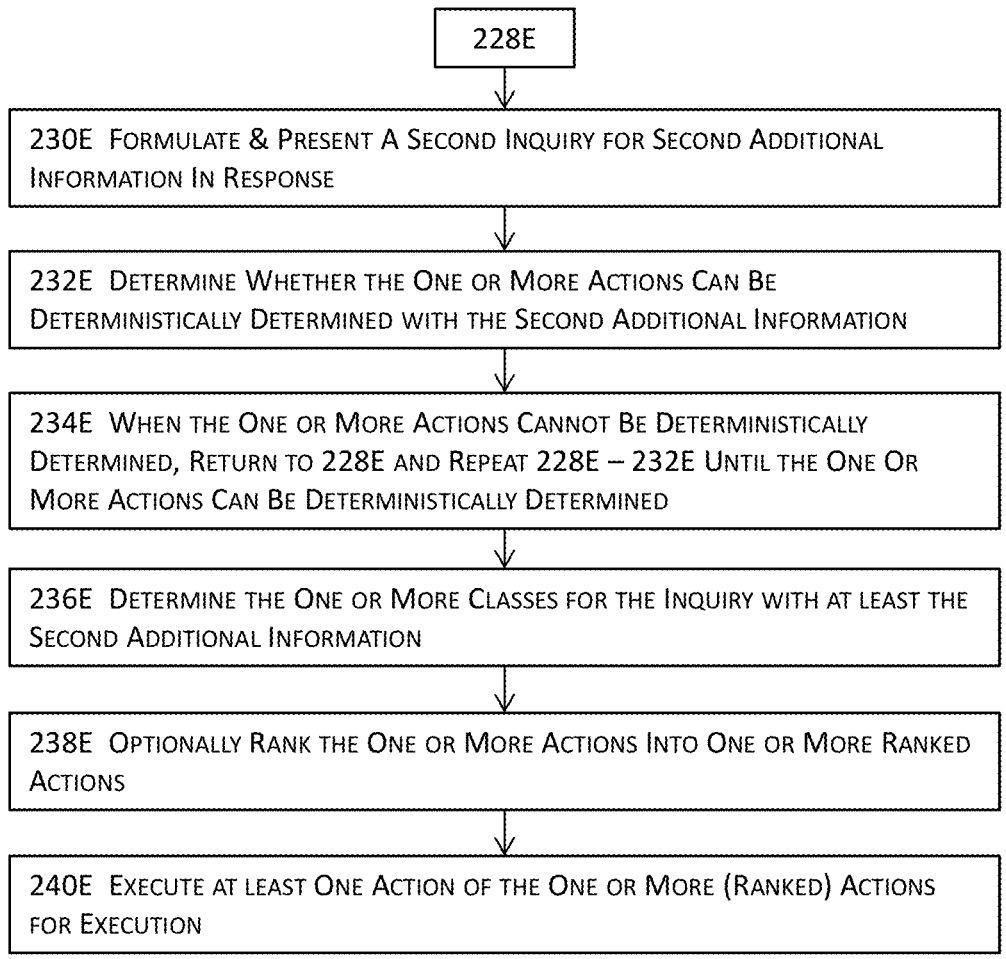
Figure 2H:
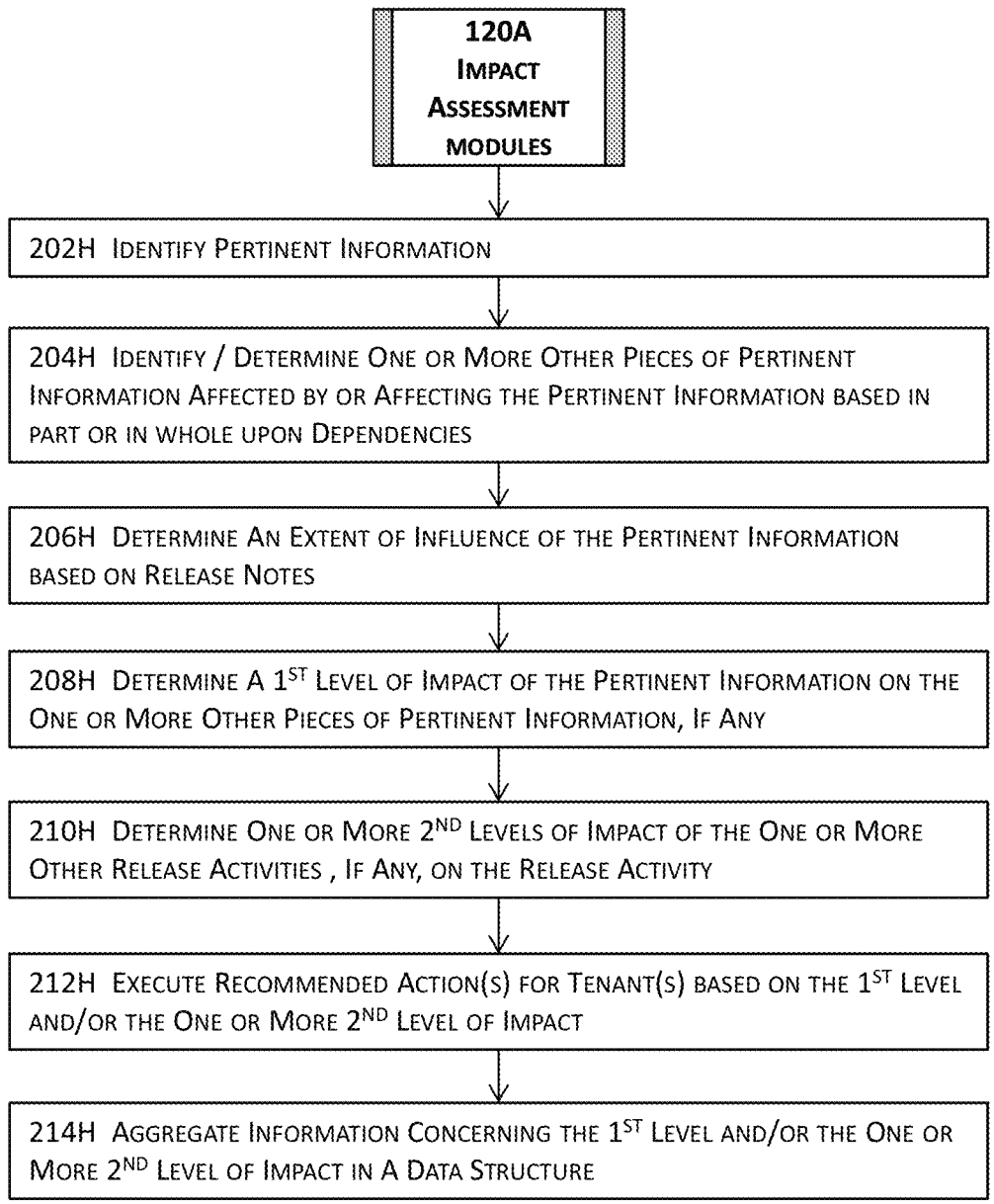
FIG. 2H illustrates more details about some example of one or more impact assessment modules illustrated in the high level block diagram in FIG. 1A in one or more embodiments.
Figure 21:
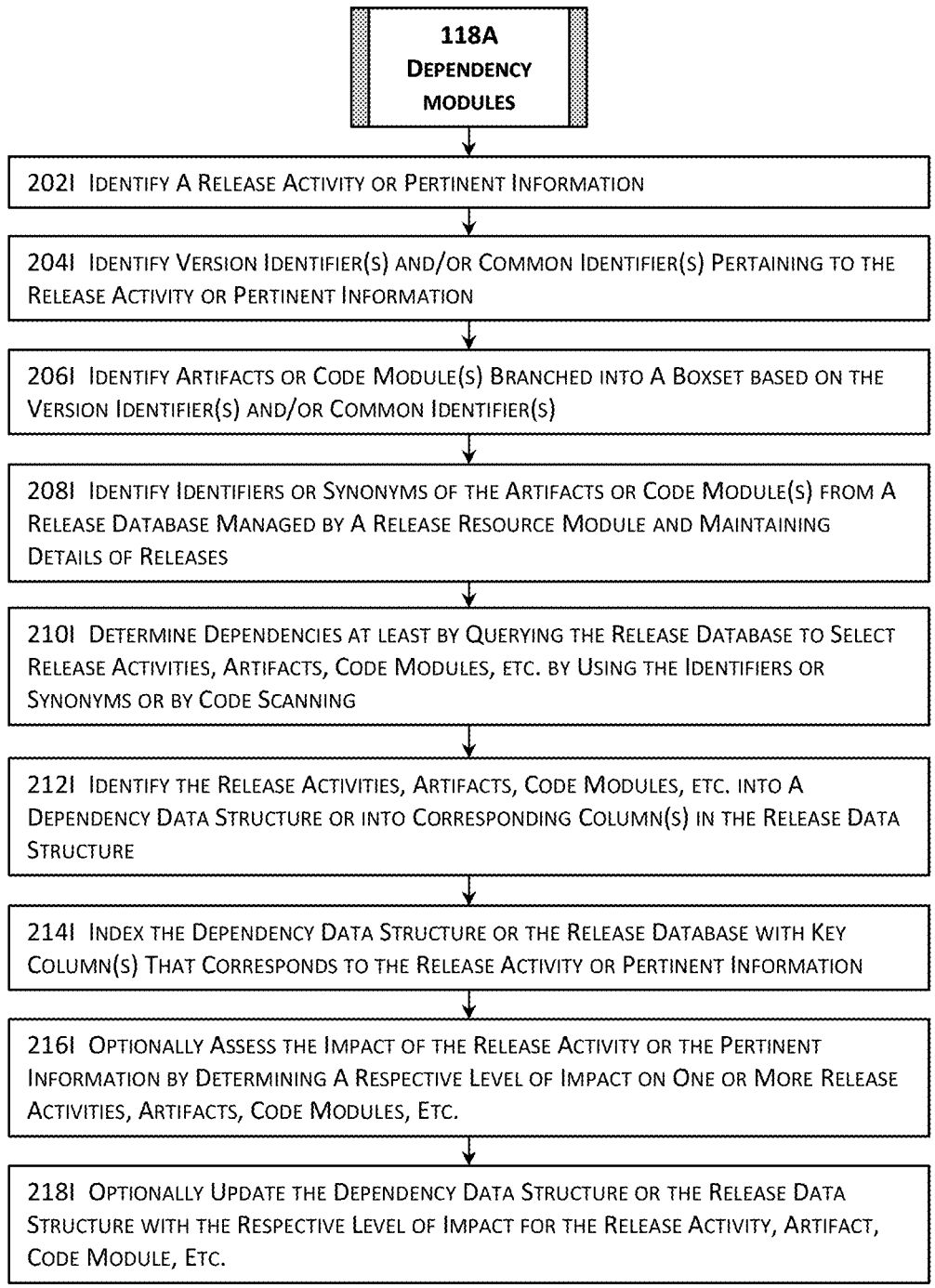
Figure 2J:
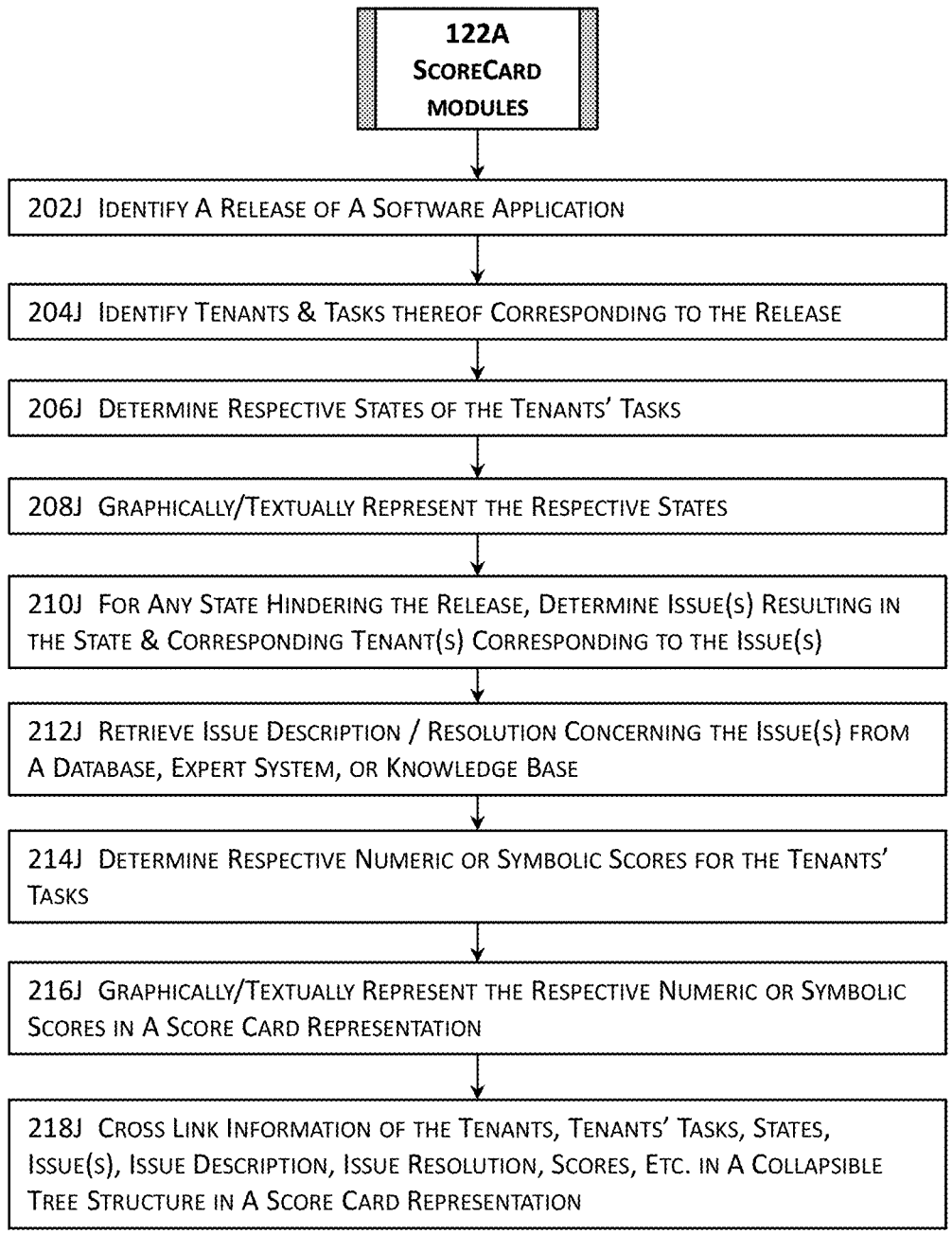
FIG. 2J illustrates more details about some example of one or more scorecard modules illustrated in the high level block diagram in FIG. 1A in one or more embodiments.
Figure 2K:
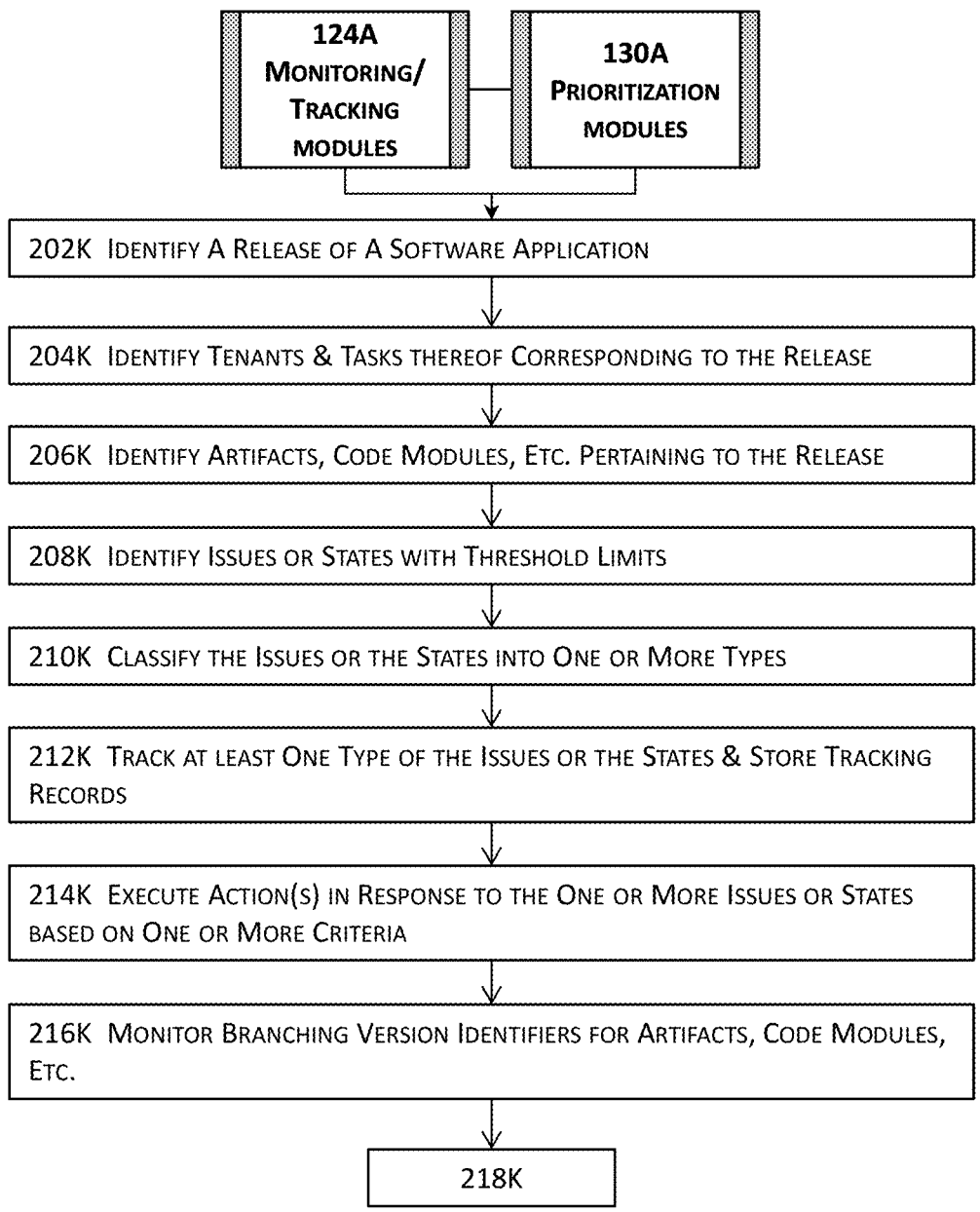
FIGS. 2K-2L jointly illustrate more details about some example of one or more monitoring and/or tracking modules and one or more prioritization modules illustrated in the high level block diagram in FIG. 1A in one or more embodiments.
Figure 2L:
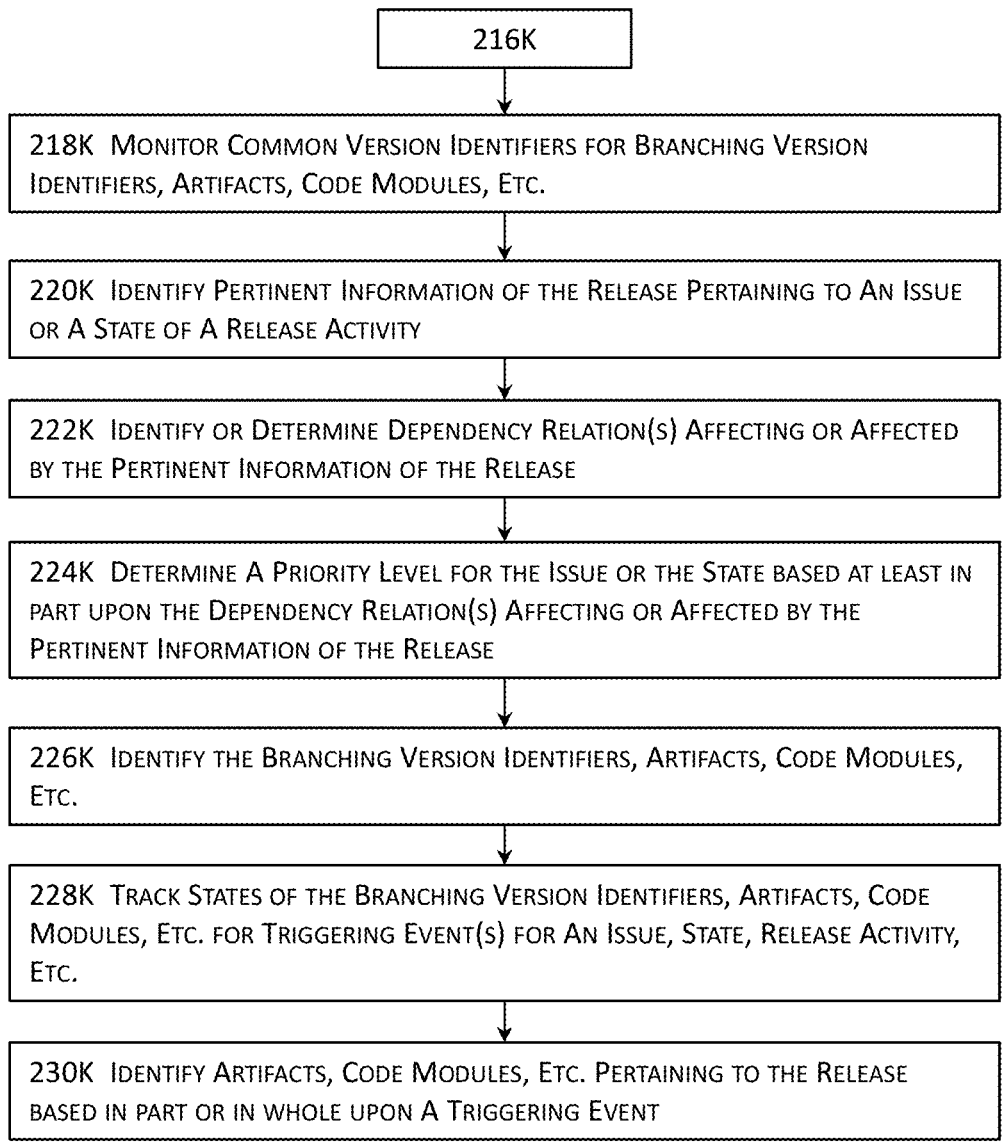
Figure 2M:
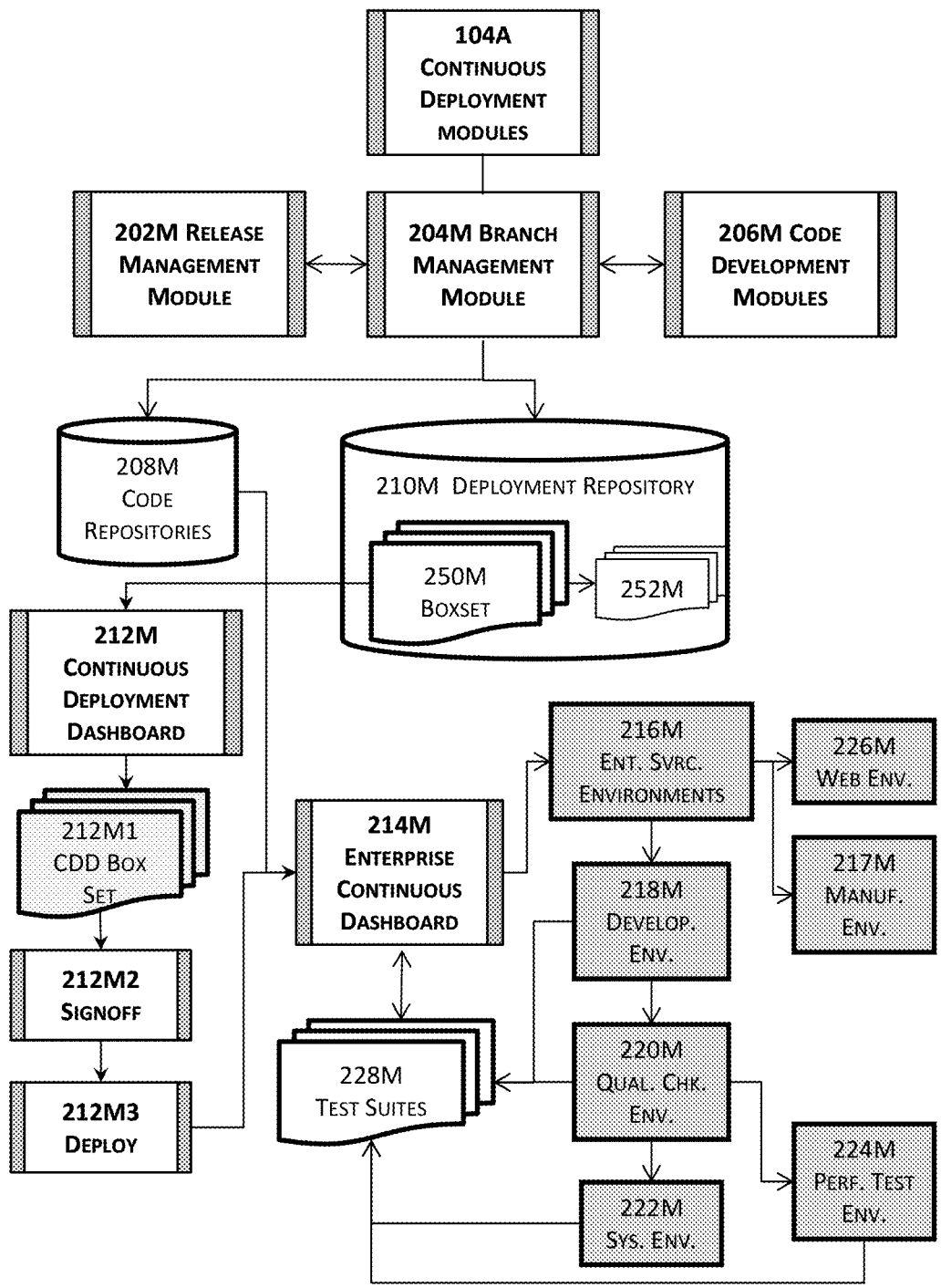
FIG. 2M illustrates more details about an example of one or more continuous deployment modules illustrated in the high level block diagram in FIG. 1A in one or more embodiments.
Figure 2T:
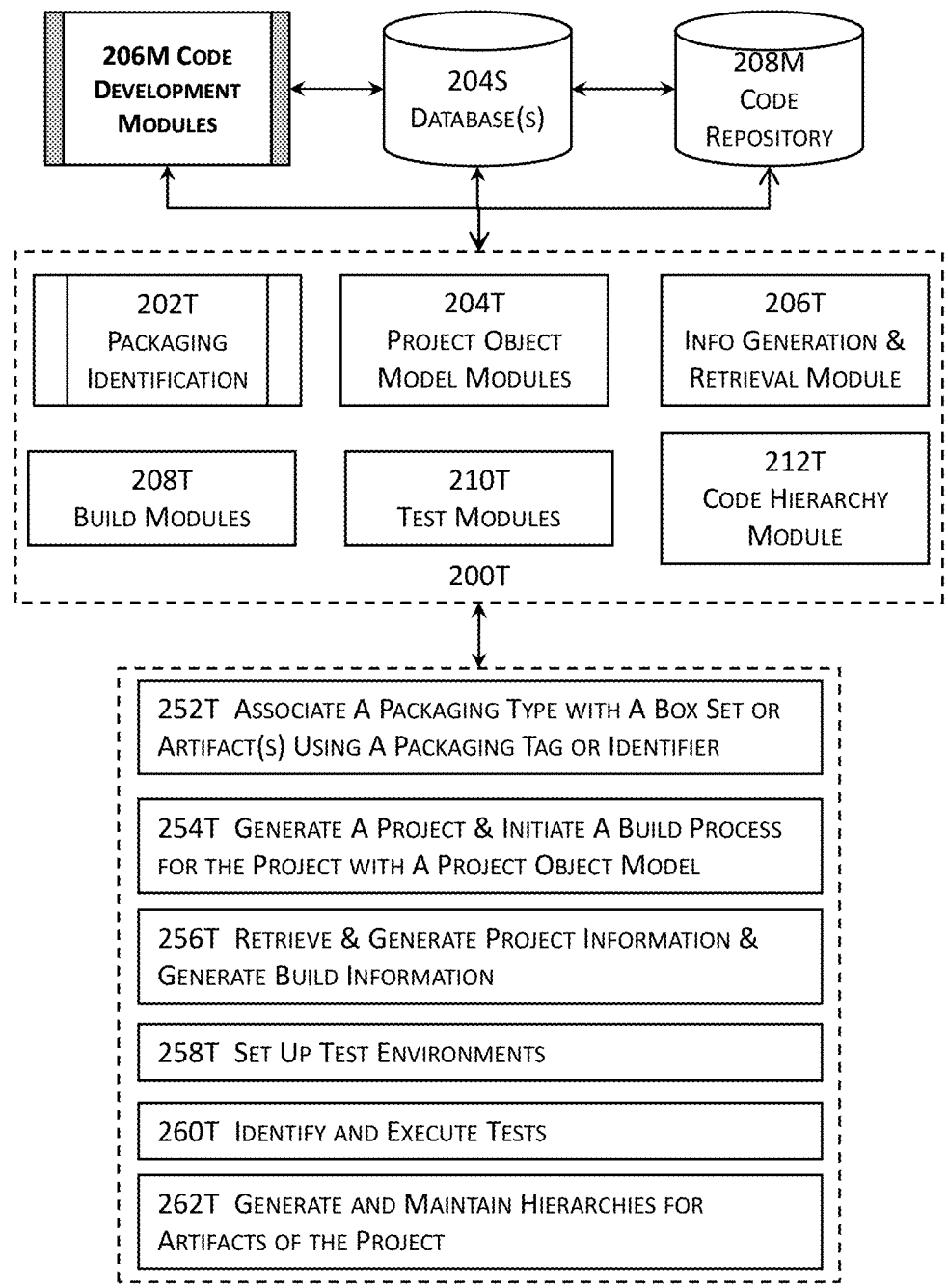
FIG. 2T illustrates more details about an example of one or more code development modules illustrated in the high level block diagram in FIG. 2M in one or more embodiments.
Figure 3A:
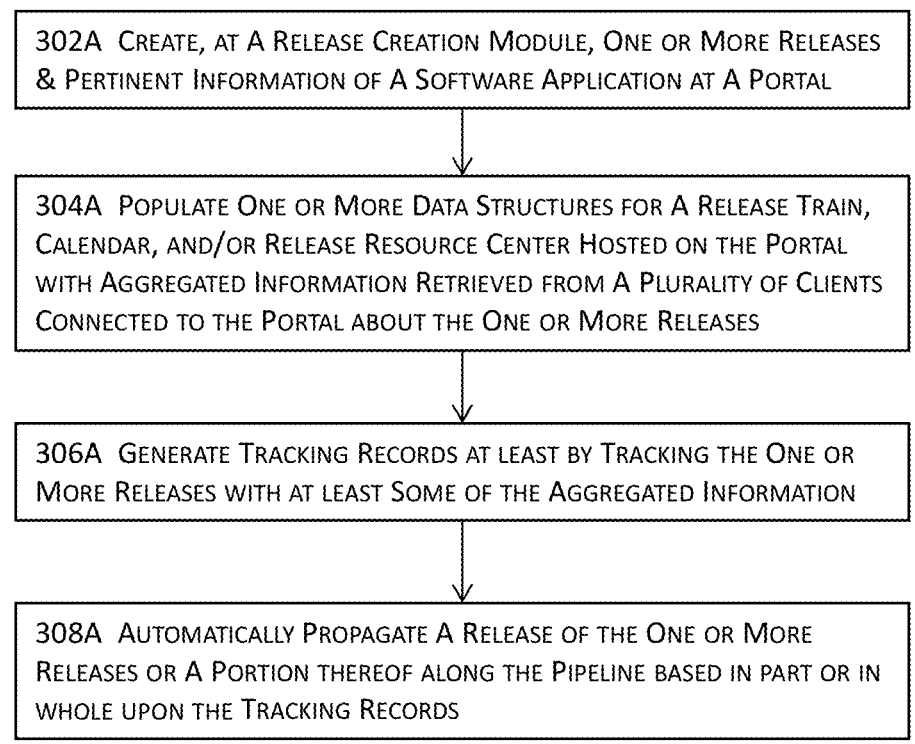
FIG. 3A illustrates a high level block diagram for a system or process for an integrated platform for continuous deployment of software application delivery models in one or more embodiments.

FIG. 3A illustrates a high level block diagram for a system or process for an integrated platform for continuous deployment of software application delivery models in one or more embodiments. In these embodiments, one or more releases and pertinent information for a software application delivery model may be created at 302A. These one or more releases and pertinent information may be created at, for example, a release creation module such as 106A illustrated in FIG. 1A and described above. The pertinent information may include, for example, code modules or segments, artifacts, information about release activities of various tenants for the software application delivery model, and any pertinent information pertaining to a release of the software application delivery model or a portion thereof such as those described with reference to FIGS. 1A-1C and 2A-2T.

Some examples of such pertinent information may include references (e.g., pointers, link structures, symbolic links, uniform resource locators, uniform resource identifiers, etc.) to contents therein or information therefor (e.g., specification, release notes, test results, etc.), database scripts, schemas, global and local configurations and properties, documentation, platform specific objects (e.g., objects such as class files and resources for a Java-based integration framework such as Apache Mule, a Web server environment, etc.), or any tangible byproducts produced during the development of the software application, etc., regardless of whether such pertinent information is releasable, non-releasable, deployable, or non-deployable. More details about creating one or more releases are described with reference to, for example, FIG. 2N as well as the other figures described in or related to the description of FIG. 2N.

One or more data structures on a portal may be populated with aggregated information at one or more granularity levels at 304A. The aggregated information may be aggregated either by pushing individual pieces of information from individual tenant computing systems connected to the portal, by pulling the individual pieces of information from individual tenant computing systems, or by both pulling from individual tenant systems and pushing to the portal from individual tenant systems. These one or more data structures may be configured for different modules described herein such as a release train module (e.g., 112A in FIG. 1A), a release calendar module (e.g., 108A in FIG. 1A), a release resource center module (e.g., 110A in FIG. 1A), a continuous deployment module (e.g., 104A in FIG. 1A), a release creation module (e.g., 106A in FIG. 1A), one or more support modules (e.g., 114A) in FIG. 1A), or any combinations thereof.

In some embodiments, one or more release resource center modules may be configured to store more detailed information about one or more releases in one or more data structures or database tables. For the other modules that utilize or need less information than such more detailed information on the one or more release resource center modules, one or more snapshots or database table views may be selectively generated for these other modules from the more detailed information stored on the one or more data structures or database tables for the release resource center modules.

Tracking records may be generated at 306A by tracking at least one release of the one or more releases. In some embodiments, tracking or monitoring a release may be performed with, for example, a monitoring or tracking module (e.g., 124A in FIG. 1C) that monitors, for example, release activities pertaining to a release and determines whether such release activities occur as scheduled and whether notifications and/or other inquiries are to be disseminated to corresponding tenants. The tracking records may also be stored in one or more separate data structures or database tables or may be added to a data structure or a database table described above with reference to 304A. More details about tracking or monitoring a release of a software application delivery model are described with reference to, for example, FIGS. 2K-2L.

Various components pertaining to a release of the one or more releases or at least a portion of the release are automatically, autonomously, and/or programmatically propagated along a release pipeline at 308A based in part or in whole upon the tracking records. This automatic, autonomous, and/or programmatic propagation of various components for a release not only facilitate a more efficient release and deployment process by eliminating or reducing unnecessary stagnant points along the release pipeline but also conserves computational resources by freeing up or by reducing utilization of computational resources.

For example, storage space that would be otherwise used for storing various components while waiting for other related release activities to occur may be saved; network bandwidth that would be otherwise utilized in redundant or unnecessary communications or transmissions of various data or inquiries to obtain desired data will be reduced due to the aggregation and linking of various pieces of pertinent information pertaining to a release. In addition, processor cycles that would be expended for maintaining such storage space, for such redundant or unnecessary communications, transmissions, or inquiries are also reduced or eliminated. Processor cycles that would also be expended for inefficient access or manipulation of data and inefficient or ineffective determinations due to the lack of sufficient information pertaining to a release or a portion thereof are also reduced or eliminated. Therefore, various embodiments described herein not only improves the current state of the art with a more streamlined and efficient mechanism for software application delivery model release and deployment to address such long-felt challenges and problems in conventional approaches but also improve the general functioning and operations of computing devices as described immediately above as well as in the other portions.

Figure 3B:
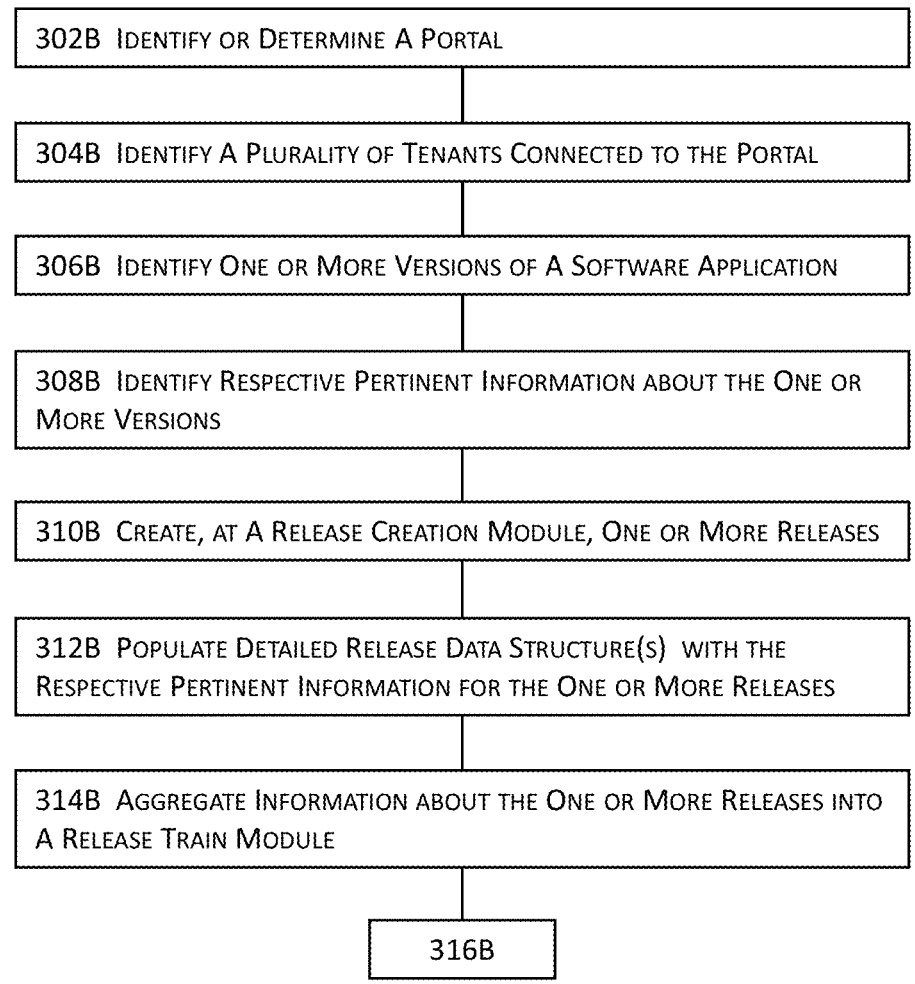
FIGS. 3B-3C jointly illustrate more details about a portion of the high level block diagram illustrated in FIG. 3A in one or more embodiments.
Figure 3C:
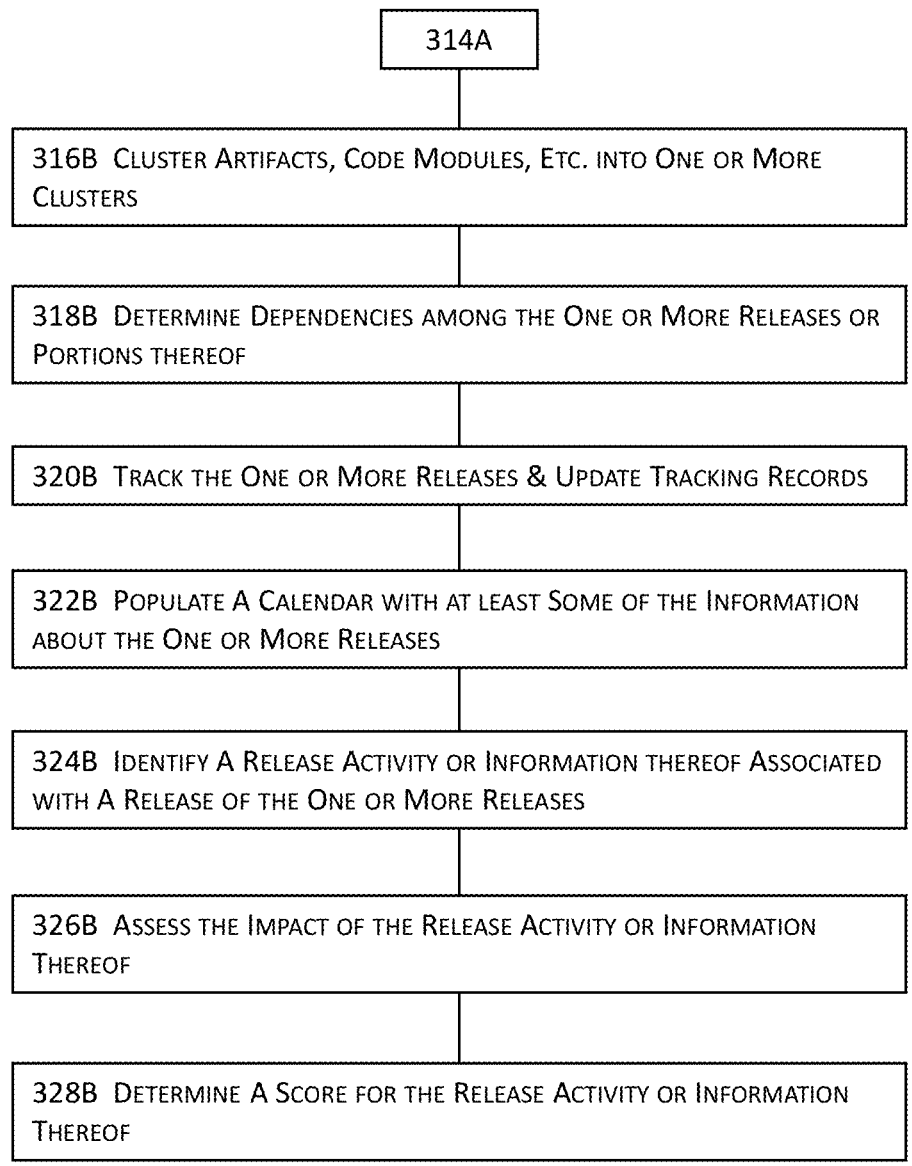

FIGS. 3B-3C jointly illustrate more details about a portion of the high level block diagram illustrated in FIG. 3A in one or more embodiments. In these embodiments, a portion may be identified (if already existing) or determined (if non-existing) at 302B. The portal may be hosted on one or more remote computing systems such as servers or may be implemented as a model for enabling ubiquitous access to shared pools of configurable resources (e.g., the modules described in FIGS. 1A-1C and 2A-2T) that may be quickly provisioned with minimal or reduced management effort over the Internet to allow tenants and enterprises with various computing capabilities to access and process data with more efficient and more reliable mechanisms.

A plurality of tenants that are connected to the portal may be identified at 304B. A tenant may include a team or a member of a team responsible for various activities concerning specification, development, testing, verification, automation, manufacturing, etc. that lead to the eventual release of a software application delivery model. In addition, the term "tenant" may refer to a team or a member of a team in some embodiments and one or more computing systems used by a team or a member of a team in some other embodiments.

One or more versions of a software application delivery model may be identified at 306B. A software application delivery model includes various implementations on various platforms of a software program. These various implementations on various platforms may include, for example, a stand-alone software program installed and executed on a client computing device, a software program hosted or distributed on a remote computing system such as a server, a software licensing and delivery model (e.g., software as a service (SaaS) or software plus services) based on a subscription basis, a software program provided as a part of a cloud computing paradigm, etc. These one or more versions may include, for example, one or more major versions, one or more minor versions, one or more patch versions, or any combinations thereof. For example, if the current version of a software application delivery model is 10.3.07, and the software application delivery model is to undergo some major revision, a revision 11.0.0 may be identified at 306B.

Respective pertinent information concerning the one or more versions for a release of the software application delivery model may be identified at 308B. The pertinent information may include any information pertaining to the one or more versions of the release. For example, the pertinent information may include code modules or segments, artifacts, information about release activities of various tenants for the software application delivery model, and any pertinent information pertaining to a release of the software application delivery model or a portion thereof such as those described with reference to FIGS. 1A-1C and 2A-2T.

Figure 2N:
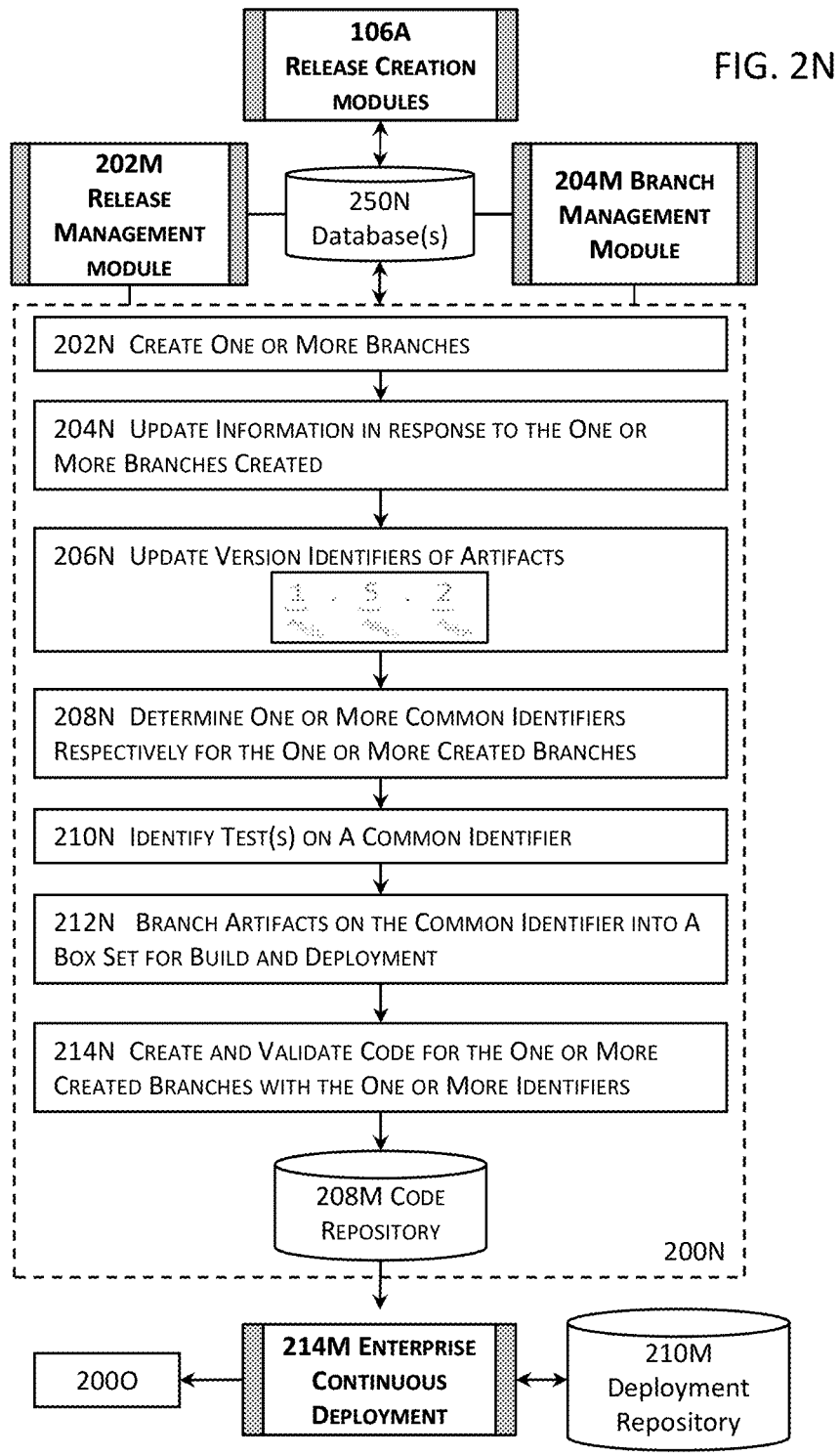
FIG. 2N illustrates more details about an example of the functional aspects of one or more release creation modules illustrated in the high level block diagram in FIG. 1A in one or more embodiments.
Figure 20:
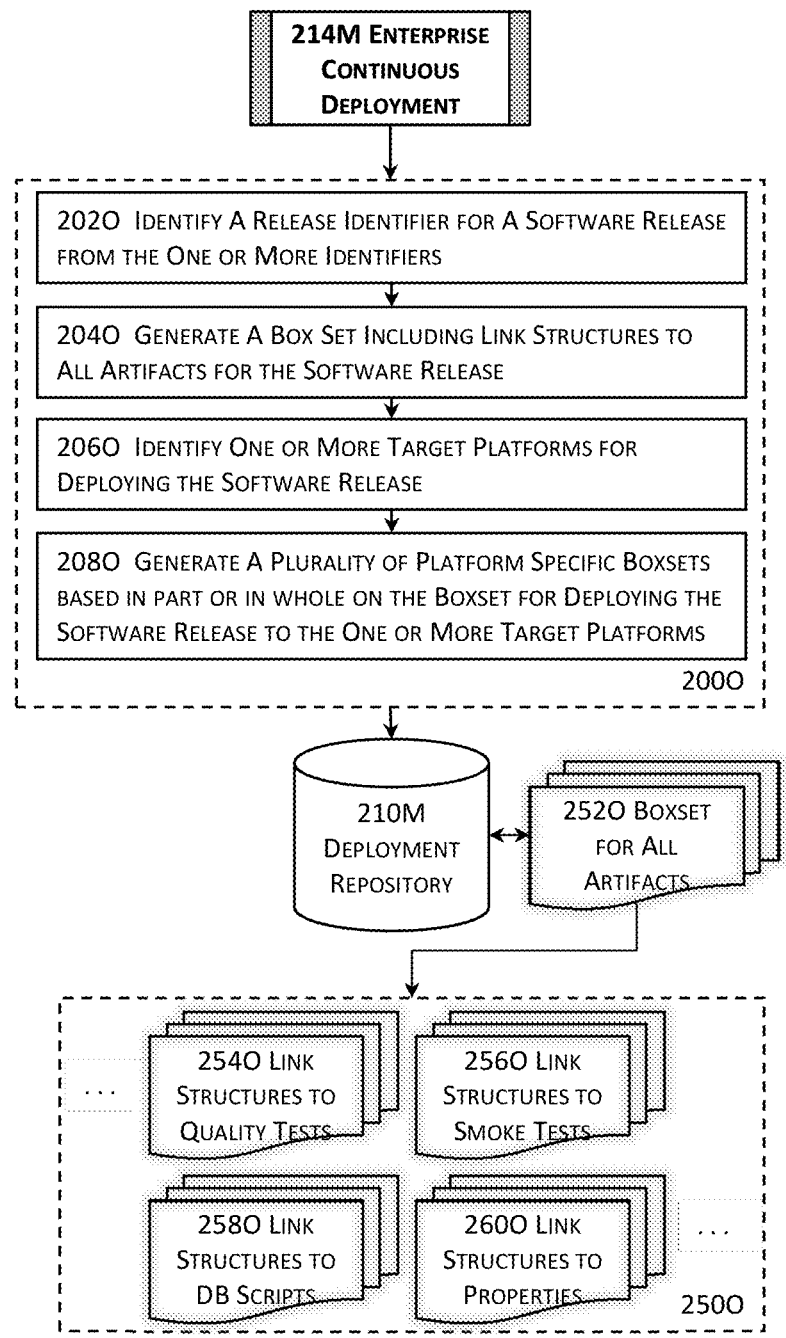
Figure 2P:
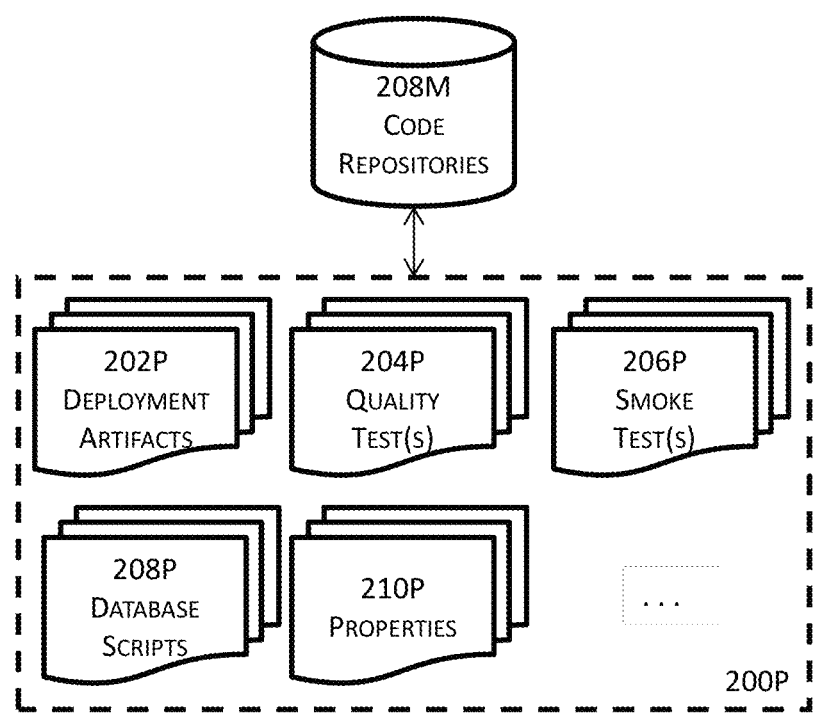
FIG. 2P illustrates more details about an example of one or more code repositories illustrated in the high level block diagram in FIG. 2M in one or more embodiments.
Figure 2Q:
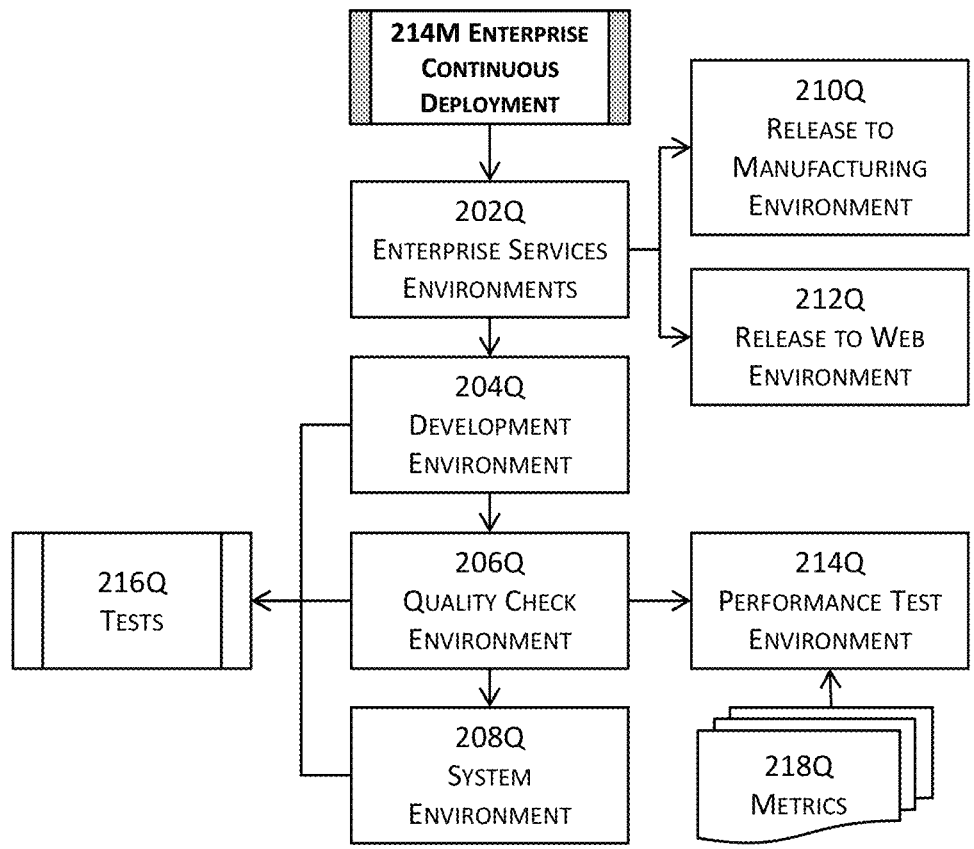
FIG. 2Q illustrates more details about an example of the structural aspect of one or more enterprise continuous deployment modules illustrated in the high level block diagram in FIG. 2M in one or more embodiments.
Figure 2R:
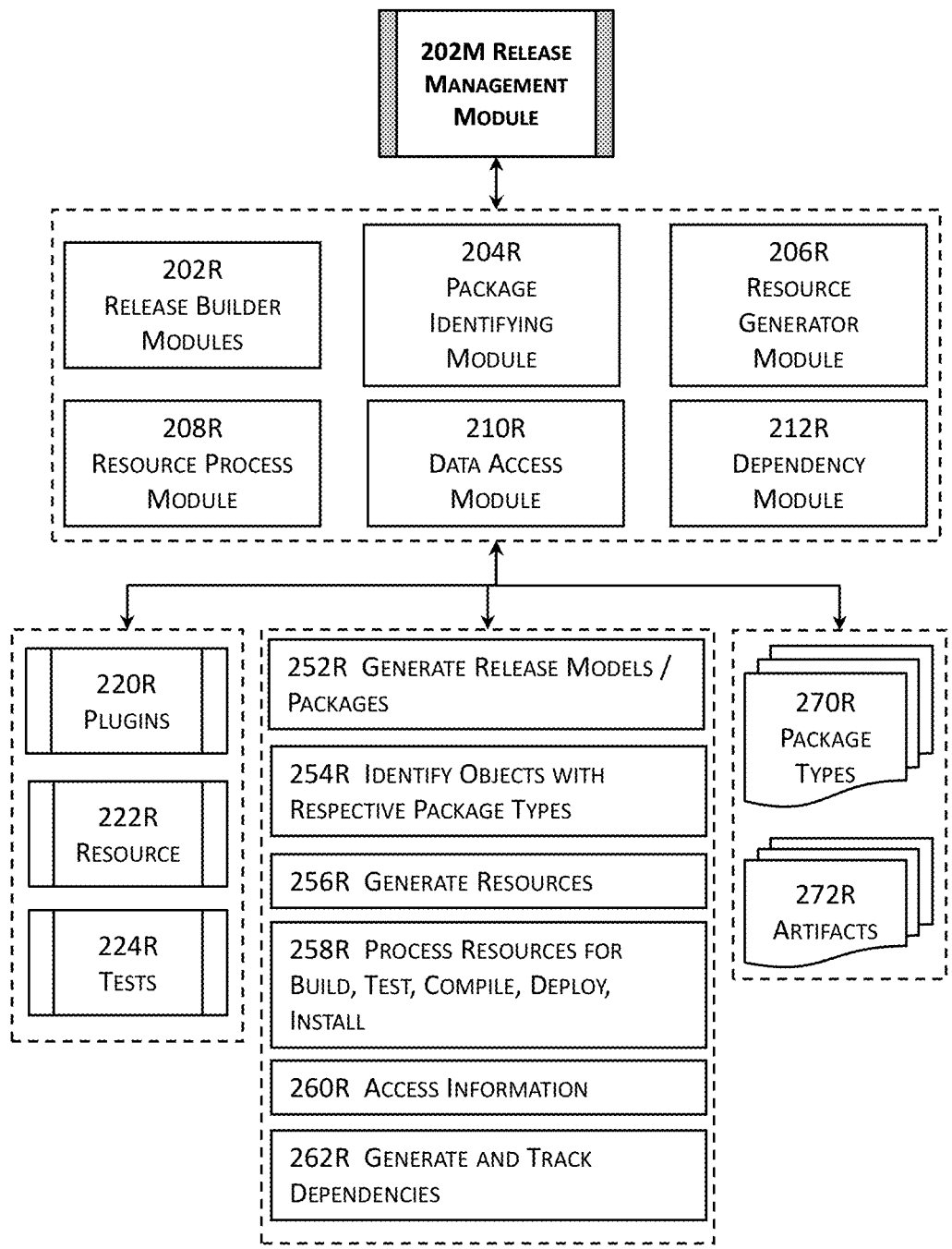
FIG. 2R illustrates more details about an example of one or more release management modules illustrated in the high level block diagram in FIG. 2M in one or more embodiments.
Figure 2S:
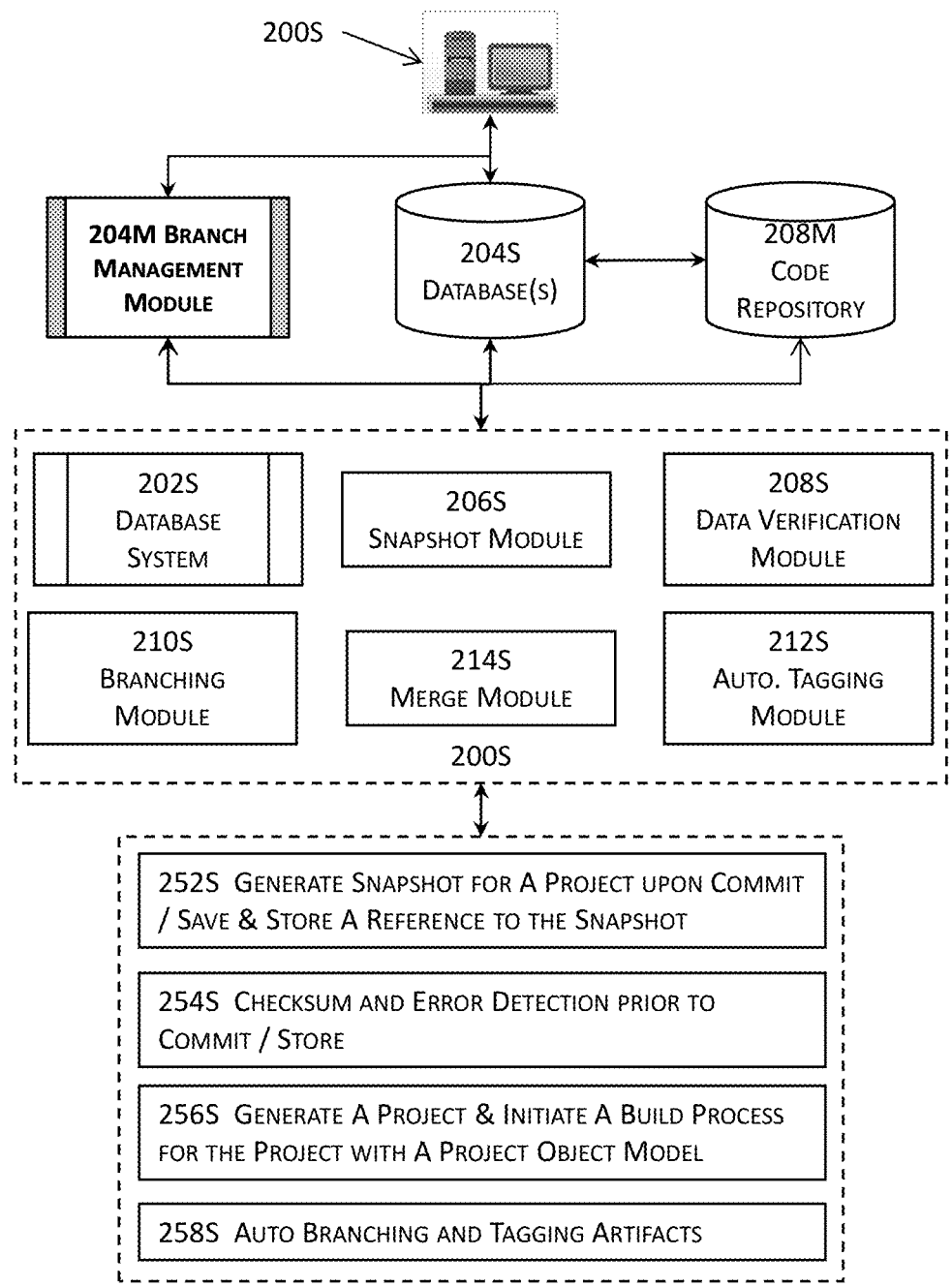
FIG. 2S illustrates more details about an example of one or more branch management modules illustrated in the high level block diagram in FIG. 2M in one or more embodiments.

One or more releases may be created at 3106 by, for example, one or more release creation modules 106A illustrated in FIGS. 1A and 2N and described herein. A release creation module described herein includes or functions in conjunction with at least a release management module (e.g., 202M in FIG. 2N) and a branch management module (e.g., 204M in FIG. 2N) to create various components pertaining to a release and to branch pertinent information into one or more boxsets for the release. More details about the release creation module and the other pertinent modules are described herein with reference to, for example, FIGS. 1A and 2N.

Detailed information or data pertaining to a release may be populated into one or more release data structures or one or more database tables at 312B. These one or more release data structures or one or more database tables may organize such detailed information or data in a hierarchical structure and store the pertinent information according to the hierarchical structure. In some embodiments, one or more release data structures or one or more database tables may even be indexed with one or more key columns in such a way to permit quicker and more efficient access to data or information stored therein. Some examples of release resource center modules are further illustrated in FIGS. 5A-5U and described below. Some examples of an indexed data structure are illustrated in FIGS. 5V-5W and described below. In some embodiments, any information or data, whether releasable, non-releasable, deployable, or non-deployable, may be stored in these one or more release data structures or one or more database tables. In some embodiments, such detailed information or data may be managed by one or more release resource center modules (e.g., 110A in FIG. 1A).

Pertinent information about the one or more releases created at 310B may be aggregated hierarchically and stored in one or more release data structures or one or more database tables at 314B. In some embodiments, a release train module (e.g., 112A in FIG. 1A) may be utilized to manage the aggregation, hierarchical organization and structure, and/or access and manipulations of such aggregated information.

Various artifacts, code modules or segments, etc. may be clustered into one or more clusters at 316B. Clustering these various artifacts, code modules or segments, etc. may be performed with one or more classification module (e.g., 126A and/or 132A illustrated in FIG. 1C) based on one or more criteria. These one or more criteria may include, for example, the functional nature or characteristics of these various artifacts, code modules or segments, etc., the tenants responsible for these various artifacts, code modules or segments, etc., the dependency complexities of these various artifacts, code modules or segments, etc., the impact levels of these various artifacts, code modules or segments, etc., or any other suitable criteria or factors. More details about classification and clustering are described herein with reference to, for example, FIGS. 2B-2G.

Dependencies may be determined among the one or more releases or one or more portions thereof at 318B. For an entity (e.g., an artifact, a code module or segment, etc.) pertaining to a release, dependencies may include the identification of or dependency relations with other entities that depend upon or are affected by the entity as well as the dependency relations between the entity and other entities that may affect the entity or that the entity may depend upon. Dependencies may be determined by a dependency module (e.g., 118A in FIG. 1C). More details about the determination of dependencies and a dependency module are described in, for example, FIG. 2I.

These one or more releases may be tracked at 320B; and the tracking records generated during the tracking or monitoring of the one or more releases may be stored or updated in a data structure at 320B in some embodiments. A monitoring or tracking module (e.g., 124A in FIG. 1C) may be configured to track or monitor releases. More details about monitoring and tracking as well as a monitoring or tracking module are described with reference to FIGS. 2K-2L.

A calendar may be populated at 322B with at least some of the aggregated information determined at 314B for the one or more releases. In actual practice, a calendar can display any information or data pertaining to a release. Nonetheless, a calendar may be programmatically configured to populate relevant data or information on a tenant by tenant basis to reduce or avoid cluttering a calendar and hence reducing its usability. For example, a first tenant's calendar may include the temporal arrangement (e.g., by day, by week, by month, by year, etc.) of data or information that may affect or pertain to the first tenant's release activities, where a second tenant's calendar may include the temporal arrangement (e.g., by day, by week, by month, by year, etc.) of data or information that may affect the second tenant's release activities.

A release activity or pertinent information thereof or therefor associated with a release of the one or more releases may be identified at 324B. The impact of the release activity or the pertinent information may be assessed at 326B. An impact may be assessed in a variety of different manners. For example, an impact of a release activity may be determined based on, for example, the complexity or number of dependency relations between this release activity and one or more other release activities, the potential severity of a dependency relation, the overall influence on the release, etc. An impact may be determined by, for example, an impact assessment module (e.g., 120A in FIG. 1C). More details about impact assessment and an impact assessment module are described with reference to, for example, FIGS. 1C and 2H.

A symbolic or numeric score may be determined for a release activity or pertinent information at 328B. This symbolic or numeric score may provide ready indication of the state of a release activity (e.g., a green light for a release activity to proceed; a red light for a stagnant release activity, etc.) and may further be used to single various modules described to autonomously, automatically, or programmatically move this release activity along the release pipeline. In some embodiments, a scorecard module (e.g., 122A in FIG. 1C) may determine the symbolic or numeric score. More details about score determination and a scorecard module are described with reference to FIGS. 1C and 2J. It shall be noted that various modules described herein may function alone or in conjunction with each other. Therefore, the specific reference to one or more drawing figures for a description of a specific feature may not necessarily indicate that these specifically referenced one or more drawing figures are the only drawing figures pertinent to the description of the specific feature. Rather, other figures and descriptions described herein but not specifically referenced may also provide description for such a specific feature.

Figure 4A:
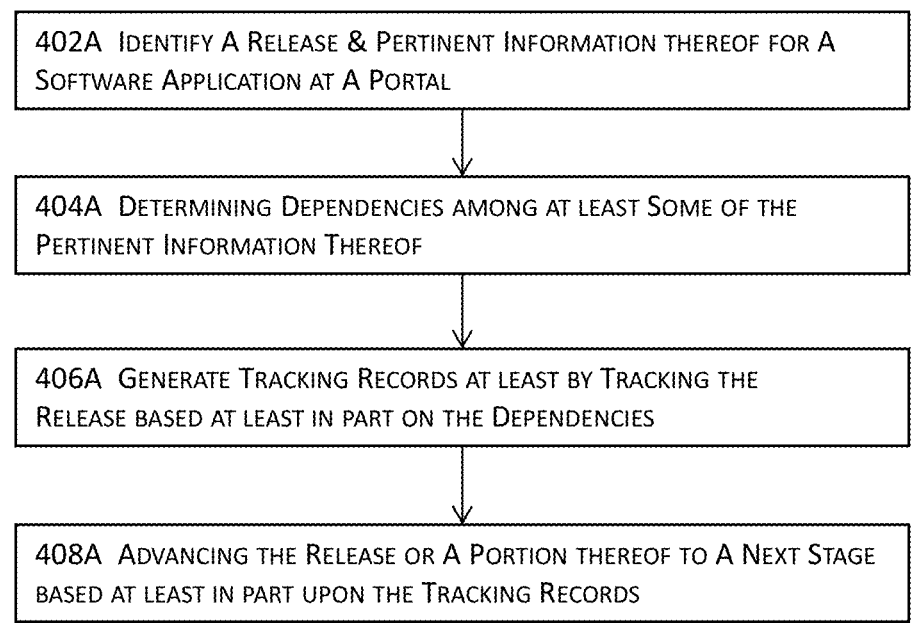
FIG. 4A a high level block diagram for a system or process for automating the release and deployment of a software application delivery model for the continuous release and deployment of the software application delivery model in one or more embodiments.

FIG. 4A a high level block diagram for a system or process for automating the release and deployment of a software application delivery model for the continuous release and deployment of the software application delivery model in one or more embodiments. In these embodiments, a release and pertinent information may be identified at 402A.

As described above with reference to FIG. 3A, the pertinent information may be identified with various modules described herein such as one or more of the modules described in FIGS. 1A-1C and 2A-2T. Moreover, some examples of such pertinent information may include references (e.g., pointers, link structures, symbolic links, uniform resource locators, uniform resource identifiers, etc.) to contents therein or information therefor (e.g., specification, release notes, test results, etc.), database scripts, schemas, global and local configurations and properties, documentation, platform specific objects (e.g., objects such as class files and resources for a Java-based integration framework such as Apache Mule, a Web server environment, etc.), or any tangible byproducts produced during the development of the software application, etc., regardless of whether such pertinent information is releasable, non-releasable, deployable, or non-deployable.

Dependencies may be determined at 404A among at least some of the pertinent information identified at 402A. Dependencies may be determined by a dependency module (e.g., 118A in FIG. 1C). More details about the determination of dependencies and a dependency module are described in, for example, FIG. 2I.

Tracking records may be generated at 406A at least by tracking or monitoring the release or a portion thereof based in part or in whole upon the dependencies determined at 404A. A monitoring or tracking module (e.g., 124A in FIG. 1C) may be configured to track or monitor releases. More details about monitoring and tracking as well as a monitoring or tracking module are described with reference to FIGS. 2K-2L.

The release or at least a portion thereof may be automatically, autonomously, or programmatically advanced at 408A from a current stage or state to the next stage or state along the pipeline for the release. For example, when the system (e.g., the system illustrated in FIG. 1A) determines that a release activity of a tenant is permitted to proceed to the next stage or state after one or more other release activities that may or have hindered the release activity to proceed are cleared, the system may automatically, autonomously, or programmatically advance the release activity to the next stage or state or advance the tenant responsible for the release activity to the next release activity and notify the tenant and one or more other tenants depending upon the tenant accordingly. Data management and manipulation may also be performed by, for example, committing certain data or information into one or more database tables, archiving and backing up permanent and/or temporary data or information, releasing one or more locks imposed on one or more database data or information records, removing temporary files, etc.

Figure 4B:
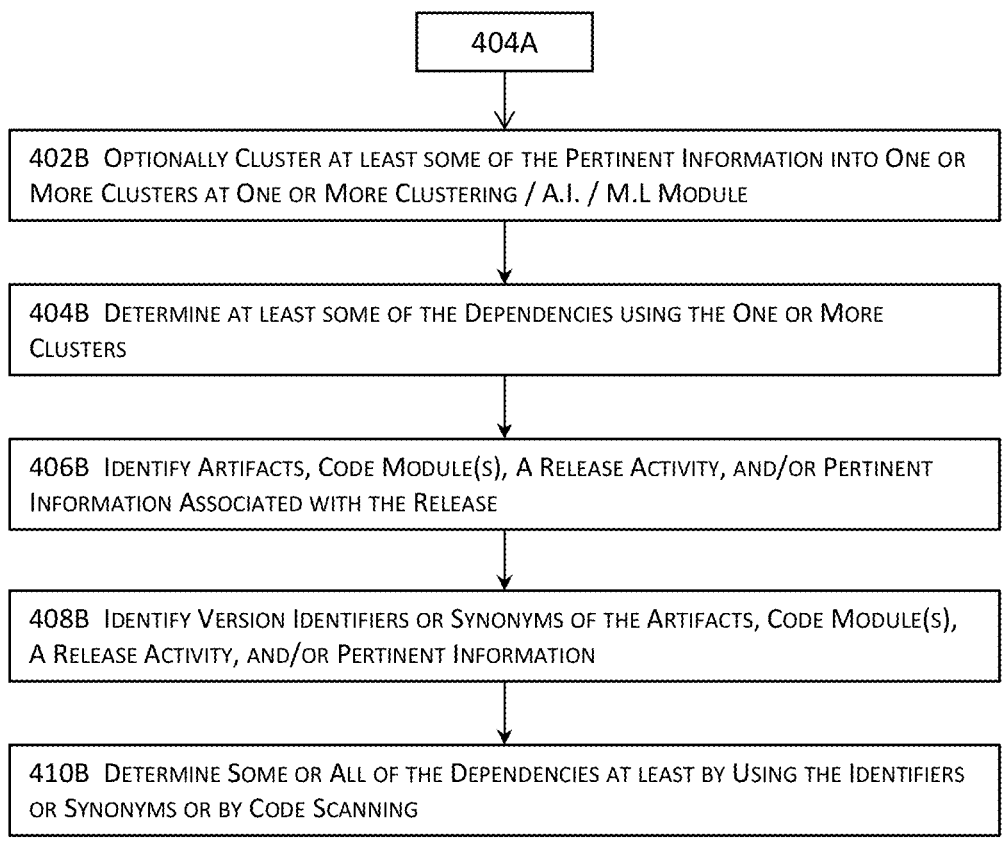
FIG. 4B illustrates more details about a portion of the high level block diagram illustrated in FIG. 4A in one or more embodiments.

FIG. 4B illustrates more details about a portion of the high level block diagram illustrated in FIG. 4A in one or more embodiments. More specifically, FIG. 4B illustrates more details about determining dependencies at 404A illustrated in FIG. 4A. In these embodiments, at least some of the pertinent information may be clustered into one or more clusters at 402B. In some of these embodiments, clustering the pertinent information into one or more clusters may be performed by a classification module (e.g., 126A in FIG. 1C) and/or an artificial intelligence or machine learning module (e.g., 132A in FIG. 1C).

For example, the pertinent information such as an artifact, a release activity, a code segment, a test script or test suite, release notes, specifications thereof or therefor, etc. may be clustered into one or more clusters including development, quality assurance, alpha- or beta-UAT integration, manufacturing UAT integration, etc. by applying one or more clustering techniques described herein so that similar pieces of pertinent information may be clustered into a similar cluster. Such a similar cluster may further be associated with or further clustered into one or more tenant clusters based in whole or in part upon, for example, one or more characteristics (e.g., functional or job description of a tenant) of a plurality of tenants.

Pertinent information may also be classified into one or more clusters based in part or in whole upon, for example, the proximity of such pertinent information with respect to a release stage or state along a release pipeline for a software application delivery model. For example, pertinent information pertaining to similar release activities toward a common goal (e.g., a specific release for a specific stage of release such as a beta release). In these aforementioned examples, classification may be performed on such pertinent information to cluster similar pieces of pertinent information into the same cluster. More details about classification or clustering are described with reference to FIGS. 1C and 2B-2G.

At least some of the dependencies associated with the pertinent information may be determined at 404B. In some embodiments, these at least some of the dependencies may be determined with the one or more clusters determined at 402A. In the aforementioned examples, dependencies for a first code module or segment, for example, may be determined by querying one or more database tables to select activities, artifacts, code modules, or any other pertinent information, etc. by using the identifiers or synonyms of various code modules, artifacts, etc. that correspond to one or more version identifiers or one or more common version identifiers or by performing a code scan on various source code segments to identify which code modules or segments reference the identifier or synonym of the first code module or segment. In this manner, computational resources may be conserved in that such query operations or code scans need not be performed on data or information that is determined to be dissimilar to the first code module by the classification or clustering module.

In some embodiments, this query or code scan may be selectively performed on the database tables or code modules or segments based on the one or more clusters determined at 402B because similar code modules or segments are more likely to reference the first code module or are more likely to affect or be affected by the first code module. More details about dependency determination are described with reference to, for example, FIGS. 1C and 2I.

One or more artifacts, code modules, release activities, or any pertinent information, whether releasable, deployable, or not, may be identified at 406B based in part or in whole upon the dependencies determined at 404B. In the aforementioned examples where the dependencies associated with, for example, a code module have been identified, the corresponding code modules, artifacts, release activities, or any other pertinent information, etc. may be identified at 406B by, for example, a dependency module. In some embodiments, only the releasable or deployable pieces of data or information may be identified at 406B based on the dependencies determined at 404B. In some other embodiments, all such data or information may be identified based on the dependencies at 406B, regardless of whether such data or information is releasable, non-releasable, deployable, or non-deployable.

The dependencies determined at 404B may be based on the one or more clusters determined at 404B. These dependencies are further referenced in the determination or identification of artifacts, code modules or segments, release activities, pertinent information, etc. at 406B. In some embodiments, dependency determination at 404A may terminate at 406B. In some other embodiments, dependency determination may further proceed to cover beyond the data or information corresponding to the one or more clusters determined by the clustering or classification to ensure proper or even complete coverage of the identification of dependencies.

In these embodiments, one or more version identifiers or synonyms of the artifacts, code modules or segments, release activities, pertinent information thereof or therefor, etc. may be identified at 408B. More specifically, the identification is no longer limited or bound by the clustering results determined at 402B. Rather, the identification at 408B may be expanded to all pertinent information or data of the release for which the one or more version identifiers or synonyms of the artifacts, code modules or segments, release activities, pertinent information thereof or therefor, etc. are targeted. In some of these embodiments, the identification may be even expanded to one or more other releases which may also form some dependency relations with a specific code module, artifact, etc. of the release of interest.

Additional dependencies may thus be similarly determined at 410B using the one or more version identifiers or synonyms of the artifacts, code modules or segments, release activities, pertinent information thereof or therefor, etc. identified at 408B. In some embodiments, 408B and 410B may be performed in addition to 404B and 406B based at least in part or in whole upon one or more criteria. These one or more criteria may include, for example, a confidence level of the classification results for classifying the pertinent information of interest into one or more clusters at 402B. For example, if the confidence level of such classification is relatively high, acts 408B and 410B may be safely skipped to conserve computational resources such as memory print to accommodate the additional data or information as well as processor cycles to process such additional data or information beyond what the one or more clusters cover.

Figure 4C:
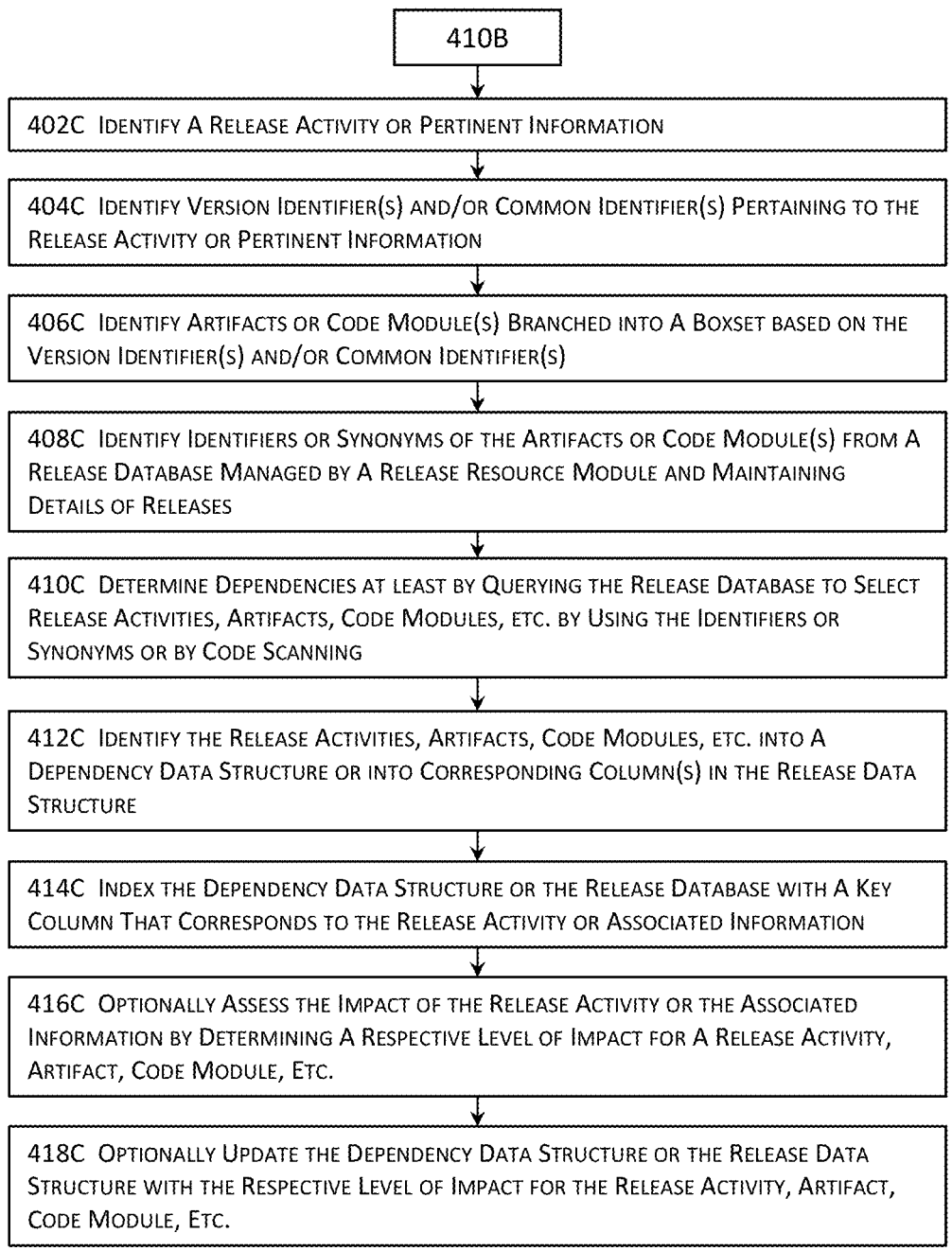
FIG. 4C illustrates more details about a portion of the high level block diagram illustrated in FIG. 4B in one or more embodiments.

FIG. 4C illustrates more details about a portion of the high level block diagram illustrated in FIG. 4B in one or more embodiments. More specifically, FIG. 4C illustrates more details about determining dependencies illustrated in FIG. 4B. In these embodiments, In these embodiments, a release activity or pertinent information (collectively "pertinent information") may be identified at 402C. As described above, the pertinent information for a release activity may include, for example, a release activity, an artifact, a feature, a component, a code segment, references (e.g., pointers, link structures, symbolic links, uniform resource locators, uniform resource identifiers, etc.) to contents therein or information therefor (e.g., specification, release notes, test results, etc.), database scripts, schemas, global and local configurations and properties, documentation, platform specific objects (e.g., objects such as class files and resources for a Java-based integration framework such as Apache Mule, a Web server environment, etc.), any tangible byproducts produced during the development of the software application, or any combinations thereof, etc.

One or more version identifiers and/or one or more common version identifiers pertaining to the pertinent information may be identified at 404C. For example, an example version identifier or an artifact may be N1.N2.N3 (e.g., 10.3.01), where N1 denotes the major release identifier ("10"); N2 denotes the minor release identifier ("3"); and N3 denotes the patch identifier ("01"). Another version identifier may be, for example, version "10.2.08". In these examples, the major release identifier "10" may be deemed a "common version identifier" pertaining to the major release "10"; and the minor release identifiers ("3" in the former example, and "2" in the latter example) as well as the patch identifiers ("01" in the former example, and "08" in the latter example) may be identified at 404C.

One or more artifacts or one or more code modules that have been branched into a boxset may be identified at 406C based in part or in whole upon the one or more version identifiers and/or the one or more common version identifiers. More details about branching artifacts and code modules into a boxset are described below with reference to FIGS. 2M-2T. One or more identifiers or synonyms of these one or more artifacts or code modules may be identified at 408C from a release database that maintains details of various releases and is managed by a release resource module.

Dependencies for the pertinent information identified at 402C may be determined at 410C. In some embodiments, dependencies may be determined for the pertinent information at least by querying the release database to select release activities, artifacts, code modules, or any other pertinent information, etc. by using the identifiers or synonyms identified at 408C. In some other embodiments, dependencies may be determined for the pertinent information at least by performing a code scan on a plurality of release activities or information therefor, a plurality of code modules, artifacts, pertinent information, etc. to identify the release activities or information therefor, code modules, artifacts, pertinent information, etc. that contain one or more references of the identifiers or synonyms identified at 408C.

The release activities or information therefor, code modules, artifacts, etc. that are determined to be pertinent to the dependencies determined at 410C may be identified at 412C. In some embodiments, at least some of such release activities or information therefor, code modules, artifacts, etc. may be stored at 412C into the respective columns of a data structure or a database table (e.g., a relational database table) corresponding to the pertinent information identified at 402C. Some examples of such a data structure are illustrated in FIGS. 5V-5W and described below.

The data structure or the database table may be indexed at 414C with one or more key columns that correspond to the pertinent information. Such an indexed data structure or database table may facilitate the access to and identification of data records with operations such as database query operations. For example, the data structure or database table may be indexed in such a way so that the data records therein are sorted with respect to one or more keys so that any query seeking to identify a specific data record needs not traverse an entire column (e.g., an identifier column) to identify the desired data record. Rather, indices may be used to quickly locate the desired data record for both random lookup and access of such ordered data records in the data structure or database table, without having to search every row in the data structure or database table each time the data structure or database table is accessed. In some embodiments, these index columns may be included in the data structure or database table. In some other embodiments, these index columns may be stored in a separate data structure or database table.

The impact of the pertinent information may be optionally assessed at 416C at least by determining a respective level of impact of the pertinent information on one or more release activities, artifacts, code modules, pertinent information therefor or thereof, etc. by utilizing an identical or substantially similar approach as that described above with reference to FIG. 2H. Similarly, one or more other impact levels of one or more other release activities, artifacts, code modules, pertinent information therefor or thereof, etc. on the pertinent information identified at 402C may also be optionally, similarly determined. The data structure or the database table may be optionally updated at 418C with the impact level and/or the one or more other impact levels optionally determined at 416C.

FIGS. 2A-2T illustrate various functional and/or structural details of various modules described herein. Some or all of these modules may function in conjunction with each other to facilitate the performance of various functions described herein. Therefore, the specific reference to one or more drawing figures for a description herein may not necessarily indicate that these specifically referenced one or more drawing figures are the only drawing figures pertinent to the description. Rather, other figures and descriptions described herein but not specifically referenced may also provide description for such a specific feature.

FIG. 2A illustrates more details about some example of one or more software testing modules illustrated in the high level block diagram in FIG. 1A in one or more embodiments. More specifically, FIG. 2A illustrates more details about the one or more software testing modules 114A for a software application with various tests or test suites to evaluate various aspects of the software application. A software testing module 114A may thus include exercising the execution control, instruction simulations, and/or step-by-step execution and breakpoints insertion, etc. for the software application at 232A, performing benchmarks to determine runtime performance comparisons at 234A, and performing performance analyses at 236A to identify hot spots and resource utilization of the software application.

Software testing under these techniques described herein may invoke one or more modules 250A that may include, for example, a component testing module 202A that performs unit testing for one or more individual components in the software application under test.

According to the techniques described herein, software testing may also include invoking an integration testing module 204A that verifies the interfaces and interactions between individual software application components. Moreover, these techniques described herein may provide the capabilities of integrating individual software application components interactively or automatically in a flat or hierarchical manner to expose bugs or defects in the interfaces or interactions among individual software application components according to the architecture of the software application.

In addition or in the alternative, a system testing module 206A may be invoked to perform system testing that tests an integrated software application to determine whether the integrated software application meets various requirements for the software application. Also, a development testing module 208A may be invoked to apply various procedures to detect, reduce, or eliminate defects or to reduce or eliminate construction errors in the software application during the development stage in, for example, the development environment. The development testing module 208A is often invoked prior to the invocation of the quality testing module 216A that verifies the software application and the software engineering process to detect and reduce the number of defects or faults to a level below the acceptable software fault threshold. In some embodiments, the quality testing module 216A compares the expected results of a software application with the actual test results generated by one or more sets of inputs.

A smoke testing module 210A may also be invoked to perform one or more smoke tests that respective include a minimal or reduced set of tasks to operate a software application in order to determine whether the software application exhibits any issues preventing the software application from functioning or whether the software application may undergo further testing. In addition or in the alternative, a regression testing module 212A may be invoked to discover unintended software behaviors or regressions such as degradations, fixed yet recurring bugs, missing features, etc.

The software testing with the techniques described herein may also invoke performance testing module 214A that determines how the software application or any portion thereof performs in terms of responsiveness, stability, reliability, scalability, computational resource utilization, etc. under one or more workloads. A compatibility testing module 218A may also be invoked to check the compatibility among different individual components or different modules of a software application as well as the compatibility between the software application and the operating systems, one or more other software application, etc. Each of these tests may be deployed to a different recipient. For example, quality tests may be deployed to the quality testing team; and development tests may be deployed to the development team; etc.

In developing, bundling, and deploying these tests, these techniques may identify a set of requirements, rules, or constraints (collectively requirements) at 252A for a software application. As described earlier, these techniques track artifacts, packages, and boxsets as they are being created or modified. These techniques may thus optionally identify changes, if any, made to a software application or a portion thereof since the last release or commit at 254A. These techniques may further automatically determine one or more test strategies, one or more test plans, etc. at 256A for one or more upcoming tests on the software application. In some embodiments, these one or more test strategies, one or more test plans, etc. may be developed automatically without any human intervention by using, for example, artificial intelligence techniques (e.g., neural networks, machine learning, etc.) or heuristics.

In some other embodiments, these one or more test strategies, one or more test plans, etc. may be interactively developed by, for example, presenting a test developer with a set of questionnaires or a set of interview questions and formulating these one or more test strategies, one or more test plans, etc. according to the responses of the test developer. These techniques described herein may also develop test cases, test procedures, test scenarios, etc. at 258A either automatically or interactively as described above for the development of the one or more test strategies, one or more test plans, etc. In addition, these techniques may execute one or more pertinent sets of tests at 260A for various purposes as described above. The results of these one or more tests may be benchmarked or analyzed at 262A and presented for review, and these techniques may further automatically fix bugs with or within human intervention and close these one or more tests at 264A.

FIG. 2B illustrates more details about some example of one or more classification or clustering modules and artificial intelligence and/or machine learning modules illustrated in the high level block diagram in FIG. 1A in one or more embodiments. More specifically, FIG. 2B illustrates details about a classification or clustering module 126A and an artificial intelligence and/or machine learning module 132A. It shall be noted that the terms classify and cluster as well as their variants or equivalents (e.g., classifying and clustering, etc.) may be used interchangeably to refer to the determination of one or more classes or clusters of an input. For example, In these embodiments, pertinent information may be identified at 202B for a software application or a portion thereof. Such pertinent information may include, any information pertaining to the software application or a portion thereof. For example, an artifact, a code module or segment, a release activity, references (e.g., pointers, link structures, symbolic links, uniform resource locators, uniform resource identifiers, etc.) to contents therein or information therefor (e.g., specification, release notes, test results, etc.), database scripts, schemas, global and local configurations and properties, documentation, platform specific objects (e.g., objects such as class files and resources for a Java-based integration framework such as Apache Mule, a Web server environment, etc.), or any tangible byproducts produced during the development of the software application, etc., regardless of whether such pertinent information is releasable, non-releasable, deployable, or non-deployable.

A classifying or clustering module 126A may then determine one or more classes at 204B for the pertinent information. Some examples of classification or clustering are described below with reference to FIGS. 2C-2G.

FIGS. 2C-2D jointly illustrate more details about a portion of FIG. 2B in one or more embodiments. More specifically, FIGS. 2C-2D jointly illustrate more details about the determination of classes for some input pertinent information. In these embodiments illustrated in FIGS. 2C-2D, the pertinent information may be identified at 202C from an electronic tax return software application licensing or delivery model.

As described above, the pertinent information may include any information pertaining to the development, testing, integration, release, deployment, etc. of a software application delivery model. Such pertinent information may be aggregated and/or stored in a central repository such as a single data structure in some embodiments or in multiple linked data structures for subsequent reuses.

For example, the pertinent information identified at 202C may be stored in a single database including a user column that stores a plurality of unique identifiers of a plurality of artifacts of a software application delivery model where each unique identifier uniquely corresponds to, for example, a specific artifact in a first column in some embodiments. The unique user identifiers may be used as a primary key of the database for database manipulations and operations to facilitate faster access and identification of the pertinent information or any other correlated information.

In some other embodiments, the aforementioned information or data may be stored in a plurality of data structures that are linked by, for example, the unique identifications that may also serve the function of keys or indices for additional operations (e.g., query operations) in some other embodiments. Such additional information may include any other information pertaining to, for example, an artifact being classified but is not used in determining clusters.

Optionally, additional information that is also expressed in natural language or in one or more programming languages may also be identified at 404C. This addition information optionally identified at 404C may be further used to verify, fine tune, or modify the classes and/or the recommended actions or classes thereof. For example, such additional information may be similarly processed with word embedding or term embedding techniques as the inquiry for classification purposes to determine the accuracy of the classification results and/or the recommended actions for the inquiry or to generate one or more additional classes and/or recommended actions for the inquiry in place of or in addition to existing classes and/or recommended actions. In some embodiments, such additional information may include any natural language, free text, and/or computer programming language entries.

The pertinent information and optionally the additional natural language or free text information may be normalized into normalized information at 206C. Normalization of the inquiry transforms the tokens (e.g., characters, words, phrases, sentences, paragraphs, or even documents) in the inquiry into a normal, canonical, or standard (collectively standard) form that uniquely represents the token as well as one or more other equivalent tokens. For example, all characters in the data set may be mapped to the Unicode expression; letters may be transformed into the lower case; different tenses of the same verb (e.g., fly, flies, flew, flown) may be converted into the same tense (e.g., fly); and/or singular and plurality tokens may be transformed into the same form (e.g., singular); etc. Normalization thus not only transforms tokens into standard forms but also reduces the size of the data set due to, for example, the transformation of various tenses of verbs into the same tense and transformation of plural nouns into singular forms.

In addition or in the alternative, one or more reduction techniques may be applied to the data set or the normalized data set to further reduce the size. For example, punctuations may be removed. In some embodiments, one or more stop or function words or phrases (e.g., auxiliary verbs, some pronouns such as which, what, I, you, she, he, we, etc.) and/or one or more lexical words or lexical phrases that have little or ambiguous meaning may be filtered out from subsequent processes such as vectorization and clustering. Names of named entities (e.g., New York Times as the newspaper) may also be optionally extracted although the subsequent word embedding or term embedding processing may nevertheless learn these names. These filtered out words or phrases may be determined not to add value or usefulness. Stop or function words and phrases contribute primarily to the grammatical structures of tokens, rather than the meanings or contents thereof.

A plurality of classes for a plurality of inquiries may be identified (if already existing) or determined (if not yet existing) at 208C by applying word embedding or term embedding techniques to the normalized information and normalized inquiries. In some embodiments, the application of word embedding or term embedding techniques to the normalized information transforms the tokens in the normalized information into vector representations in a vector space. The word embedding or term embedding techniques transform more similar tokens in the normalized information into vectors representations that are in closer proximity in terms of the respective directions and magnitudes of these vector representations but not necessarily in terms of their respective origins in the vector space.

A plurality of recommended actions may be identified (if already existing) or determined anew (if not yet existing) at 210C for the plurality of classes. These recommended actions may be ranked. In some embodiments, each class is separately processed to determine one or more recommended actions therefor. In these embodiments, the pertinent information and optionally the additional information, expressed in natural language, free text, or computer programming languages, may be identified and similarly normalized, vectorized, and clustered into one or more classes. In some other embodiments, a plurality of recommended actions may be determined for the plurality of classes as a whole. In these latter embodiments, the natural language or free text inquiries or additional information provided by users in all of the plurality of classes may be identified altogether and similarly normalized, vectorized, and classified for the plurality of inquiries as a whole.

Acts 202C through 210C determine the plurality of classes and the plurality of recommended actions for the pertinent information identified at 202C and optionally the additional information identified at 204C for a software application delivery model (e.g., an electronic tax return preparation and filing software application licensing or delivery model). These classes may be determined by processing various pieces of data (e.g., historical data of one or more prior versions of the software application delivery model). Some embodiments may further update such classes with the current information of the current version of the software application delivery model. Each class corresponds to one or more recommended actions that may be further ranked. The plurality of classes and the plurality of recommended actions identified or determined above may be used to serve the functions including, for example, providing notifications, aggregation of information according to the classes determined for the information, priority determination, etc.

At 212C, one or more classes may be determined for the pertinent information identified at 202C. A single class for the pertinent information may be optionally determined at 214C based in part or in whole upon a criterion. For example, the single class may be determined via validation by the pertinent information or by using other information (e.g., the additional information identified at 204C) that may be similarly processed by word embedding or term embedding techniques to determine the single class that better or best fits the user's specific inquiry. For example, similarity scores (e.g., a metric as measured by cosine similarity) may be determined between such other information and the plurality of classes (e.g., between such other information and the respective exemplars of these one or more business clusters). Alternatively, distance values between the vector representation of such other information and those of respective exemplars of the plurality of classes may be determined to select the single class for the pertinent information identified at 202C.

One or more recommended actions may be identified at 216C for the one or more classes or the optionally determined single class for the pertinent information. Because a plurality of recommended actions has been determined for a plurality of pieces of pertinent information at 210C, these one or more recommended actions may be selected at 216C from the results of 210C for each class of the one or more classes (e.g., selecting top N recommended actions for each class) determined at 210C or the single class optionally determined at 214C.

These one or more recommended actions identified at 216C may be optionally ranked at 218C based on one or more criteria in an identical or substantially similar manner as that described above. Criteria such as one or more weighted combinations of a plurality of criteria may be used to rank the recommendation actions to reflect the corresponding significance of these recommendation actions for a plurality of pieces of pertinent information that has been similarly processed. At least one of the one or more recommended actions may then be identified at 220C as a recommended action in response to the pertinent information in the software application delivery model. The classification results may then be saved in a data structure for subsequent reuse. For example, various pieces of pertinent information may be stored in a column of a data structure; and their corresponding vector representations may be stored in another column of the data structure.

Taking an electronic tax return preparation and filing software application delivery model as an example of the application of word or embedding techniques, a tenant accessing an electronic tax return preparation and filing software application delivery model may provide various pieces of information in the form of natural language via an input device (e.g., a keyboard, a microphone, etc.) of a computing device.

The electronic tax return preparation and filing software application delivery model may be a standalone installation that locally executes on the computer in some embodiments. In some other embodiments, the electronic tax return preparation and filing software application delivery model may be hosted on a remote computer, on an Internet-based computing environment providing shared computer processing resources and data to computers and other devices on demand (e.g., in a cloud computing environment) for a plurality of tenants working toward a release of the software application. In these latter embodiments, the tenant may access the electronic tax return preparation and filing software application delivery model during various stages of a release via, for example, a browser on a tenant computing device operatively connected to the remote host via a computer network component.

The tenant may be operating on or connected to a computing system that includes or operatively connects to one or more word embedding or term embedding modules. This computing system may be the computing device when the electronic tax return preparation and filing software application delivery model is a standalone installation. The word embedding or term embedding modules included or associated with the computer may perform various word embedding or term embedding processes on natural language or free text inputs (e.g., tenant inquiries, release notes, specifications of the software application delivery model, etc.) of a software application delivery model. These natural language or free text inputs may be provided by a plurality of tenants accessing (e.g., creating new code modules or artifacts, modifying existing code modules or artifacts, etc.) the software application delivery model.

These word embedding or term embedding processes may include, for example, normalization of the natural language inputs into normalized tokens such as characters, words, phrase, sentences, or even documents. These normalized tokens may be further embedded into a vector space. More specifically, one or more word embedding or term embedding processes may transform these normalized tokens into corresponding vector representations where closer vector representations correspond to more similar normalized tokens and hence more similar natural language inputs.

These word embedding or term embedding modules may further classify the natural language or free text inputs into a plurality of clusters. These classification processes may be performed independently of each other or in a hierarchical manner. In the aforementioned examples, the business clusters and expense categories may be performed independently of one another to determine the clusters for a plurality of tenants in some embodiments. In some other embodiments, such clustering may be performed in a hierarchical, multi-stage manner where a plurality of descriptions of businesses or professions may be first clustered into a plurality of business clusters.

The normalization, vectorization, and clustering processes may be performed offline in some embodiments due to the vast amount of natural language inputs to process and thus may not be suitable for storage or processing on a tenant computing device. The results of the normalization, vectorization, and clustering processes may nevertheless be stored locally on a tenant's computing device in some embodiments. In some other embodiments, the results of the normalization, vectorization, and clustering may be stored remotely (e.g., on a computer server hosting the portal) for tenant computing devices to access via one or more computer networks.

With these vector representations determined, these processing results of the one or more word embedding or term embedding modules may be further utilized by a software application licensing or delivery model. In the aforementioned example involving tax returns, a specific tenant may access an electronic tax return preparation and filing software application delivery model and submit a particular inquiry (e.g., artifacts, source code modules, etc.) via an input device (e.g., a computer mouse, a touch interface, a virtual or physical keyboard, a microphone, etc.) of the computing device.

This specific inquiry may be similarly processed by one or more word embedding or term embedding modules that execute locally in a standalone installation or remotely in a hosted or cloud environment. For example, this specific inquiry may be normalized into normalized description which may be further transformed into a specific vector representation in the same vector space that now includes the specific vector representation with other vector representations for the descriptions from a plurality of tenants of the electronic tax return preparation and filing software application licensing or delivery model. This specific inquiry of the specific tenant may then be classified into one or more classes. One or more actions (in one or more classes) corresponding to these one or more classes may also be identified. These one or more actions may include, for example, the action classes that are associated with the one or more classes.

At least one of these one or more actions may be presented to the specific tenant in a variety of different manners such as a corresponding screen or link in the portal. A more complex, automated task such as initiating one or more modules in response to the at least one action may also be constructed for the specific tenant. For example, a notification may be distributed to one or more other tenants when a specific tenant modifies a code module or an artifact on which the release tasks of the one or more other tenants depend. As another example where an issue (e.g., a modified artifact is awaiting approval, a code module is detected to have bugs, etc.) is detected during tracking or monitoring a release, one or more corresponding modules (e.g., a module to display a screen for approval together with pertinent information about what is awaiting approval, a module to initiate a debugging screen for modifying an artifact or code module, etc.) Because these one or more actions are identified from one or more classes to which the specific tenant is determined to belong based on the specific inquiry provided by the specific tenant, these one or more actions may thus represent recommended actions or candidate actions in response to the specific inquiry submitted by the specific tenant.

If the specific tenant also provides additional natural language inputs (e.g., additional inputs in response to automatically generated customized chat question(s)), these additional natural language inputs may also be similarly normalized, vectorized, and clustered. A data model may then classify the specific inquiry while referencing these additional inputs as described above.

More details and/or examples are described below for applying word or term embedding techniques for clustering a data set (e.g., a set of artifacts, code modules, etc.) For example, a data set including natural language tokens (e.g., characters, words, phrases, sentences, paragraphs, and/or documents) for a plurality of tenants may be identified as an input to a word embedding or term embedding module. As described above, tenants may include natural persons, entities such as corporate entities, or a combination of one or more natural persons and one or more entities.

The data set or a reduced version thereof is thus transformed into vector representations in a vector space where more similar language tokens are transformed into vector representations in closer proximity of each other in the vector space having a plurality of dimensions. The data set may include a large number of tokens (e.g., billions of words, millions of phrases, etc.) some of which may not necessarily be useful even when transformed into vector representations. On the other hand, vectorizing the data set requires computational resources that are proportional to the product of the number of tokens to be vectorized and the degrees of freedom. The data set may thus be normalized into a normalized data set and optionally reduced in size by using one or more reduction modules.

Normalization of the data set transforms the tokens in the data set into a normal, canonical, or standard (collectively standard) form that uniquely represents the token as well as one or more other equivalent tokens. For example, all characters in the data set may be mapped to the Unicode expression; letters may be transformed into the lower case; different tenses of the same verb (e.g., fly, flies, flew, flown) may be converted into the same tense (e.g., fly); and/or singular and plurality tokens may be transformed into the same form (e.g., singular); etc. Normalization not only transforms tokens into standard forms but also reduces the size of the data set due to, for example, the transformation of various tenses of verbs into the same tense and transformation of plural nouns into singular forms.

One or more reduction techniques may be applied to the data set or the normalized data set to further reduce the size. For example, punctuations may be removed. In some embodiments, one or more stop or function words or phrases (e.g., auxiliary verbs, some pronouns such as which, what, I, you, she, he, we, etc.) and/or one or more lexical words or lexical phrases that have little or ambiguous meaning may be filtered out from subsequent processes such as vectorization and clustering. Names of named entities (e.g., New York Times as the newspaper) may also be optionally extracted although the subsequent word embedding or term embedding processing may nevertheless learn these names. These filtered out words or phrases may be determined not to add value or usefulness. Stop or function words and phrases contribute primarily to the grammatical structures of tokens, rather than the meanings or contents thereof.

For example, a word embedding or term embedding module may customize a set of stop and/or function words and phrases to include auxiliary verbs (e.g., be verbs, can, must, need, etc.), articles (e.g., the, a, an, etc.), and/or some pronouns (e.g., which, what, etc.) These words primarily contribute to the grammatical meaning of a phrase or sentence but have limited or no usefulness in determining the semantic meaning of the phrase or sentence. In some other embodiments, a word embedding or term embedding module may iteratively customize the set of stop and/or function words to fit the intended functions of the underlying software application delivery model so as not to mistakenly filtering out words that may actually contribute to determining the similarity of tokens.

A dictionary or a data structure including unique tokens may be optionally generated. The unique tokens in this dictionary or data structure will be sent to a word embedding or term embedding module that transform these unique tokens into corresponding vector representations. Prior to actually transforming these unique tokens, the word embedding or term embedding module or the artificial intelligence modules therein may be trained with one or more training instances.

A training instance may include one or more analogical reasoning tasks that include words, phrases, etc. as well as vector arithmetic and/or additive compositionality to iteratively calibrate the word embedding or term embedding module in a supervised, unsupervised, or reinforcement learning environment. An example of an analogical task is "A is to B as C is to D" such as "man is to woman as king is to queen", "man is to woman as uncle is to aunt", etc. Another example of an analogical reasoning task involving vector arithmetic is "king−man+woman=?"; and the word embedding or term embedding module is trained to determine the answer to be "queen".

In some embodiments, predictive models such as the continuous skip-gram model, continuous-bag-of-words (CBOW), non-linear sigmoidal recurrent neural networks, distributed memory (DM), distributed bag of words (DBOW), etc. may be used with non-uniform, adjustable weight matrices, instead of uniform weight matrices assigning an equal weight to all tokens, may be used in a word embedding or term embedding module, and the training adjusts the weights of tokens so that the word embedding or term embedding module correctly determines the answers to the analogical reasoning tasks in the training instances. The word embedding or term embedding modules may be derived from Word2vec algorithm, the Doc2vec algorithm, the locally linear embedding (LLE), etc. with adjustable weight matrices that assign lower weights to tokens that are known to cause incorrect or imprecise clustering results and/or assign higher weights to tokens that are known to cause more correct or precise clustering results, whereas the aforementioned algorithms have been proven to cause incorrect or imprecise clustering results for financial management software application delivery models.

Once the word embedding or term embedding modules are trained to achieve desired accuracy with the one or more training instances, the tokens in the dictionary, the normalized data set, or the reduced, normalized data set may be transformed into corresponding vector representations where more similar tokens are transformed into vector representations that are in closer proximity to each other in the vector space. The vector representations may be stored with the or associated with the corresponding tokens in the same or in a different data structure; and an individual vector representation may be access by, for example, "model ['computer']# raw NumPy vector of a word with the returned result of "array([−0.00449447, −0.00310097, 0.02421786, . . . ], dtype=float32)".

The word embedding or term embedding modules may further be optionally improved or optimized using techniques such as the hierarchical softmax technique, the negative sampling technique, the softmax technique, the noise contrastive estimation (NSE) technique, the subsampling of frequent words technique, etc. As described above, the data set or corpus may include an enormously large number of tokens and hence vector representations, the improvement or optimization is to reduce the number of updates per training instance or per training task. For example, the data set may include billions of words, tens of millions of phrases, and millions of sentences, each of which may be transformed into a vector representation having hundreds of dimensions.

These improvement or optimization techniques thus further reduce the utilization of computational resources. For example, a word embedding or term embedding module may invoke the hierarchical softmax technique that uses a Huffman tree to reduce computation intensity, especially targeting infrequent tokens. As another example, a word embedding or term embedding module may invoke the negative sampling technique that minimizes the log-likelihood of sampled negative instances, especially for frequent tokens. In addition or in the alternative, sub-sampling of frequent words during training may also be utilized to result in speedup and improve accuracy of the vector representations of less frequent tokens.

The dimensionality of the vector space may also be improved or optimized. Generally, the quality of word embedding or term embedding increases as the dimensionality of the vector space increases. Nonetheless, the increase in quality of word embedding or term embedding slows down as the dimensionality of the vector space reaches a threshold number beyond which the accuracy results in a limited return that is disproportional to the increase in dimensionality and hence in computational intensity. Therefore, the word embedding or term embedding module may impose a threshold limit on the dimensionality of the vector space to further conserve computational resources. The word embedding or term embedding modules may also impose a limit on the context for the aforementioned predictive models. The context imposes a limit on a number of tokens before and a number of tokens after a given token for predictions. For example, a word embedding or term embedding module may limit the context to 10 when continuous skip-gram is utilized and to 5 when CBOW is utilized.

The following illustrates an example of using a predictive model to predict a focus token from a window of surrounding tokens in some embodiments. In these embodiments, a focus token may be identified from a collection of tokens (e.g., a phrase, a sentence, a set of tokens, etc. in an artifact, a source code module, etc.) An objective of the this process is to predict the focus word from the surrounding tokens in a window encompassing the focus token. The window may encompass only one side (e.g., to the right of the focus token or to the left of the focus token) or both sides of the focus token. In some embodiments, the size of the window may be determined to be around five (5) to achieve a balance between the amount of time for the training and the accuracy of the output of the word embedding or term embedding module.

One or more context tokens may be identified; and the one or more corresponding context vector representations of these one or more context tokens may be provided as input vector representations. The size of the dictionary may be identified. For example, the total number of unique tokens or the vocabulary size (V) in the dictionary may be identified; and the degrees of freedom (N) may be determined. As described above, the computational resources required are proportional to the product of the number of tokens to be vectorized and the degrees of freedom, the input vector is thus a [1×V] vector, where V denotes the number of unique tokens (or the vocabulary size). Each token is expressed as a distribution of all the unique tokens in the dictionary and may thus be represented as a [1×V] array with a "1" in the field representing the token and "0" in the remaining fields of the [1×V] array to simplifying operations although values other that "0" and "1" may also be used.

The distribution coefficients or the weights of these tokens may be captured in a weight data structure. These embodiments may include two weight data structures that successively transform the input [1×V] vectors representing the unique tokens in the dictionary into the vector representations where vector representations in closer proximity represent more similar tokens.

The first customizable weight data structure may be determined. The first weight data structure determined is to transform an [1×V] input vector into an intermediate representation while encompassing the degrees of freedom (N) and is thus a [V×N] array structure based on fundamentals of linear algebra. This intermediate representation may be called a hidden layer and is thus a [1×N] vector representation as a result of the product of the [1×V] input vector of a token and the [V×N] array. This [1×N] intermediate representation is further transformed via the second weight data structure into the final output vector representation for the input token. The output vector representation is also a [1×V] vector. As a result, the second weight data structure is a [N×V] array.

With these introductory remarks, the input vectors each representing a unique token in the dictionary may be transformed into an intermediate array with the first weight data structure. The second weight data structure may be identified; and the intermediate array generated may be further transformed into an output vector with the second weight data structure. As described above, the objective of these one or more training instances is to predict the focus token using the context tokens. The process may thus iteratively adjust the first and/or the second weight data structure via the application of a plurality of analogical reasoning tasks until the word embedding or term embedding module under training produces output vectors with desired accuracy. That is, until the word embedding or term embedding module can correctly predict the focus token by using its surrounding tokens with sufficient accuracy.

The word embedding or term embedding modules may be improved or optimized by iteratively maximizing an objective function with regard to the output vector representations and the first and/or the second weight data structures. More specifically, the process may iterate through every token in the dictionary and compute each input probability prediction as well as the prediction error and use the prediction error to update the corresponding output vector representation. Using the prediction error to update the corresponding output vector representation may be further improved or optimized by using one or more optimization techniques such as the aforementioned hierarchical softmax technique, the negative sampling technique, the softmax technique, the noise contrastive estimation (NSE) technique, the subsampling of frequent words technique, etc. The objective function may be constructed so that tokens occurring in similar contexts have similar embeddings (as measured by cosine similarity); and capturing the multiple degrees of similarity between tokens may be further enhanced by using the aforementioned analogical reasoning tasks.

For example, the hierarchical softmax technique may be used to estimate the overall probability distribution using an output layer that is proportional to log(unigram.perplexity (V)) instead of V (the vocabulary size described above) to reduce utilization of computational resources. Moreover, the weight data structures may be tuned during the iteration or independently of the iteration by adjusting one or more weights in either or both weight data structures. Another improvement or optimization technique involves the use of different techniques to process different tokens. More particularly, a word embedding or term embedding module may establish a threshold frequency of appearances for the tokens and use one technique for frequent tokens and another technique for infrequent tokens. For example, a word embedding or term embedding module may use the hierarchical softmax that utilizes a Huffman tree to reduce computation for infrequent tokens and negative sampling that minimizes the log-probability of sampled negative instances for frequent tokens.

This process flow described in this example may be applied to tokens more than just unigrams. For example, a similar approach may adopt multi-grams or n-grams (e.g., phrases, sentences, etc.) rather than unigrams (e.g., single words) to train the word embedding or term embedding modules. In doing so, tokens that frequently appear together may be identified as a focus token (an n-gram). The focus token may be similarly predicted in one or more similar training instances using surrounding tokens where the analogical reasoning tasks may be revised to encompass n-grams, rather than just unigrams. In some embodiments, a word embedding or term embedding module may be trained with all the n-grams (unigrams, bi-grams, etc.) This approach requires more computational resources than an alternative approach that train a word embedding or term embedding module using just some of the n-grams (e.g., using just the unigrams, bi-grams, etc. but not all the n-grams).

The following illustrates an alternative example of using another predictive model to predict surrounding tokens from a target token. Compared with the approach that predicts the focus token by using surrounding tokens in a defined window encompassing the focus token described above, this alternative approach described below predicts the surrounding tokens by using the focus token. In other words, the approach described above predicts the focus token from its context, and this alternative approach described below predicts the context from the focus token.

In these embodiments, a focus token may be identified from a collection of tokens as an input vector to a word embedding or term embedding module. For training purposes, the context tokens may also be identified from the collection of tokens. These identified context tokens may be used to evaluate the prediction errors of the word embedding or term embedding module during training. The size of the dictionary (V) and the degrees of freedom (N) may be respectively identified. The dictionary may be normalized and optionally reduced to include unique tokens as described above.

The degrees of freedom determine the size of the intermediate representation after the transformation with the first weight data structure. Generally, higher degrees of freedom result in better accuracy but require more computational resources because the memory footprint is proportional to the product of the size of the dictionary and the degrees of freedom. Therefore, a threshold limit may be established (e.g., several hundreds) for the degrees of freedom to achieve a balance between training performance and accuracy of the trained word embedding or term embedding modules.

The first customizable, variable weight data structure may be identified. The input vector may then be transformed into an intermediate representation using the first customizable, variable weight data structure. The input vector for the focus token may be similarly constructed as that in the approach and may include a [1×V] array. Theoretically, there may be V input vectors for a dictionary having V unique tokens. The first customizable, variable weight data structure thus includes a [V×N] array to transform a [1×V] input vector into a [1×N] array for the intermediate representation.

Because the output vector is also in the same vector space as the input vector, the output vector thus includes a [1×V] vector representation. As a result, a second customizable, variable weight data structure, a [N×V] array, may be identified. The first and/or the second customizable, variable weight data structure are to be adjusted with variable weights to optimize an objective probability function (e.g., a log probability based on the training context and the size of the dictionary, a stochastic gradient descent object function, etc.) The intermediate representation may then be transformed into the corresponding output vector representation.

More specifically, with the objective function identified, the loss or error may be computed for a pair of observed and noisy examples. At least one weight in the first or the second weight data structure may be updated to improve the objective function by, for example, determining the gradient of the loss or error with respect to the weights and by updating the weights by taking a small step in the direction of the gradient that moves the output vectors around for each token until the word embedding or term embedding module correctly discriminating real tokens from noise tokens. The learned output vectors may be projected to a two-dimensional space using a dimensionality reduction technique.

Similar to the word embedding or term embedding module in the approach that predicts the focus token by using surrounding tokens in a defined window encompassing the focus token, the word embedding or term embedding modules trained in this alternative approach may also be improved or optimized by iteratively optimizing an objective function with regard to the context tokens and the first and/or the second weight data structure. The context tokens identified may be compared with the results of the word embedding or term embedding module during training to compute the prediction errors that may be further used to calibrate the first and/or the second weight data structures until the word embedding or term embedding module under training produce correct predictions of the context tokens with desired accuracy.

With the vector representations determined for a corpus including natural language inputs, the corpus may be clustered based on the close proximity of the vector representations. As a practical example including an electronic tax return preparation software delivery model, a first corpus may be identified for the first natural language inputs by tenants in Section A "Principal business or profession, including product or service" of Schedule C, Form 1040. The first corpus may be normalized and vectorized into first vector representations using the approaches described herein so that the first vector representations in closer proximity indicate tokens that are more similar to each other. These "principal business or profession" in the first natural language inputs may be clustered into a plurality of tenant clusters based on the proximity of the first vector representations. A plurality of tenants may thus be clustered into the same tenant cluster if the respective first natural language inputs are transformed into first vector representations that are within a threshold proximity to each other.

In preparing electronic tax returns, the plurality of tenants in a tenant cluster may further enter second natural language inputs as additional inputs. For example, these tenants may further enter additional natural language inputs in Part V "Other Expenses" to indicate the expenses that these tenants deduct from their respective taxable incomes. These second natural language inputs may be collected as the second corpus for the plurality of tenants in the tenant cluster. These second natural language inputs may be normalized and vectorized into second vector representations and may be further clustered into a plurality of characteristic clusters (e.g., a plurality of expense categories) based on the proximity of these second vector representations. A plurality of expenses may thus be clustered into the same expense cluster if the respective second natural language inputs are transformed into the corresponding second vector representations that are within a threshold proximity to each other. Similar normalization, vectorization, and clustering may be performed for one or more other tenant clusters to determine their respective characteristic clusters.

The example software application delivery model (electronic tax return preparation and filing application delivery model) then utilizes these tenant clusters and characteristic clusters. For example, when a specific tenant provides the specific business description or profession in Schedule C in the electronic tax return preparation and filing software application delivery model, the specific business description or profession may be normalized and vectorized into a specific vector representation in the same vector space. This specific vector representation may then be clustered into one or more tenant clusters. These techniques may determine a final tenant cluster either based on some other inputs from the specific tenant or based on tenant validation.

One or more characteristic clusters (e.g., the top N expense categories) that have been previously determined to correspond to the final tenant cluster or to each of the one or more tenant clusters may be identified and presented to the tenant. In some embodiments, these techniques may identify one or more personalized expense cluster based on the natural language inputs provided by the specific tenant in addition to or in the alternative of the one or more previously established expense clusters to demonstrate that the software delivery model actually understands the business of the specific tenant.

FIGS. 2E-2G jointly illustrate more details about a portion of FIG. 2B in one or more embodiments. More specifically, FIGS. 2E-2G jointly illustrate a more detailed level flow diagram for classifying digital data and providing recommendations using reactive computing techniques or real-time computing techniques in one or more embodiments. In these one or more embodiments, a data model for classifying information may be identified (if already existing) or generated (if not existing) at 202E. This data model identified or generated at 202E may be transformed at 204E with a transformation or conversion module into a transformed data model.

One of the characteristics of a transformed data model is the ability to perform classification in real-time or near real-time in that a transformed data model guarantees its responses within a pre-specified temporal constraint or timeframe (e.g., in the order of one millisecond, one microsecond, or less). In these embodiments, a transformed data model receives an input data, processes the input data to generate a result, and returns the result within a pre-specified, guaranteed temporal constraint or timeframe where missing a temporal constraint or timeframe may either downgrade or postpone the service of the transformed data model or even cause a system error or failure in some embodiments. In some other embodiments, infrequently missing the temporal constraint or timeframe may be tolerated, especially in the scenarios involving terms that cannot be successfully clustered or classified.

Pertinent information may be received from a tenant's computing device at 206E. This inquiry may include, for example, a question indicating the need for assistance and entered by a user in the user interface of a software licensing or delivery model. This pertinent information may be transmitted at 208E to the transformed data model. The transformed data model executing either locally on a tenant's computing device or remotely on a server may determine whether the inquiry by itself may be deterministically classified into one or more classes at 210E. That is, the transformed data model attempts to classify or look up the pertinent information to determine whether the pertinent information matches any predetermined or pre-recognized classes. Determinism is a position that for every event there exist conditions that could cause no other event. A deterministic classification of the pertinent information into one or more classes refers to the position that the pertinent information leads to these one or more classes but no other classes.

When the determination at 210E is negative, these techniques described herein may then identify a first link which, when used with the first pertinent information, may lead to a deterministic determination of one or more classes for the inquiry at 212E. For example, the logic in the transformed data model identified or generated at 202E may initially determine a plurality of classes each corresponding to a relatively low confidence level due to, for example, insufficient details or information provided in the pertinent information.

The logic may nevertheless determine that when given certain pieces of additional information, the transformed data model can deterministically classify the pertinent information into one or more classes with relatively high confidence level(s). These techniques may then identify such additional information as the first link at 212E. For example, a description of a code module may involve some pertinent information about tax calculation for "a schedule for 1040". The transformed data model may identify that the IRS Form 1040 has 14 schedules and seek additional information (e.g., header, metadata, release notes, specification, etc.) to confirm which specific schedule the pertinent information is associated with.

With the first link identified at 212E, the data model or the transformed data model may seek additional information or one or more helper items that may be used to further fine tune the one or more classes into a few number of classes at 214E. Upon the receipt of the additional input, the transformed data model may determine whether the pertinent information may be deterministically classified into one or more classes with the additional information at 216E. If a deterministic classification still cannot be achieved with sufficiently high confidence level, the process may, at 218E, return to 212E to identify one or more additional links or information and repeat the sub-processes 212E through 216E.

In some embodiments, the first link, the second link, or an additional link may be identified from one or more tokens or terms that are not satisfied by the pertinent information. For example, if the data model applies a first rule corresponding to a first class and including five tokens or terms to the pertinent information. If the pertinent information satisfies all five tokens or terms in the first rule the pertinent information may then be classified into the first class. Nonetheless, during the application of the first rule to the pertinent information, it is determined that the second token or term in the first rule is not satisfied. Also, the data model (or the transformed data model) may also apply a second rule corresponding to a second class and including six tokens or terms to the pertinent information. If the pertinent information satisfies all six tokens or terms in the second rule the pertinent information may then be classified into the second class. Nonetheless, during the application of the second rule to the pertinent information, it is determined that the fourth token or term in the second rule is not satisfied. In this example, the data model may identify the second token or term in the first rule and the fourth token or term in the second rule to be the links.

On the other hand, if the transformed data model determines at 220E that the pertinent information may now be deterministically classified into one or more classes with sufficiently high confidence level, the one or more classes may be determined by the transformed data model. In some embodiments, the transformed data model applies a plurality of hierarchical checks to a series of terms, patterns, and/or relations of the pertinent information. These one or more classes may be optionally ranked at 222E into one or more ranked classes based in part or in whole upon, for example, their respective confidence levels, scores from compliance with or violation of the plurality of hierarchical checks, etc.

The transformed data model may optionally determine, at 224E, a final class for the pertinent information in real-time or in nearly real-time. In some embodiments, all of the one or more classes, instead of the final class alone, may be referenced in subsequent processing. The transformed data model may then determine whether one or more actions may be deterministically determined for the one or more classes or for the final class at 226E. As presented earlier, these one or more actions may include, for example, providing notifications, aggregation of information according to the classes determined for the information, priority determination, etc. in some embodiments.

In some embodiments where the determination result at 226E is negative, the transformed data model may identify a second link that may lead to a deterministic determination of the one or more actions at 228E. For example, the classification result (e.g., the one or more classes) may not necessarily correspond to sufficiently high confidence levels. In this example, it may be more difficult to identify recommended actions that correspond to the relatively low confidence level classes. Similar to the approaches described above with reference to 212E, the system may now identify a second link which, when used with the one or more classes or the final class, may result in the deterministic determination of one or more actions.

A second inquiry may then be formulated at 230E to seek second additional information (e.g., specification, code scan results, release notes, metadata, information or data in the header portion of the corresponding code module, etc.) or to select from a list of possible second links. Upon the receipt of the second additional information, the transformed data model may then determine whether one or more actions may be deterministically identified with the classification result and the second additional information at 232E. In some embodiments where the determination result at 232E is negative, the process may return at 234E to 228E to further identify second additional information that may lead to a deterministic determination of the one or more actions and repeat the sub-processes 228E through 232E. In some embodiments, these sub-processes 228E through 232E may be iteratively performed until the one or more actions may be deterministically determined. In some other embodiments, these sub-processes 228E through 232E may be iteratively performed subject to a threshold limit beyond which the pertinent information, its classification results, and/or other pertinent information may be referred to domain expert review.

In some other embodiments where the determination result at 232E is affirmative, these one or more actions may be determined at 236E; and these one or more actions may also be optionally ranked at 238E into one or more ranked actions based in part or in whole upon, for example, complexity levels of these one or more actions, dependencies of the pertinent information, the assessed impact level of the pertinent information, any other suitable ranking measures, or any combinations thereof. At least one action of the one or more actions or the one or more ranked actions may then be executed at 240E for the pertinent information.

FIG. 2H illustrates more details about some example of one or more impact assessment modules illustrated in the high level block diagram in FIG. 1A in one or more embodiments. More specifically, FIG. 2H illustrates more details about the functional aspect of an impact assessment module 120A illustrated in FIG. 1A. In these embodiments, a release activity or pertinent information therefor (hereinafter "pertinent information") may be identified at 202H. The pertinent information for a release activity may include, for example, a release activity, an artifact, a feature, a component, a code segment, references (e.g., pointers, link structures, symbolic links, uniform resource locators, uniform resource identifiers, etc.) to contents therein or information therefor (e.g., specification, release notes, test results, etc.), database scripts, schemas, global and local configurations and properties, documentation, platform specific objects (e.g., objects such as class files and resources for a Java-based integration framework such as Apache Mule, a Web server environment, etc.), any tangible byproducts produced during the development of the software application, or any combinations thereof, etc.

One or more other pieces of pertinent information that are affected by or are affecting the pertinent information identified at 202H may be identified (if already existing) or determined (if non-existing) at 204H based in part or in whole upon, for example, dependencies. More details about dependencies of a piece of pertinent information are described below with reference to FIG. 2I.

An extent of influence of the pertinent information may be determined at 206H based at least in part upon one or more factors. These one or more factors may include, for example, information from the specification, release notes, test results, etc. pertaining to the pertinent information. For example, an extent of a code module may be determined based on the number and/or types of changes made in the code module. A first level of impact of the pertinent information on the one or more other pieces of pertinent information may be determined at 208H, if any. In some embodiments, this first level of impact may be determined based in part or in whole upon the extent of influence determined at 206H. An impact level may be symbolic (e.g., none, immediate, high, medium, low, irrelevant, etc.) or numeric (e.g., on a numeric scale of one (1) through ten (10) where a higher number indicates a more profound impact).

One or more second levels of impact of the one or more other pieces of pertinent information identified or determined at 204H on the pertinent information identified at 202H may be determined at 210H, if any. Similar to the first level of impact, these one or more second impact levels may also be numeric, symbolic, or a combination thereof. One or more recommended actions may be executed at 212H based in part or in whole upon the first impact level and/or the one or more second impact levels.

These one or more recommended actions may include, for example, providing notifications, aggregation of information according to the classes determined for the information, priority determination, automatically pushing the pertinent information to the next phase or stage and send notifications to relevant tenants, etc. Information concerning the first impact level, the one or more second impact levels, the pertinent information, and/or the one or more other pieces of pertinent information may be aggregated at 214H into a data structure such as the data structure illustrated in FIGS. 5V-5W in some embodiments.

FIG. 2I illustrates more details about some example of one or more dependency modules illustrated in the high level block diagram in FIG. 1A in one or more embodiments. More specifically, FIG. 2I illustrates more details about the functional aspects of a dependency module (e.g., 118A in FIG. 1A). In these embodiments, a release activity or pertinent information (collectively "pertinent information") may be identified at 202I. Similar to that described with respect to FIG. 2H, the pertinent information for a release activity may include, for example, a release activity, an artifact, a feature, a component, a code segment, references (e.g., pointers, link structures, symbolic links, uniform resource locators, uniform resource identifiers, etc.) to contents therein or information therefor (e.g., specification, release notes, test results, etc.), database scripts, schemas, global and local configurations and properties, documentation, platform specific objects (e.g., objects such as class files and resources for a Java-based integration framework such as Apache Mule, a Web server environment, etc.), any tangible byproducts produced during the development of the software application, or any combinations thereof, etc.

One or more version identifiers and/or one or more common version identifiers pertaining to the pertinent information may be identified at 204I. For example, an example version identifier or an artifact may be N1.N2.N3 (e.g., 10.3.01), where N1 denotes the major release identifier ("10"); N2 denotes the minor release identifier ("3"); and N3 denotes the patch identifier ("01"). Another version identifier may be, for example, version "10.2.08". In these examples, the major release identifier "10" may be deemed a "common version identifier" pertaining to the major release "10"; and the minor release identifiers ("3" in the former example, and "2" in the latter example) as well as the patch identifiers ("01" in the former example, and "08" in the latter example) may be identified at 204I.

One or more artifacts or one or more code modules that have been branched into a boxset may be identified at 206I based in part or in whole upon the one or more version identifiers and/or the one or more common version identifiers. More details about branching artifacts and code modules into a boxset are described below with reference to FIGS. 2M-2T. One or more identifiers or synonyms of these one or more artifacts or code modules may be identified at 208I from a release database that maintains details of various releases and is managed by a release resource module.

Dependencies for the pertinent information identified at 202I may be determined at 210I. In some embodiments, dependencies may be determined for the pertinent information at least by querying the release database to select release activities, artifacts, code modules, or any other pertinent information, etc. by using the identifiers or synonyms identified at 208I. In some other embodiments, dependencies may be determined for the pertinent information at least by performing a code scan on a plurality of release activities or information therefor, a plurality of code modules, artifacts, pertinent information, etc. to identify the release activities or information therefor, code modules, artifacts, pertinent information, etc. that contain one or more references of the identifiers or synonyms identified at 208I.

The release activities or information therefor, code modules, artifacts, etc. that are determined to be pertinent to the dependencies determined at 210I may be identified at 212I. In some embodiments, at least some of such release activities or information therefor, code modules, artifacts, etc. may be stored at 212I into the respective columns of a data structure or a database table (e.g., a relational database table) corresponding to the pertinent information identified at 202I. Some examples of such a data structure are illustrated in FIGS. 5V-5W and described below.

The data structure or the database table may be indexed at 214I with one or more key columns that correspond to the pertinent information. Such an indexed data structure or database table may facilitate the access to and identification of data records with operations such as database query operations. For example, the data structure or database table may be indexed in such a way so that the data records therein are sorted with respect to one or more keys so that any query seeking to identify a specific data record needs not traverse an entire column (e.g., an identifier column) to identify the desired data record. Rather, indices may be used to quickly locate the desired data record for both random lookup and access of such ordered data records in the data structure or database table, without having to search every row in the data structure or database table each time the data structure or database table is accessed. In some embodiments, these index columns may be included in the data structure or database table. In some other embodiments, these index columns may be stored in a separate data structure or database table.

The impact of the pertinent information may be optionally assessed at 216I at least by determining a respective level of impact of the pertinent information on one or more release activities, artifacts, code modules, pertinent information therefor or thereof, etc. by utilizing an identical or substantially similar approach as that described above with reference to FIG. 2H. Similarly, one or more other impact levels of one or more other release activities, artifacts, code modules, pertinent information therefor or thereof, etc. on the pertinent information identified at 202I may also be optionally, similarly determined. The data structure or the database table may be optionally updated at 218I with the impact level and/or the one or more other impact levels optionally determined at 216I.

FIG. 2J illustrates more details about some example of one or more scorecard modules illustrated in the high level block diagram in FIG. 1A in one or more embodiments. More specifically, FIG. 2J illustrates more details about a scorecard module (e.g., 122A in FIG. 1A). In these embodiments, a release of a software application delivery model may be identified at 202J; and a plurality of tenants and tasks thereof that correspond to the identified release may be identified at 204J. The respective sates of the tasks of the plurality of tenants may be determined at 206J. A state may be determined based in part or in whole upon, for example, the activities that need to be completed at least by identifying the current state of an activity of interest to determine whether the corresponding activity or activities have been completed, in progress, has been undergoing bug fixing, has been awaiting approval, has been waiting for testing, has been waiting for one or more other artifacts for testing, integration, etc.

The respective states determined at 206J may be graphically and/or textually represented in a user interface (e.g., in a user interface of a release resource module 110A in FIG. 1A). In addition, a state that has been determined to hinder the release of the software application delivery model may be identified at 210J. For such a state, various modules may function in conjunction with each other to determine one or more issues that result in the state hindering the release at 210J. In addition, one or more corresponding tenants corresponding to the one or more issues may also be identified at 210J.

The modules described herein may automatically retrieve the respective descriptions of the one or more issues, one or more helper items (e.g., a description of what generally causes an issue as identified), and/or respective resolutions (e.g., what specific actions and/or steps may be adopted to resolve an issue) concerning these one or more issues from a data structure, a database table, an expert system, or a knowledge base at 212J. Respective scores may be determined at 214J for the tasks of the plurality of tenants. Such scores may be symbolic in form in some embodiments or may be numeric in some other embodiments where quantifiable metrics may be used to evaluate such a task. For example, a numeric percentage may be used to represent a score for code coverage that describes the degree (e.g., percentage) to which the program code of a software program is executed when a particular test suite runs.

The respective numeric or symbolic scores may be graphically and/or textually represented in a scorecard representation at 216J. An example of such graphical and/or textual representation of a scorecard is illustrated in FIG. 5O and described below. The information about the plurality of tenants, the tasks thereof, the states, the one or more issues, the issue descriptions, the issue resolutions, the scores, or any combinations thereof may be cross linked at 218J in a collapsible tree structure in a scorecard representation such as the one illustrated in FIG. 5N-5P.

FIGS. 2K-2L jointly illustrate more details about some example of one or more monitoring and/or tracking modules and one or more prioritization modules illustrated in the high level block diagram in FIG. 1A in one or more embodiments. In these embodiments, a release of a software application delivery model may be identified at 202K; and a plurality of tenants and tasks thereof that correspond to the identified release may be identified at 204K. The artifacts, code modules, or any other pertinent information, etc. pertaining to the release may be identified at 206K.

One or more issues and/or one or more states may be identified with respect to one or more threshold levels of limits at 208K. These one or more issues or the one or more states may then be classified into one or more types. For example, issues may be clustered into issue types including "story" (describing one or more software features from a user perspective or a simplified description of a requirement), "epic" (a body of work that includes a number of smaller stories and may change in scope over time), "spike" (a story that cannot be estimated until a tenant runs a time-boxed investigation), etc. A threshold level of limit may include, for example, awaiting for an event (e.g., approval, testing complete, etc.) for a threshold period of time.

These one or more issues and/or the one or more states identified at 208K may be classified into one or more types at 210K. In some embodiments, these one or more issues and/or the one or more states may be classified, at a classification module, based in part or in whole upon, for example, the dependencies associated therewith and determined by a dependency module, their respective impact levels determined by an impact assessment module, or the characteristics thereof such as the contents, the types of the contents, or the structural information of these one or more issues and/or the one or more states, or any other suitable classification criteria. Some examples of the issue types or issue classes include story, epic, spike, sprint, etc. Some examples of the state types or classes include none, irrelevant, immediate, high, medium, low, etc.

At least one issue type or state type or a specific issue or state may be tracked at 212K to generate issue tracking records that may be further stored. One or more actions may be executed in response to the one or more issues or states at 214K based in part or in whole upon one or more criteria. For example, if a monitoring or tracking module determines that an issue or a state has remained stagnant for over a threshold period of time, a notification may be distributed to the tenant responsible for the resolution of the issue or the release activity associated with the issue. Such a threshold period of time may be determined for the type of the issue or state based on, for example, historical records of this type of issues or states, the complexities of the issue or the state, the dependencies associated with the issue or state, the impact level corresponding to the issue or state, or any other suitable measures.

One or more branching version identifiers of artifacts, code modules, etc. that are branched into a sub-branch of a parent branch may be monitored or tracked at 216K. In addition or in the alternative, one or more common version identifiers for branching artifacts, code modules, etc. into one or more boxsets corresponding to the one or more version identifiers monitored at 216K may be monitored or tracked at 218K. Pertinent information pertaining to an issue or a state of a release activity for the release of interest may be identified at 220K. With the pertinent information identified, dependencies affecting or affected by the pertinent information, the issue, or the state may be identified (if already determined) or determined anew (if non-existing) at 222K.

A priority level may be determined at 224K for the issue or the state based in part or in whole upon the dependencies. For example, an issue arising out of an artifact or a code module upon which a larger number of other artifacts or code modules depend may be determined to have more dependencies or a higher or more complex dependency score or dependency relation. This issue or the underlying artifact or code module may then be determined to have a higher impact level and thus a higher priority level.

One or more branching version identifiers of artifacts, code modules, etc. may be identified at 226K; and the one or more respective states of these one or more branching version identifiers of artifacts, code modules, etc. may be tracked to identify whether a triggering even has occurred. A triggering event may include, for example, checking in or committing an artifact, a code module, etc. and may be monitored by, for example, monitoring the occurrence of system commit time for the artifact, code module, etc. A triggering event thus indicates that the realization of changes and hence revision of the artifact, code module, etc.

With the occurrence of a triggering event captured by, for example, a monitoring module, a plurality of artifacts, code modules, etc. pertaining to the release of interest may be identified at 228K based at least in part upon the detected occurrence of the triggering event. For example, the commit of a checked-out code module may indicate the completion of the revision at the development stage. Such a triggering event may indicate that some of the states of certain release activities indicating awaiting the completion of the code module may be cleared, assuming these certain release activities are awaiting only the completion of this code module. In some embodiments, only deployable or releasable artifacts, code modules, etc. may be identified at 230K. In some other embodiments, releasable, deployable, non-releasable, and non-deployable artifacts, code modules, etc. may be identified at 230K.

FIG. 2M illustrates more details about an example of one or more continuous deployment modules illustrated in the high level block diagram in FIG. 1A in one or more embodiments. More specifically, FIG. 2M illustrates a high level block diagram of a continuous deployment module (e.g., 104A in FIG. 1A) in one or more embodiments. In these embodiments, a plurality of computing systems operated by various tenants may access a release management module 202M that controls and manages various aspects of multiple releases of a software application from the pre-alpha release all the way through the production release. The plurality of computing systems may also access a branch management module 204M that generates, controls, and manages, for a software application release life cycle, a master branch with a unique master identifier for the release of a software application as well as a plurality of additional branches such as one or more feature branches, one or more release branches, etc. that bifurcate from the master branch.

The identification of each branch is also subject to the control and management of the branch management module 204M so that possible conflicts may be eliminated, and versioning of any aspects of the software application may be under control. These identifications of branches may be stored in a branching repository (not shown) that is also accessible by the release management module 202M and the one or more code development modules 206M for integration with the branch management module 204M as well as the deployment modules (e.g., the continuous deployment dashboard 212M, the enterprise continuous deployment module 214M, etc.) The branch management module 204M may track some or all deployable or non-deployable artifacts and function in tandem with the release management module 202M to fill or augment the boxset (e.g., 250M) to include everything (e.g., artifacts) to support a deployment.

In addition, the plurality of computing systems access one or more code development modules 206M that are used to create, control, or manage deployable artifacts included in one or more releases, non-deployable artifacts that are not included in the one or more releases but are for reference purposes. The branch management module 204M is communicably coupled with the release management module 202M and the one or more code development modules 206M to collaboratively package and store a release of a software application into one or more boxsets 250M including information of a plurality of artifacts 252M into a deployment repository 210M.

In some embodiments, a boxset 250M and hence each artifact of the plurality of artifacts may include references (e.g., pointers, link structures, symbolic links, uniform resource locators, uniform resource identifiers, etc.) to the contents (e.g., artifacts) therein, rather than storing the actual contents (e.g., artifacts) in the boxset or a set of artifacts. In these embodiments, the actual contents are stored in the code repository 208M that is also coupled with the branch management module 204M, rather than in the deployment repository 210M. In some embodiments, either or both of the code repository 208M and the deployment repository 210M is a Web-based source control repository hosting service that offers distributed version control and source code management functionalities as well as role-based features.

In some embodiments, the branch management module 104 or the release management module 202M may identify and categorize artifacts required or desired to support a deployment into separate sets of pertinent artifacts in the form of a boxset 250M. For example, the artifacts may be categorized or grouped into the boxset 250M that may further include the set of artifacts for quality tests, the set of artifacts for database scripts and schemas, the set of artifacts for smoke tests, and the set of artifacts for properties (e.g., global properties, application configuration properties, etc.). For example, the boxset 250M in the deployment repository 210M may include all the desired or required artifacts to be released for the version of the software application. In this example, the branch management module 204M or the release management module 202M may group or categorize the plurality of artifacts into a first boxset for the artifacts for quality tests, a second boxset for the artifacts for database scripts and schemas, a third boxset for the artifacts for smoke tests, and a fourth boxset for the artifacts for properties based in part or in whole upon the relations among these artifacts.

When a version of a software application is to be released, the branch management module 204M creates and stores a boxset 250M that includes a plurality of artifacts 252M in the deployment repository 210M which is further communicably coupled with a continuous deployment dashboard (CDD) 212M. The continuous deployment dashboard 212M may include a collection of data (e.g., real-time data) that various users may access to review reports on various aspects of the software application (e.g., code quality, operational performance, etc.)

In some embodiments, the continuous deployment dashboard 212M may receive the boxset 250M as a CDD boxset 212M1. The CDD boxset 212M1 may be forwarded to a signoff process 212M1 that verifies whether each set of artifacts is correct or includes the desired or required artifacts. Once the CDD boxset 212M1 is signed off at 212M1, the CDD boxset 212M1 may be forwarded to, for example, the signoff 212M2. When the CCD boxset 212M1 is signed off, this CCD boxset 212M1 may be transmitted to the deploy module 212M3 which then sends it to the enterprise continuous deployment module 214M. The enterprise continuous deployment module 214M includes a module that enables developers to integrate various pieces of artifacts into a shared repository (e.g., the deployment repository 210M or the code repository 208M). The enterprise continuous deployment module 214M verifies each check-in of pieces of artifacts by an automated build, execution of individual component tests, and/or code coverage thresholds allowing multiple teams or members to detect problems with the software application early.

The enterprise continuous deployment module 214M parses the references to the artifacts in the CDD boxset 212M1 and obtains the artifacts from the code repository 208M. Moreover, the enterprise continuous deployment module 214M may include parameters for various tests or test suites 228M. In addition, the enterprise continuous deployment module 214M then disseminates the boxset as well as the artifacts from the code repository 208M to the enterprise services environments 216M that may in turn disseminate, depending on the stage of the current release, various artifacts in the CDD boxset 212M1 or the entire CDD boxset 212M1 to one or more environments. For example, the enterprise services environments module 216M may disseminate the plurality of artifacts from the code repository 208M to a development environment 218M for an engineering release, to a Web environment 226M for a release to the Web, to a manufacturing environment 216M for a release to manufacturing, and/or to a production environment (not shown) for a release to production.

An engineering release to the development environment 218M enables all members collaborating on the same software application to access the up-to-date versions of various pieces of the software application without worrying about uncommitted changes or outdated versions. The development environment 218M may invoke various tests or test suites 228M to perform various tests to determine whether the current version of the software application may be released to the next stage in the software release life cycle. For example, the development environment 218M may invoke component tests to test individual software application components, integration tests to verify the interfaces between individual software application components, and/or interface tests to check handling of data between different units or subsystem components.

Once the release of the software application meets the requirements, rules, and/constraints (collectively requirement for singular or requirements for plural) of the development environment 218M, the plurality of artifacts may be forwarded to a quality check environment 220M. The quality check environment 220M may invoke various tests or test suites 228M to perform various tests to determine whether the current version of the software application may be released to the next stage in the software release life cycle. For example, the quality check environment 228M may invoke quality tests to verify whether the software application is operationally ready.

Once the software application satisfies the quality check requirements in the quality check environment 220M, the plurality of artifacts (or the boxset) may be forwarded to the system environment 222M which may further invoke one or more tests or test suites 222M to perform system testing or end-to-end testing that tests the completely integrated software application to verify whether the completely integrated software application meets various requirements. In some embodiments, once the software application satisfies the quality check requirements in the quality check environment 220M, the plurality of artifacts (or the boxset) may be forwarded to the performance test environment 224M to verify how the performance of the software application in its intended environment or platform performs in terms of, for example, responsiveness and/or stability under one or more workloads.

It shall be noted that although FIG. 2M does not appear to connect the Web environment 226M or the manufacturing environment 216M with the tests or test suites 228M, either environment or both environments may nevertheless be operatively coupled to the tests or test suites 228M to invoke various appropriate tests to verify whether the software application meets various requirements. It shall be noted that any modules described herein may function in a fully automated fashion without human intervention other than writing the code for the software application or preparing documentation (e.g., software manuals, papers, etc.) for a software application.

FIG. 2N illustrates more details about an example of the functional aspects of one or more release creation modules (e.g., 106A) illustrated in the high level block diagram in FIG. 1A in one or more embodiments. In these embodiments, the branch management module 204M may collaborate with the release management module 202M and one or more databases 250N to perform various functionalities described herein. The branch management module 204M illustrates in FIG. 2M may include a client branch management module 204M that communicates with the branch management module on a server.

Similarly, the release management module 202M may include a client release management module 202M residing on a client computing system and communicably coupled to a release management module on a server. These one or more databases 250N may include one or more local databases or database tables residing on a client computing system to store locally committed transactions such as transactions creating new artifacts or transactions modifying existing artifacts while the client system is not connected to the release management module or the branch management module on one or more servers.

Once the client computing system returns online, these committed local transaction data may be merged or uploaded to the server, and the records for the release management module and the branch management module may be updated as well. In this manner, any user may work on the respective tasks for the deployment of a release of a software application at any time regardless of whether the client computing system is connected to one or more servers managing various aspects of the deployment. The branch management module 204M perform one or more processes 200N including creating one or more branches off an existing branch at 202N for a software application. In response to the one or more created branches, the information about the one or more branches or the parent branch (e.g., a master branch, a feature branch, a release branch, etc.) off which these one or more branches are created may be updated at 204N to reflect the fact that this parent branch now includes these one or more created branches as one or more child branches.

The branch management module 204M may also track and manage artifacts and their corresponding version identifiers at 206N by using, for example, a major release version identifier, a minor release version identifier, a patch version identifier, etc. where at least one of the major release version identifier or the minor release version identifier are centrally managed and maintained by a central server on which the server branch management module is located so that any users need to contact the central server to create or alter such identifiers. One or more common identifiers respectively for the one or more created branches at 208N.

In some embodiments, these one or more common identifiers may be created based at least in part upon the latest commit or the latest common identifier of the parent branch from which these one or more branches are created. In this manner, any users may create new branches with distinguishing common identifiers for the tasks these users are working on while the artifacts generated or modified within these branches may successfully be merged back to the parent branch without conflicting or confusing with the artifacts produced or modified in other branches or the parent branch.

One or more tests may be identified with a common identifier or packaging type at 210N. Artifacts on a common identifier may be branched into a boxset at 212N for subsequent software build or deployment. More specifically, an artifact and its version identifier are tracked and updated when there is a change to the artifact. For example, when a user commits or saves the state of the branch the user is on, the branch management module 204M may take a snapshot of the artifacts and store a reference to this snapshot regardless of whether or not the computing system is connected to the server on which the server branch management module is located.

If a first artifact has not been changed since the last commit, this snapshot merely stores a reference to the previous version of the first artifact. If a second artifact is modified or created, this snapshot stores a relative reference to the newly created or modified second artifact having a different identifier than the previous version from the last commit, and both the snapshot as well as the newly created or modified second artifact will be merged with the records on the server once the computing system returns online. This snapshot may be generated by performing a query on the one or more databases 250N to return a query result set including information (e.g., references) about the artifacts associated with a specific commit within a particular branch.

An artifact may also be identified with another identifier (e.g., a packaging type) that may be further referenced in the creation of boxsets or in the determination of its target deployment recipient. Therefore, different artifacts corresponding to the same packaging type may be branched accordingly at 212N to automatically collect these artifacts and to automatically generate the required or desired boxsets for deployment. The code or any other related artifacts may be created and validated for these one or more created branches at 214N with the one or more common identifiers determined at 208N by using, for example a software testing module. For example, checksum, error detection, or any other suitable techniques may be performed at 214N to validate the code or any other artifacts before the code or the artifacts are committed or stored permanently to prevent, for example, construction errors in the artifacts.

Once the artifacts are validated, and the client computing system is connected with the server hosting the server branch management module and the server release management module, the newly created or modified artifacts may be merged into the code repository 208M, and the created boxsets may be merged into the deployment repository (210M). The snapshots created on the client computing system may also be merged into a snapshot database while the relative references to the artifacts may be replaced with appropriate references according to the architecture or schema of the data storage. As described above, the code repository 208M stores the actual copies of various artifacts, while the deployment repository (210M) stores the references to these actual copies of artifacts. The code repository 208M is further communicably coupled with the enterprise continuous deployment module 214M that in turn communicates with the deployment repository 210M and may perform various actions for various functionalities as illustrated in 200O of FIG. 2O described below.

FIG. 2O illustrates more details about an example of one or more enterprise continuous deployment modules illustrated in the high level block diagram in FIG. 2M in one or more embodiments. More specifically, FIG. 2O illustrates some examples of the functions of the enterprise continuous deployment module 214M. In these embodiments, a release identifier may be identified from one or more release identifiers at 202O for a deployment for a release of a software application.

The release identifier may include or correspond to, for example, a major release version identifier, a minor release version identifier, or a patch release version identifier for the software application or for one or more artifacts therefor. In some embodiments, release identifiers are centrally created, controlled, and managed by the release management module residing on a server computer to ensure that all collaboration units work off the same release version. In some of these embodiments, the release identifier identified at 202O may also be based in part or in whole upon version identifiers of artifacts and/or packaging types that may be created either via a server computer on behalf of one or more online client computing systems or at these one or more client computing systems when these one or more client computing systems are offline and not connected to the server computer.

A boxset including link structures to all artifacts to be bundled with the release may be generated at 204O. These link structures may include, for example, links, indices, pointers, symbolic links, addresses, handles, etc. For example, a boxset may include uniform resource locators or uniform resource identifiers, instead of the actual copies of these artifacts, pointing to the various artifacts that are to be included for a release of a software application in some embodiments.

In these embodiments, the boxset generated at 204O includes the link structures to all artifacts but not the actual copies of any of the artifacts. The generated boxset may be stored in the deployment repository 210M, while the actual copies of the artifacts referenced by the link structures are stored in the code repository 208M in these embodiments. In these embodiments, deploying a boxsets of link structures not only consumes much less and hence conserves computational resources (e.g., network bandwidth) but also renders versioning control much easier because the receiving module of a boxset may follow the link structures to retrieve the correct versions of artifacts that may be stored with more flexibility than packaging these artifacts in a boxset for deployment. In addition, storing link structures in a boxset also renders modifications to the boxset much easier and utilization of computational resources much less. For example, if an artifact is updated to a new version, only the link to the new version of this artifact in the boxset needs to be modified without removing the old version artifact from the boxset and adding the new version into the boxset.

In some other embodiments, a boxset may include actual copies but not any link structures of the artifacts. The entire boxset may be stored in the deployment repository 210M in these embodiments. Yet in some other embodiments, a boxset may include a combination of one or more link structures to one or more first artifacts and one or more actual copies of one or more second artifacts. The portion of the generated boxset including link structures as well as artifacts included in the boxset may be stored in the deployment repository 210M, while the actual copies of the artifacts referenced by the link structures in the portion are stored in the code repository 208M in these embodiments.

One or more target platforms or environments for the deployment of the release of the software application may be identified at 206O. For example, a Java-based integration framework, a Web server environment, a development environment, a quality check environment, a manufacturing environment, and/or one or more testing environments may be identified at 206O. These one or more target platforms or environments may be referenced in generating platform- or environment-specific boxsets from the boxset generated at 204O.

At 208O, a plurality of platform- or environment-specific boxsets may be generated from the boxset generated at 204O including the link structures to all artifacts based in part or in whole upon the one or more target platforms or environments identified at 206O. For example, the enterprise continuous deployment module 214M may generate a regression test boxset for the regression testing environment, a smoke testing boxset for the smoke testing environment, a quality check boxset for the quality check environment, etc. The plurality of boxsets generated at 208O may be stored in the deployment repository 210M.

A first boxset of all artifacts may be generated at 252O by the enterprise continuous deployment module 214M, the branch management module 204M, or the release management module 202M. This first boxset 252O including link structures to all the artifacts to be bundled for a release may be stored in the deployment repository 210M. With the identified target platforms or environments, a plurality of platform- or environment-specific boxsets 250O may be automatically generated from the first boxset without human intervention or interactively with feedback or responses from a user in response to, for example, a set of questionnaires or interview questions.

For example, a quality test boxset 254O, a smoke test boxset 256O, a database script or schema boxset 258O, and/or a property boxset 260O, etc. may be generated from the first boxset 252O. In some embodiments, each of these boxsets in 250O includes link structures to corresponding artifacts, instead of the actual copies of these corresponding artifacts. In some other embodiments, a boxset (e.g., 252O, 254O, 256O, 258O, or 260OI) may include actual copies of the artifacts. Yet in some other embodiments, a boxset may include a combination of one or more link structures to one or more first artifacts and one or more actual copies of one or more second artifacts.

FIG. 2P illustrates more details about an example of one or more code repositories illustrated in the high level block diagram in FIG. 2M in one or more embodiments. More specifically, the code repository 208M may include a copy of an actual artifact to be included in a deployment of a software application release. In contrast, the deployment repository (210M) may include references pointing to the copies of actual artifacts, instead of copies of these artifacts. These references may include, for example, link structures, pointers, symbolic links, etc. Some examples of such references included in the deployment repository (210M) may include uniform resource locators (URLs) or uniform resource identifiers (URIs).

The code repository 208M may categorize or group artifacts into a plurality of sets or individual files. In these embodiments illustrated in FIG. 2P, the code repository 208M may, for example, categorize artifacts and store deployment artifacts 202P, one or more quality tests 204P, one or more smoke tests 206P, database scripts and/or schemas 208P, one or more properties 210P (e.g., global properties, software application configuration properties, etc.), or any other information or data desired or required to support the deployment of a release of a software application. Each category or group of artifacts may be stored as a separate set of artifacts or in a single file container. For example, the code repository may store categories or groups of artifacts in a jar file container, a war file container, a zip file container, etc.

FIG. 2Q illustrates more details about an example of the structural aspect of one or more enterprise continuous deployment modules illustrated in the high level block diagram in FIG. 2M in one or more embodiments. More specifically, FIG. 2Q illustrates more details about the invocation of an enterprise continuous deployment module 214M via one or more tenant computing systems (not shown). The enterprise continuous deployment module 214M receives a boxset from the continuous deployment dashboard (e.g., 212M) and, depending upon the stage of the release determined by the enterprise services environments module 202Q, releases the boxset to one or more environments.

These one or more environments into which the boxset may be released may include, for example, manufacturing environment, a Web environment, a performance test environment, a quality check environment, and/or a system environment. Therefore, depending upon the stage of the release, the enterprise services environments module 202Q may release the boxset to the development environment at 204Q, release the boxset to the quality check environment at 106D, release to the system environment 208Q, release the boxset to the manufacturing environment at 210Q, release the boxset to the Web environment at 212Q, and/or release the boxset to the performance test environment at 214Q.

One or more of these environments into which a boxset is released may perform various tests or verifications by using one or more tests or test suites 216Q. The one or more test or test suites 216Q may include a plurality of test artifacts comprising, for example, test plans, test cases including identifiers, traceability data structures, preconditions, a set of actions to be performed, etc., scripts, test data, and/or test fixtures for various tests in some embodiments.

For example, component level software testing and integration level software testing may be performed in the development environment 204Q with one or more component level tests or test suites and one or more integration level tests, respectively. An application of one or more defect prevention or defect detection procedures or scripts or a static code analysis may also be performed in the development environment 204Q to reduce development risks, time, or costs or to eliminate or reduce construction errors before the software application is forwarded to the quality check environment 206Q.

Software quality assurance testing may be performed in the software quality check environment 206Q with one or more quality assurance tests or test suites. System level software testing or end-to-end software testing may be performed on an integrated software application in the system environment 208Q with one or more system level tests or test suites to verify whether the integrated software application meets the requirements.

One or more regression, sanity tests, or smoke tests may also be performed in the system environment 208Q. A smoke test includes a minimal or reduced number of attempts to operate the software application and determines whether there are basic problems that may prevent the software application from working at all. A sanity test determines whether further testing may be required or desired. A regression test identifies defects in the software application, especially after some code change, to uncover software regressions that include, for example, old bugs or unintended consequences that have come back, etc. Performance tests may be performed in the performance test environment 212Q to determine how the software application or one or more sub-module thereof perform in terms of responsiveness or stability under one or more specific workloads or to validate or verify other attributes or metrics 218Q (e.g., resource utilization, reliability, or scalability, etc.) of the software application.

FIG. 2R illustrates more details about an example of one or more release management modules illustrated in the high level block diagram in FIG. 2M in one or more embodiments. More specifically, FIG. 2R illustrates more details about the release management module 202M. In these embodiments, the release management module 202M may include or invoke various modules hosted on one or more computing systems via a computer network. These modules may include, for example, one or more release builder module 202R that respectively generate, assemble, compile, or build their respective release models or packages at 252R.

The release management module 202M may further invoke the package identifying module 204R that identifies, at 254R, software objects (e.g., artifacts 272R) with appropriate package types 270R. For example, the package identifying module 204R may identify software objects as a "war" type for all ".war" objects, a "zip" type for all ".zip" objects, a "jar" type for all ".jar" objects, etc. The package identifying module 204R may also identify software objects as various package types based on the platforms or server environments.

For example, the package identifying module 204R may identify all objects or artifacts that are related to or associated with a specific integration framework or framework (e.g., a Java-based integration framework such as Apache Mule, a Web server environment, etc.) For various tests for software testing, database scripts and schemas, etc., the package identifying module 204R may identify these artifacts or objects as a "zip" package type. For aggregating other artifacts or objects (e.g., Java class files), metadata, and/or resources (e.g., test, images, etc.) that do not belong to any of the aforementioned package types, the package identifying module 204R may identify these objects as a "jar" package type. These package types 270R may be further referenced in the generation of separate box sets for a release of a software application such that artifacts identified with the same package type will be categorized or grouped into the same set of artifacts or the same file container. Other available package types 270R may include, for example, a POM (project object model) package type, an EJB (Enterprise JavaBeans) package type, plugins 220R, an EAR (Enterprise Archive format) package type, an RAR (a compressed file format) package type, a PAR (parity recovery file format) package type, or any other suitable package types.

The release management module 202M may also invoke a resource generator module 206R that generates resources 222R that are desired or required for a release of a software application at 256R. These software resources 222R may include, for example, software needed for the software application to run in one or more computing platforms or frameworks, application programming interfaces, drivers, and/or one or more browsers and their respective plugins, extensions, etc., or any other required or desired software resources. The release management module 202M may also invoke a resource process module 208R that processes various resources 222R during the build, testing, compilation, deployment, and/or installation of the software application at 258R. The release management module 202M may also invoke a data access module 210R that provide common data access mechanisms shared by all collaborating client computing systems as well as one or more servers hosting various modules describe herein to access various pieces of data or information at 260R. The release management module 202M may also invoke a dependency module 212R that generates and tracks dependencies among related artifacts at 262R.

FIG. 2S illustrates more details about an example of one or more branch management modules illustrated in the high level block diagram in FIG. 2M in one or more embodiments. More specifically, FIG. 2S illustrates more details about the branch management module 104. In these embodiments, the branch management module 204M on a computing system may include or invoke one or more modules hosted on one or more other computing systems to perform various functions as illustrated in 252S through 258S.

When a tenant on a client computing system 200S checks out a portion of a software application to perform, for example, various code construction or modification, the branch management module 204M may invoke the branching module 210S on behalf of the client computing system 200S to generate a project and initiate a build process for the project with a project object model at 256S. The branching module 210S may further identify an existing branch or generate a new branch off the master branch or an existing branch off the master branch of the software application at 258S. The automatic tagging module 212S in the branch management module 204M ensures that every branch is associated with a unique branch identification, and that these unique branch identifications are centrally maintained so that all client computing systems and other modules described herein reference these unique branch identifications when performing various tasks. The automatic tagging module 212S may also automatically tag an artifact with a new version or revision when the artifact is created or modified.

A tenant on a client computing system 200S may access the branch management module 204M to perform various tasks on one or more branches off the master branch of a software application. The client computing machine 200S may include one or more databases 204S as local databases on the client computing system. That is, these one or more databases 204S may be residing locally on the client computing system (e.g., a laptop of a developer) and may commit locally via a client branch management module (not shown) on the local client computing system 200S until the client computing system 200S has network connection or a virtual private network (VPN) to upload or merge data of committed transactions to the code repository 208M via a database system 202S and the merge module 214S.

Moreover, when a client computing system modifies an artifact, the data being modified is stored at a staging area on the client computing system. When performing a commit, the data (e.g., a snapshot) is moved from the staging area to the storage (e.g., permanently storing the data in the local storage for a local commit and the code repository for a commit to the server). In addition, once the user or the client computing system has performed various tasks on the portion of the software application under a branch, the tenant computing system 200S may merge the local data via the merge module 214S and update the branching data of the software application via the branching module 210S of the branch management module 204M.

In other words, a tenant computing system 200S in these embodiments may commit one or more transactions (e.g., modification of an existing piece of artifact) locally on the tenant computing system 200S when the tenant computing system 200S does not have network access or may commit to the code repository 208M via the merge module 214S and the database system 202S when the tenant computing 200S has network connection to the branch management module 204M and the code repository 208M on a server.

Moreover, when a client computing system 200S commits a transaction (e.g., by saving the state of portion of the software application), the snapshot module 206S in the branch management module 204M on the server (when connected to the client computing system via a network) or in the client branch management module (when not connected to the server on which the branch management module resides) residing locally on the tenant computing system 200S may take a snapshot of what all the artifacts on the tenant computing system 200S are and store a reference to this snapshot, instead of the changes, at 252S after performing a checksum or another appropriate error detection task at 254S by the data verification module 208S.

If an artifact has not changed since the last commit, this artifact is not stored again, but only a link to the previous identical artifact will be referenced in the snapshot of the committed transaction. In these embodiments, computational resource utilization is reduced because not all artifacts have to be rewritten and further because writing links to artifacts are more efficient than writing the corresponding artifacts. In addition, the commit mechanism, the checksum performed, and the snapshots ensure that the contents of a software application cannot be mutilated without going through the branch management module 104. The result is a tightly controlled versioning mechanism and branching strategy in a software release life cycle.

FIG. 2T illustrates more details about an example of one or more code development modules illustrated in the high level block diagram in FIG. 2M in one or more embodiments. More specifically, FIG. 2T illustrates more details about a code development module 206M. A code development module 206M may be communicably coupled to one or more databases (204S) and the code repository 208M. A code development module 206M on a computing system may also include or invoke one or more modules 200T that reside on one or more other computing systems.

In some embodiments, these one or more modules 200T may include a packaging identification module 202T that associates a packaging type with a box set or even an artifact using a packaging tag or identifier at 252T. Available packaging types for box sets or artifacts may include, for example, different formats or file types of packages that are to be deployed. For example, the packaging identification module 202T may identify artifacts or box sets as one or more of the "zip", "rar", "war", "ejb", "jar", "par", etc. packaging types.

Available packaging types for box sets or artifacts may alternatively or additionally include, for example, types based on integration frameworks of the software application, or the target recipients of the deployment. For example, the packaging identification module 202T may identify artifacts or boxsets with corresponding packaging types for different integration platforms (e.g., an enterprise service bus framework, a specific web server environment, etc.) or for different target recipients of the artifacts or boxsets. For example, the quality check team may receive the artifacts or box sets related to various quality tests in a first packaging type; a smoke test team may receive the artifacts or box sets related to various smoke tests in a second packaging type; etc.

These one or more modules may include a project object model module 204T that generates a project and initiates a build process for the project with a project object model (POM) at 254T to perform various functions. For example, the project object model module 204T may create and update a workspace for the project and create an environment for the build process to run in. The project object model module 204T may also capture metadata or parameters about various inputs and outputs of the build process to ensure repeatability and reliability.

In addition or in the alternative, the project object model module 104T may also identify or tag various points of interest in a history of the project by using, for example, tag objects. A tag object is a container that includes a reference to another object and may hold metadata related to another object. For example, the project object model module 204T may tag an artifact that has been committed as a commit artifact with a tag object to store information such as a particular release of the commit artifact. The project object model module 204T may also perform program or code analysis to ensure the quality of artifacts produced via the one or more code development modules 206M. In addition, the project object model module 204T may perform compilation or interpretation.

These one or more modules may include an information generation and retrieval module 206T that retrieves and generates project information and build information at 256T for the project generated at 254T by the project object model module 204T. Some examples of project information that may be generated or retrieved by the information generation and retrieval module 206T may include, for example, change log information, cross referenced sources, dependency lists, or any other desired or required information.

These one or more modules may include a build module 208T that performs various functions including, for example, version control, program or code analyses for checking code quality, compilation, interpretation (for interpreted languages such as Python or Perl), etc. The build module 208T may also generate build cycle information in some embodiments. These one or more modules may include one or more test modules 210T that set up corresponding test environments without relying on customizing the build process for test preparation at 258T and identify and execute corresponding tests at 260T. These one or more software testing modules 210T (or 116A) may also automatically specify or create test cases, test plans, traceability data structures for corresponding tests, preconditions, a series of actions to be performed for each test, and/or report test results in some of these embodiments. These one or more modules may include a code hierarchy module 212T that generates and maintains, at 262T, hierarchies indicating parent-child relationships for artifacts of the project created at 254T.

Figure 5A:
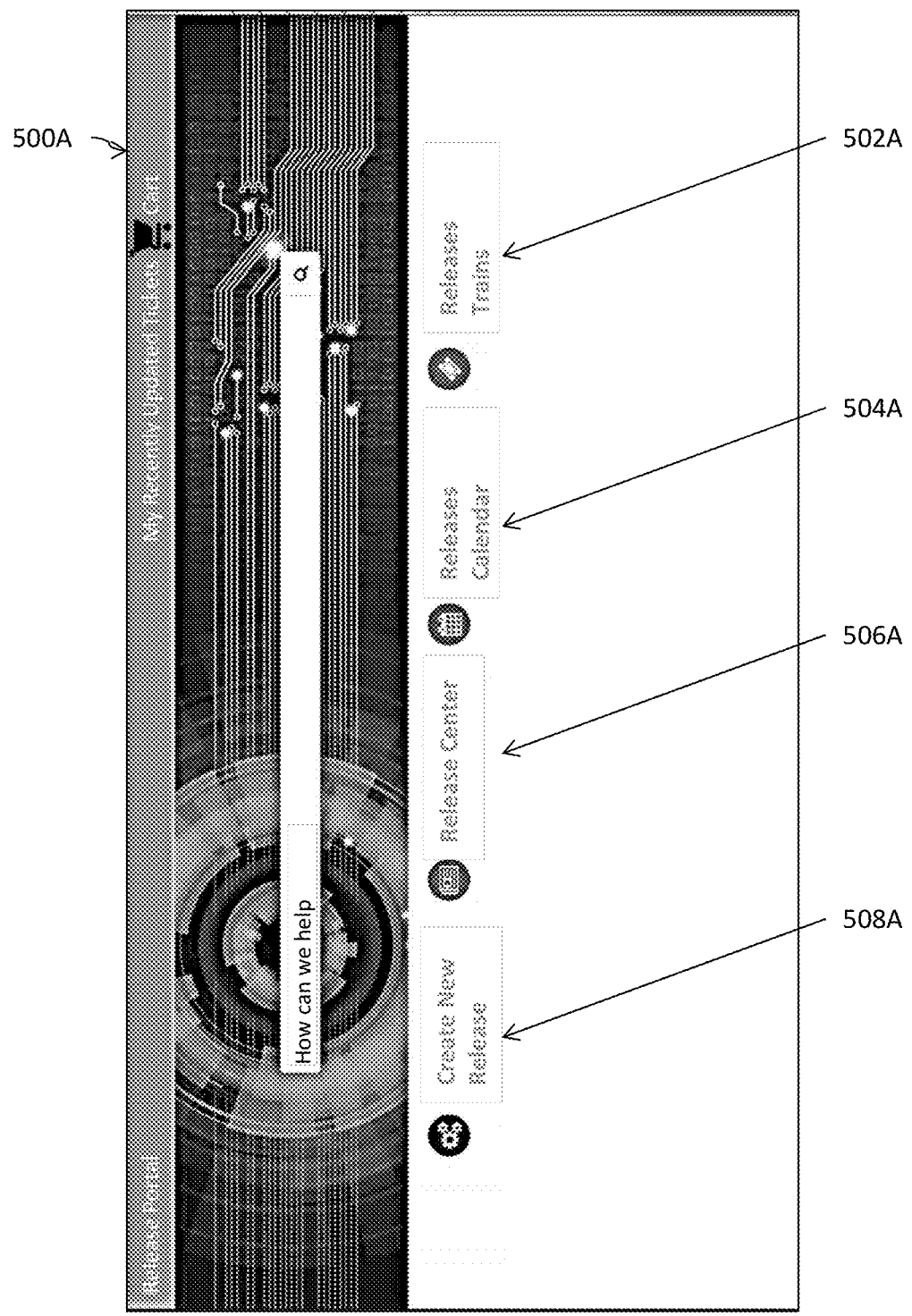
FIGS. 5A-5U illustrate some examples of user interfaces of various modules in one or more embodiments.
Figure 5B:
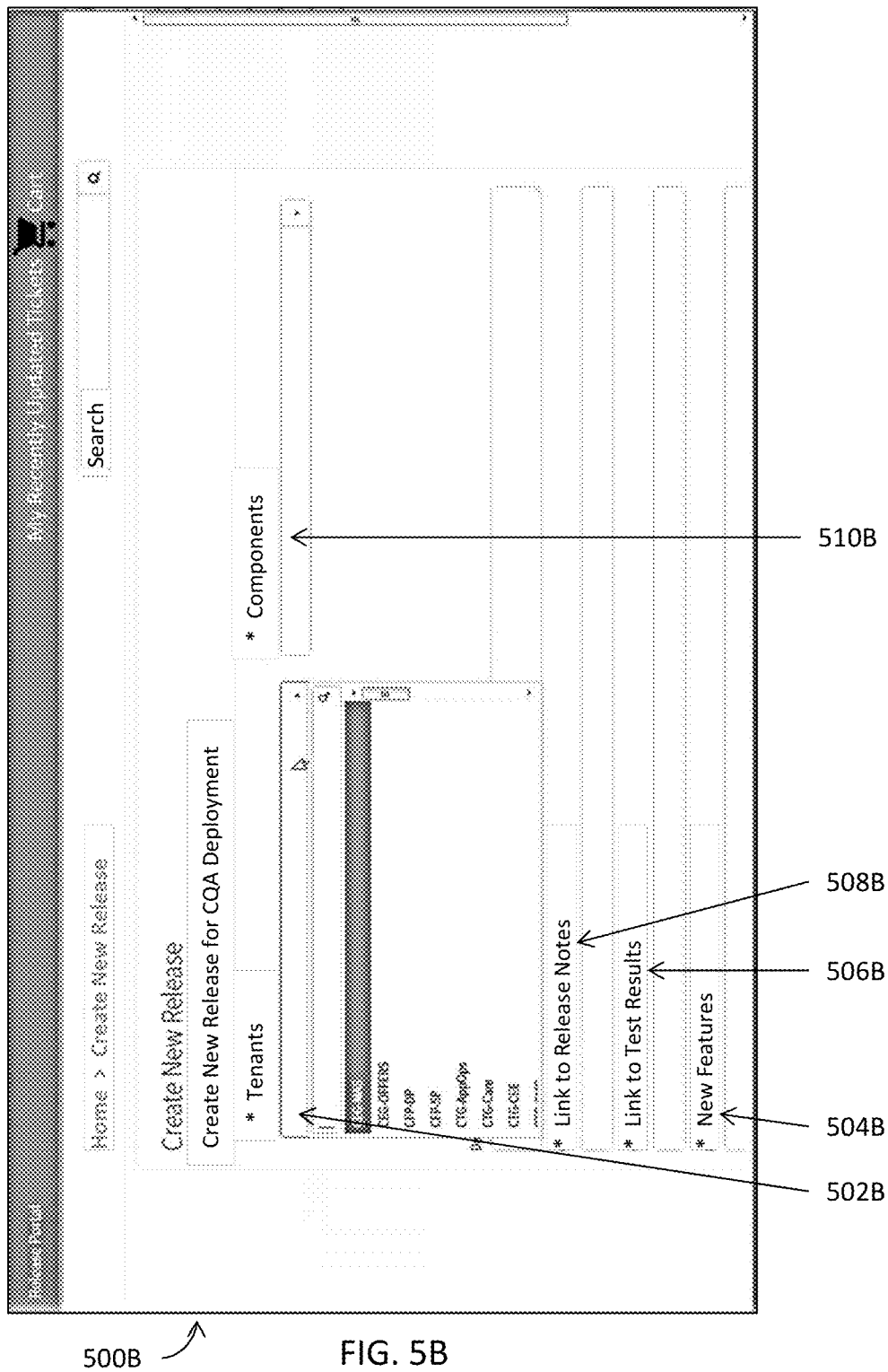
FIGS. 5V-5W jointly illustrate some examples of an indexed data structure that facilitates accesses to various pieces of information or data in one or more embodiments.
Figure 5C:
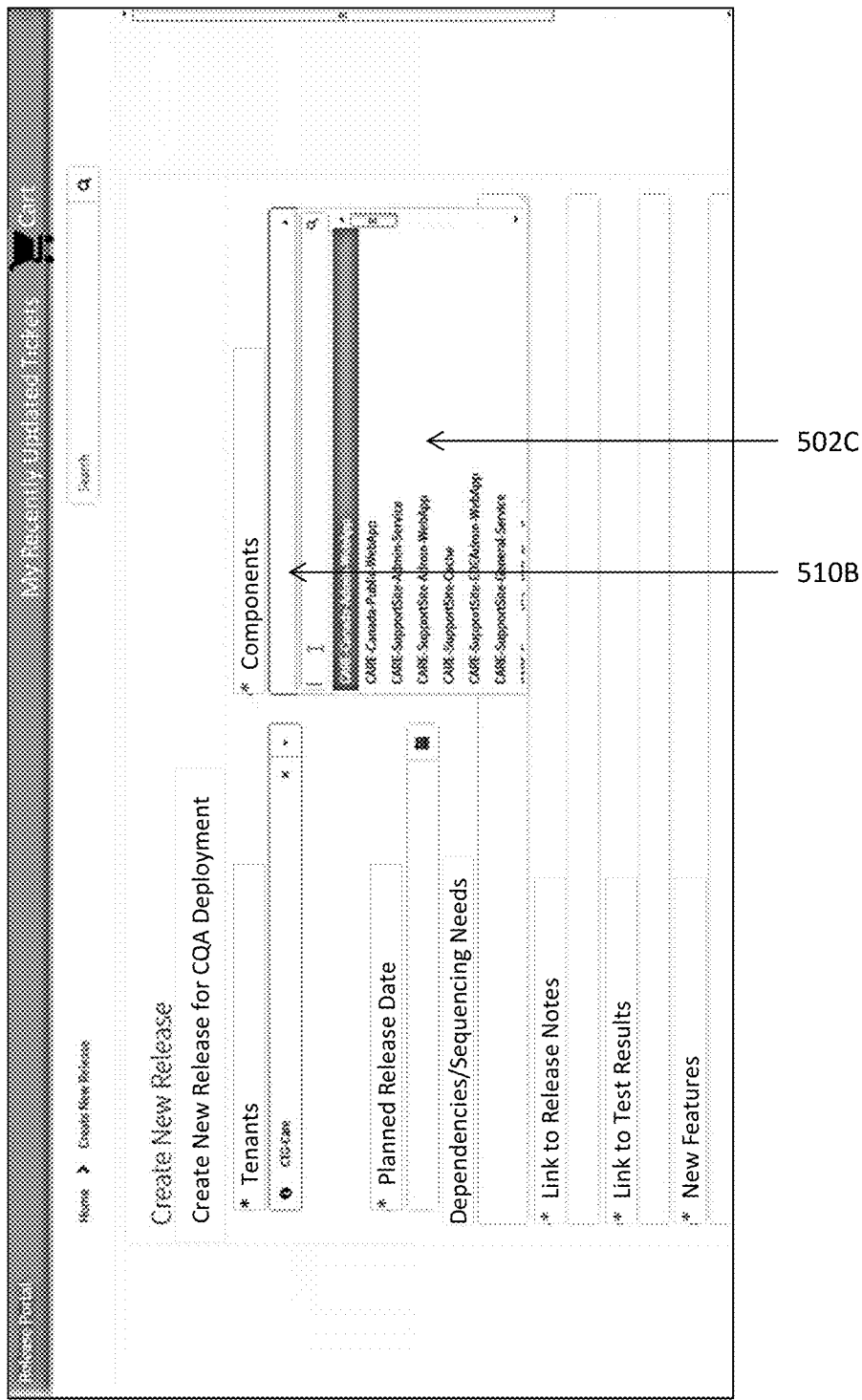
Figure 5D:
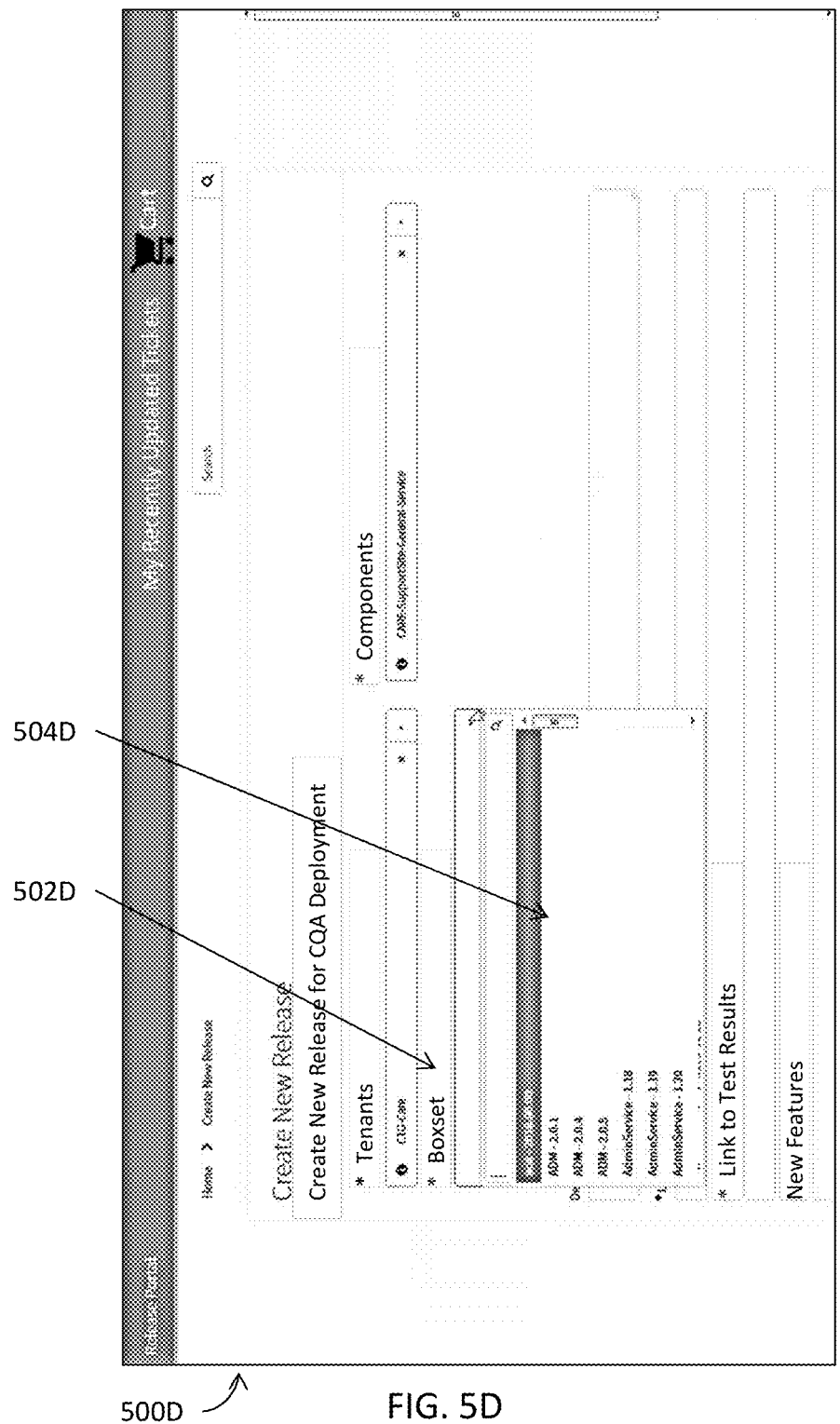
Figure 5E:
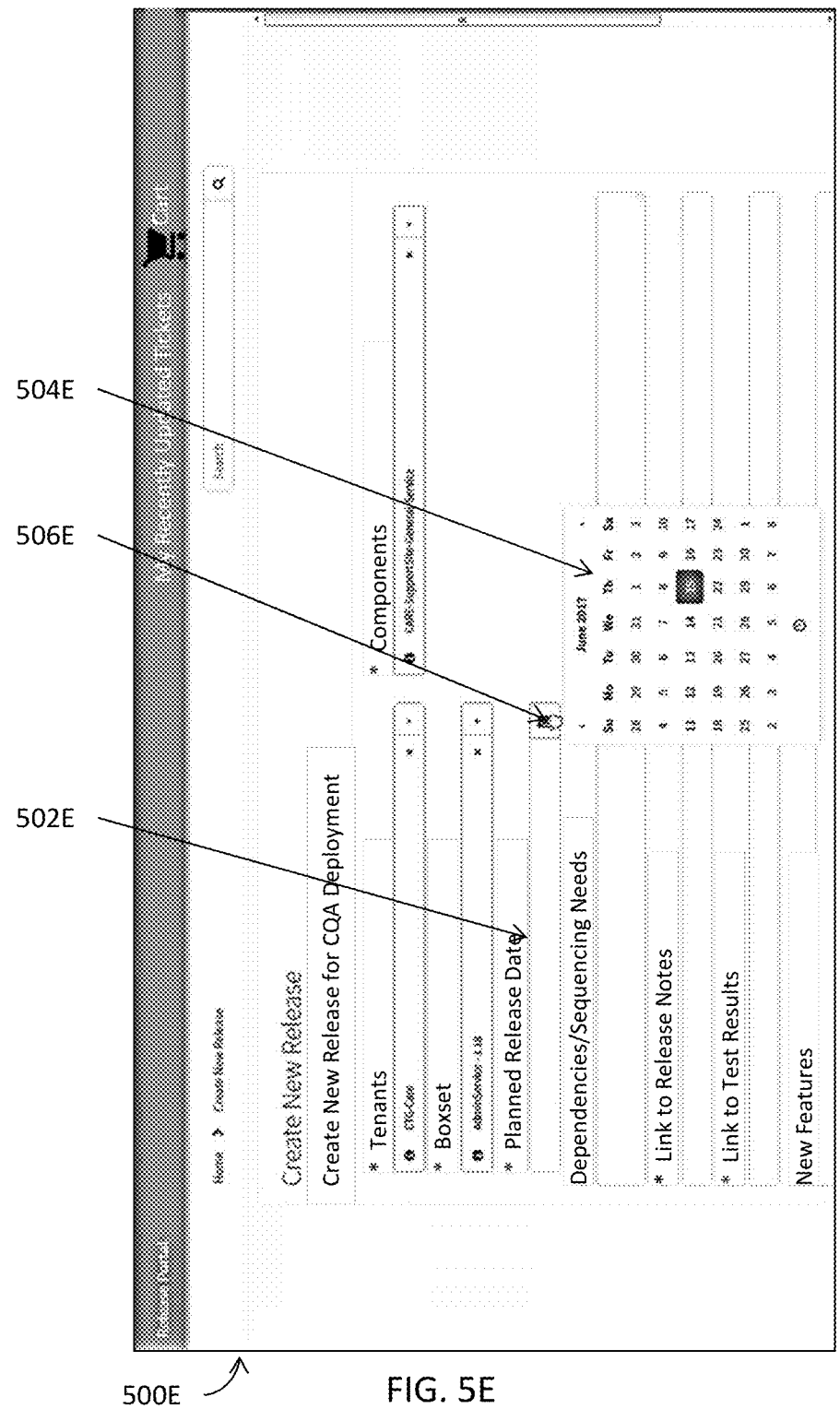
Figure 5F:
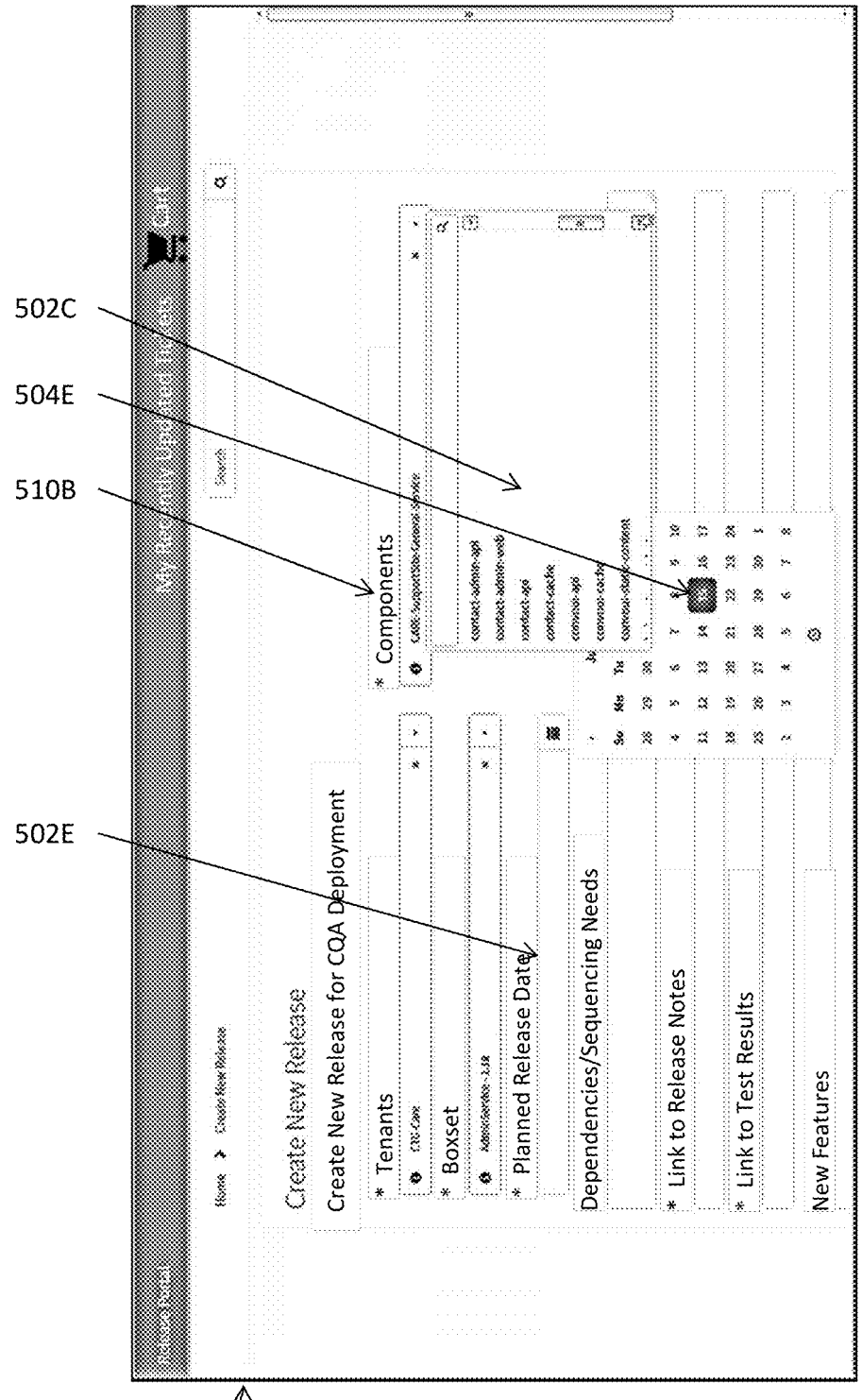
Figure 5G:
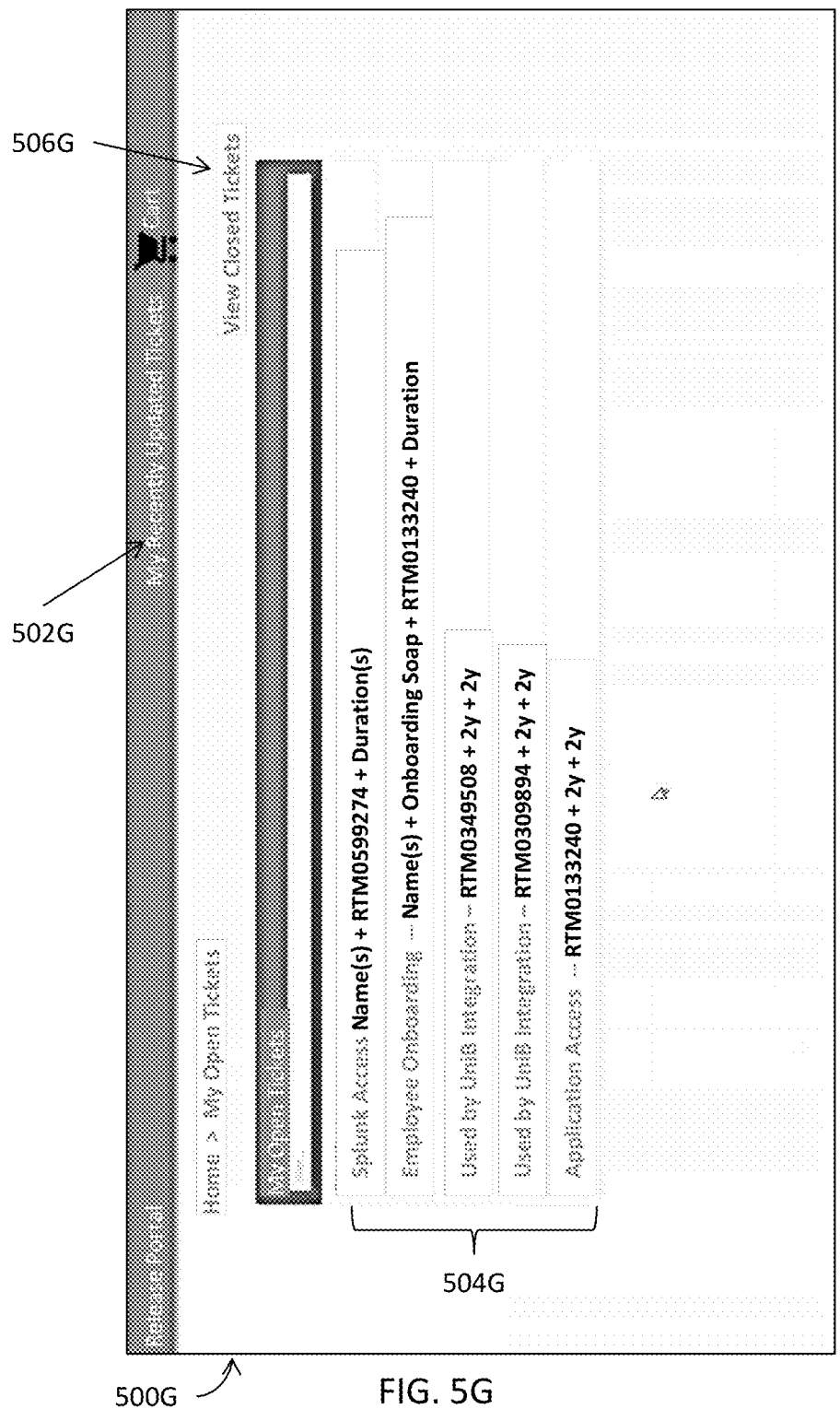
Figure 5H:
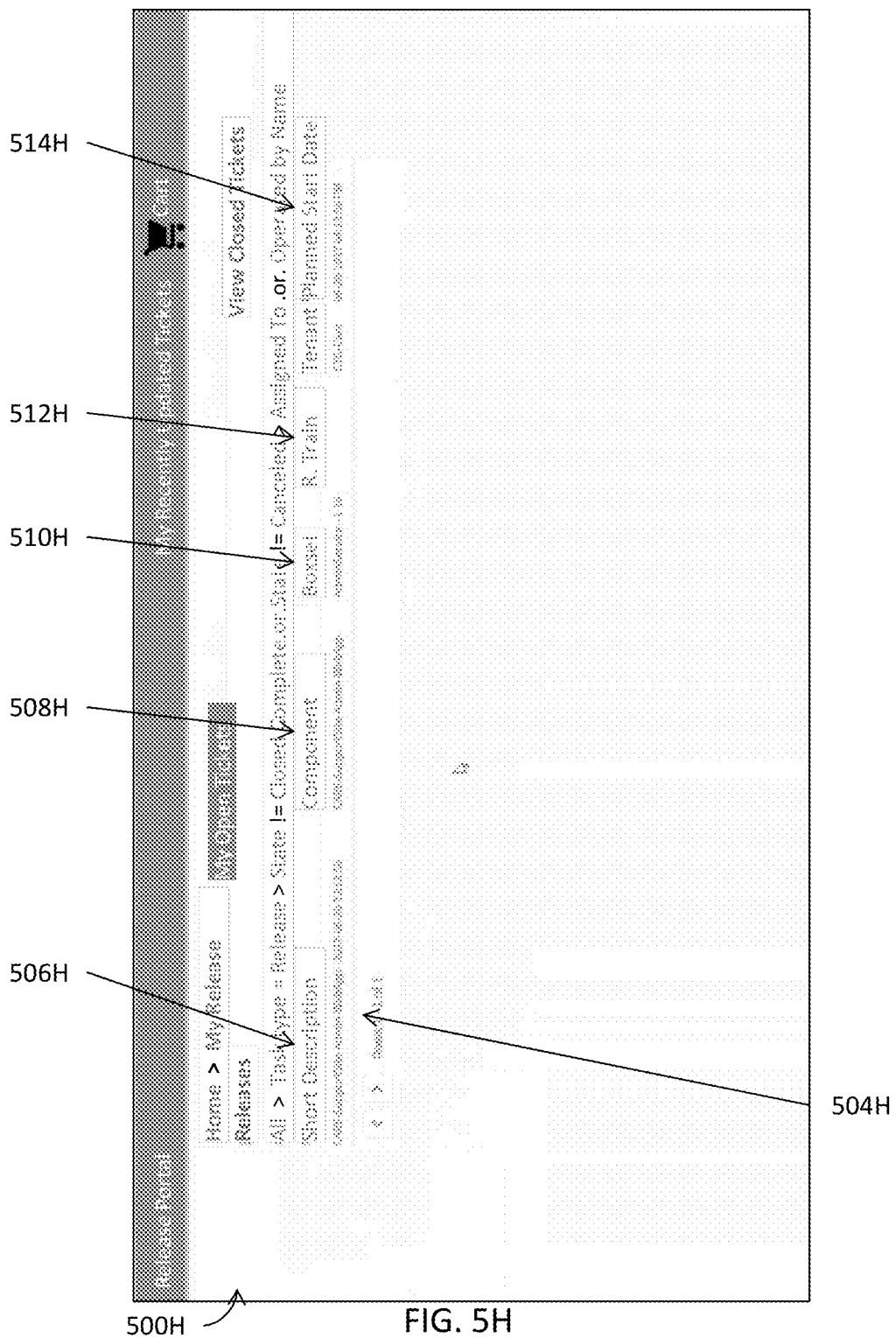
Figure 5I:
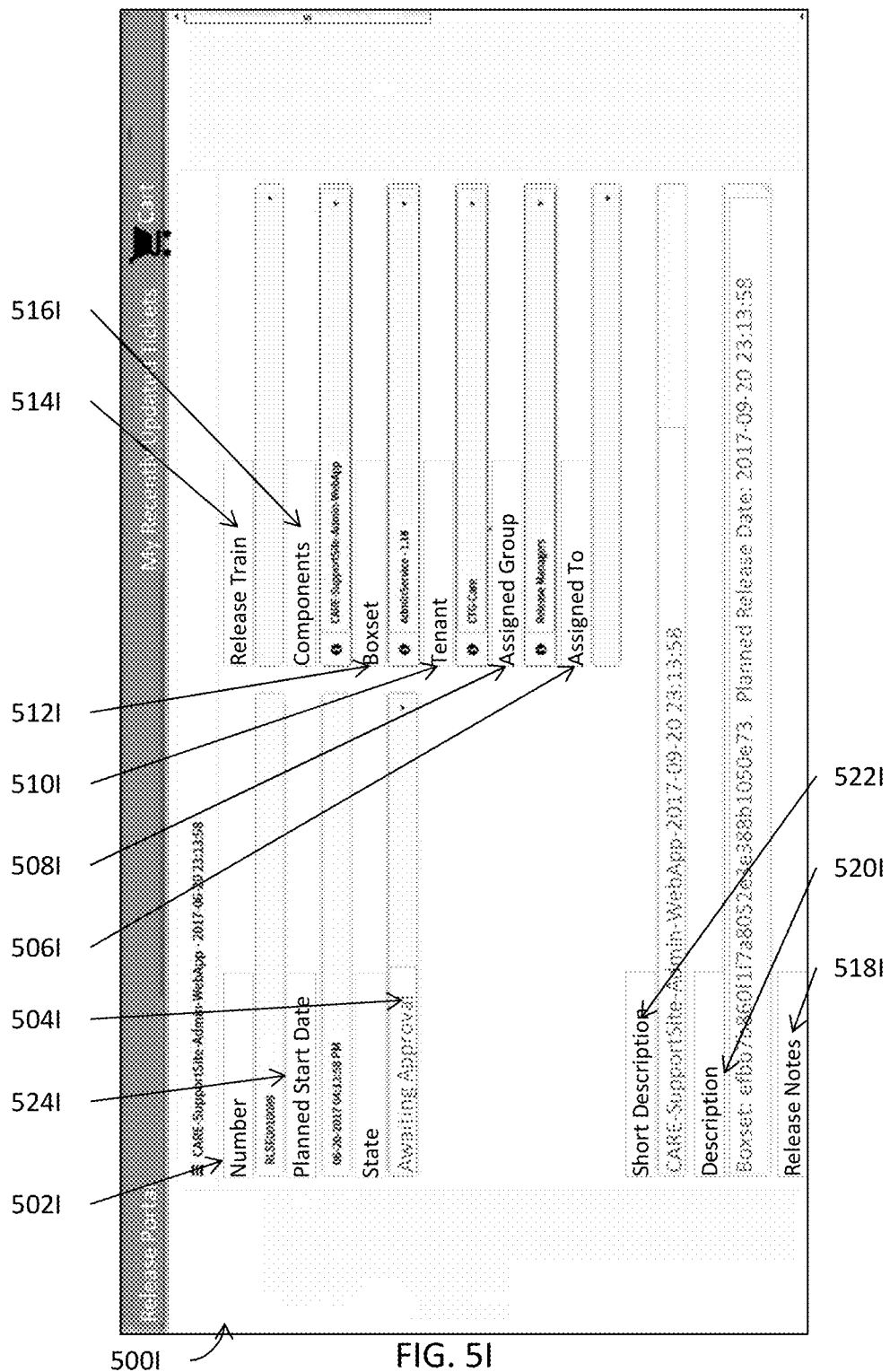
Figure 5J:
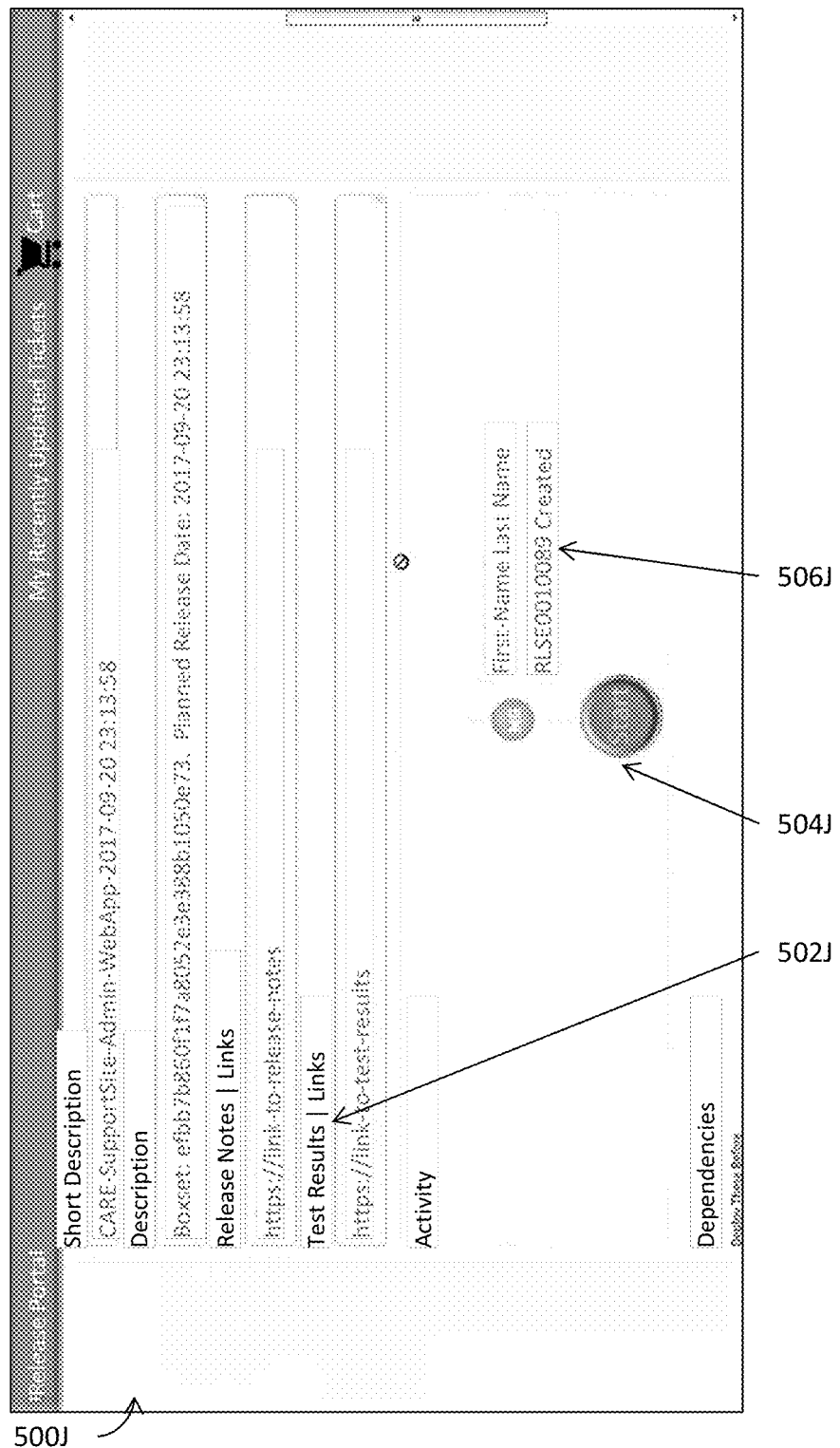
Figure 5K:
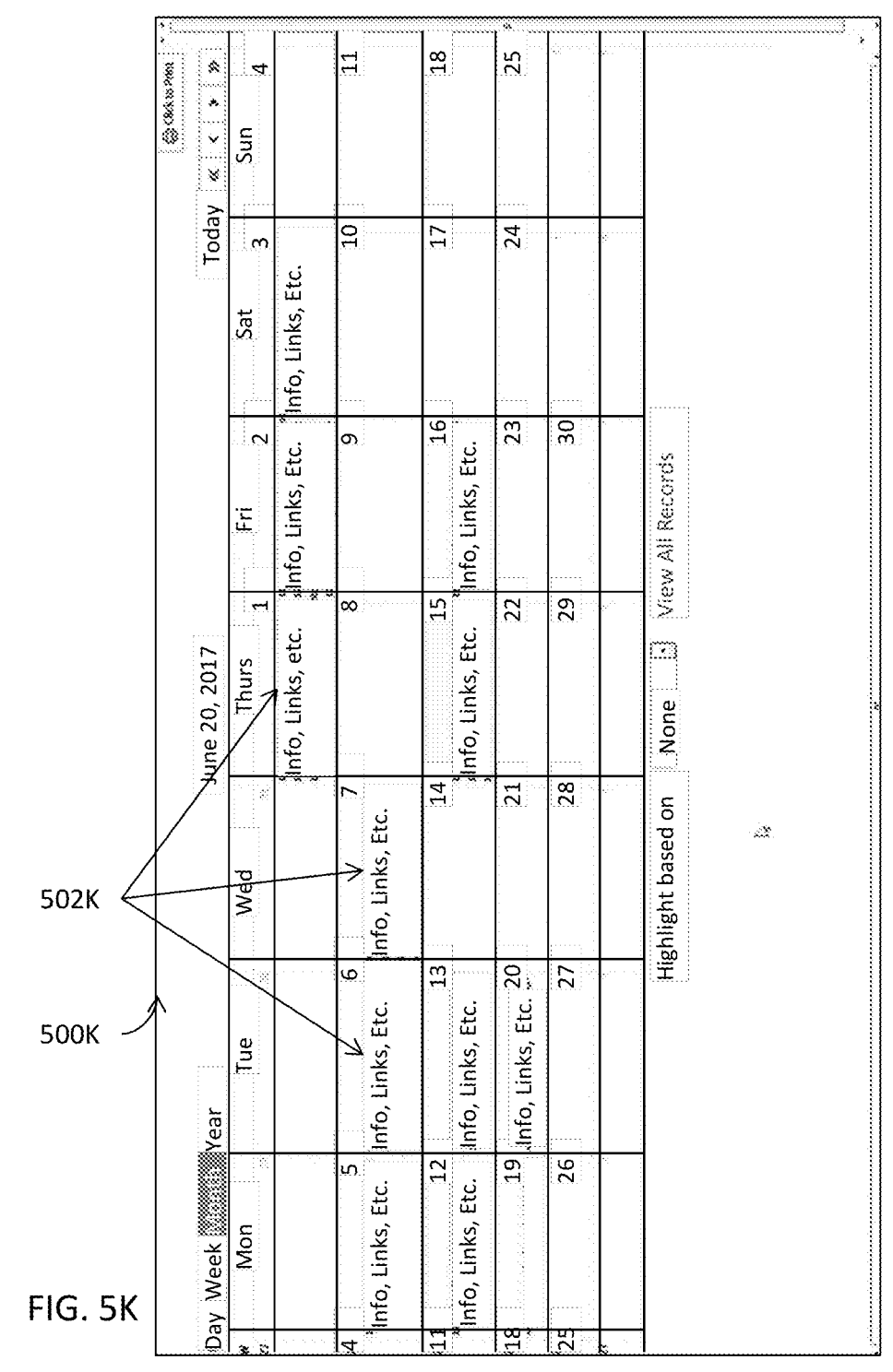
Figure 5L:
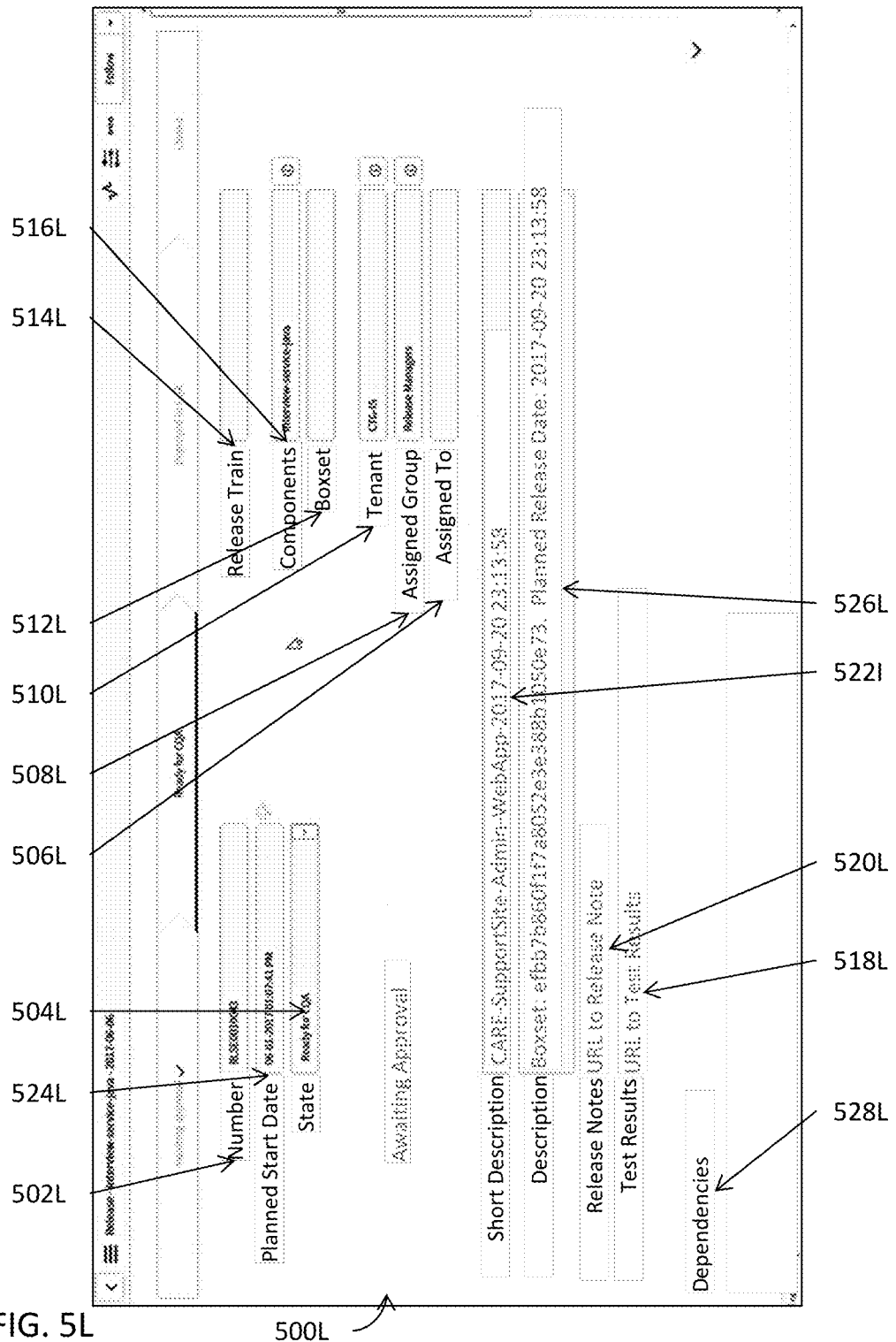
Figure 5M:
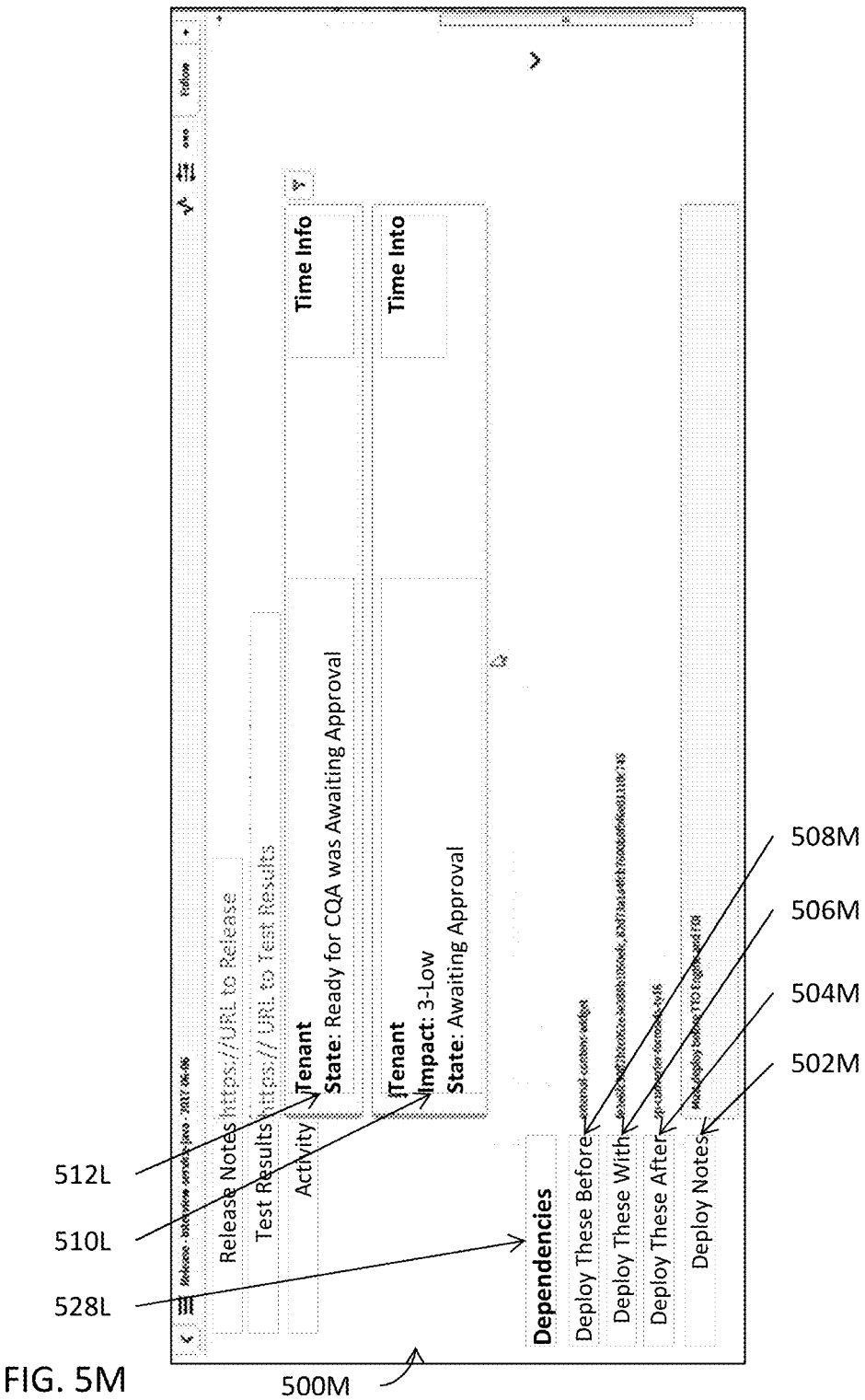
Figure 5N:
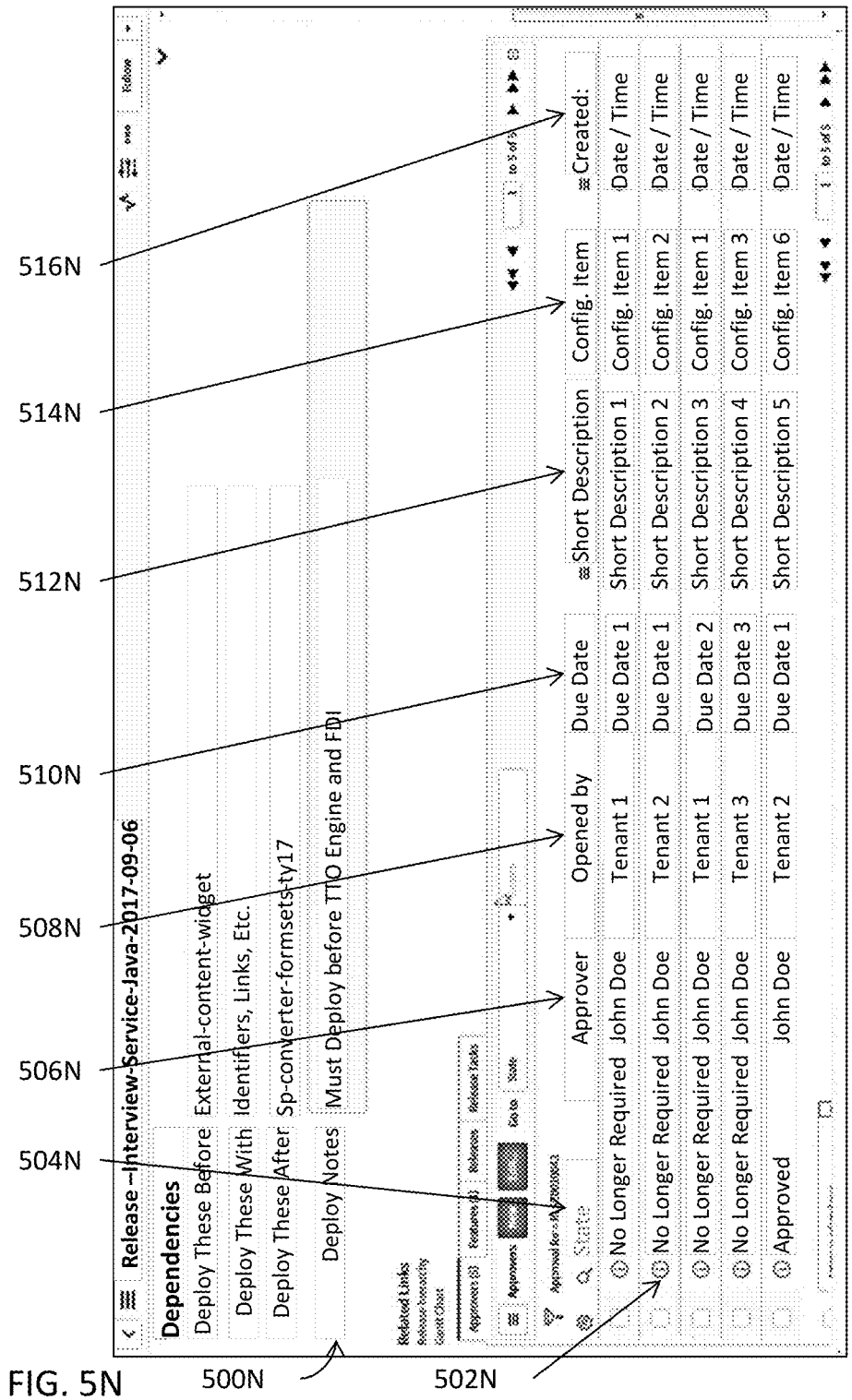
Figure 50:
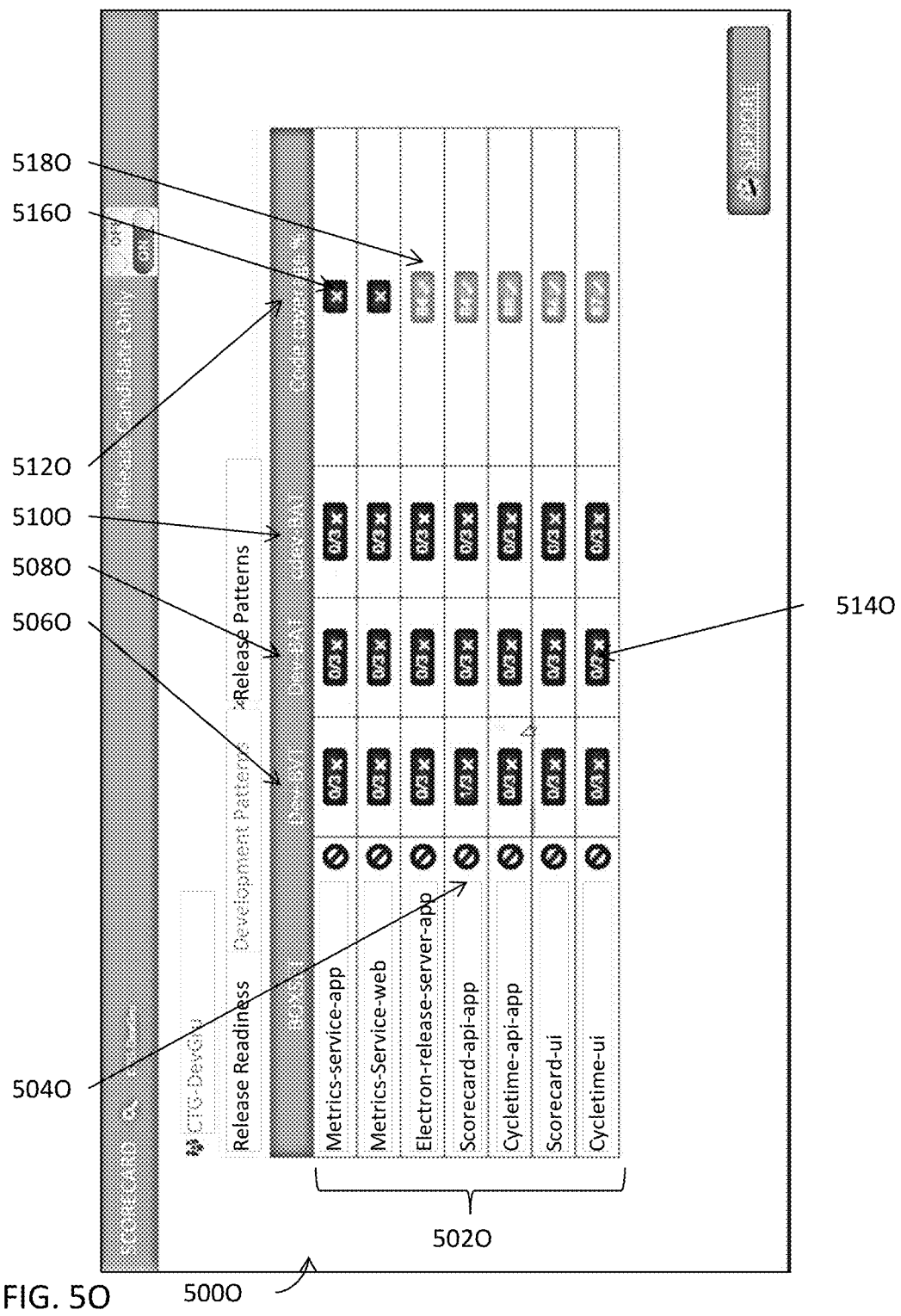
Figure 5P:
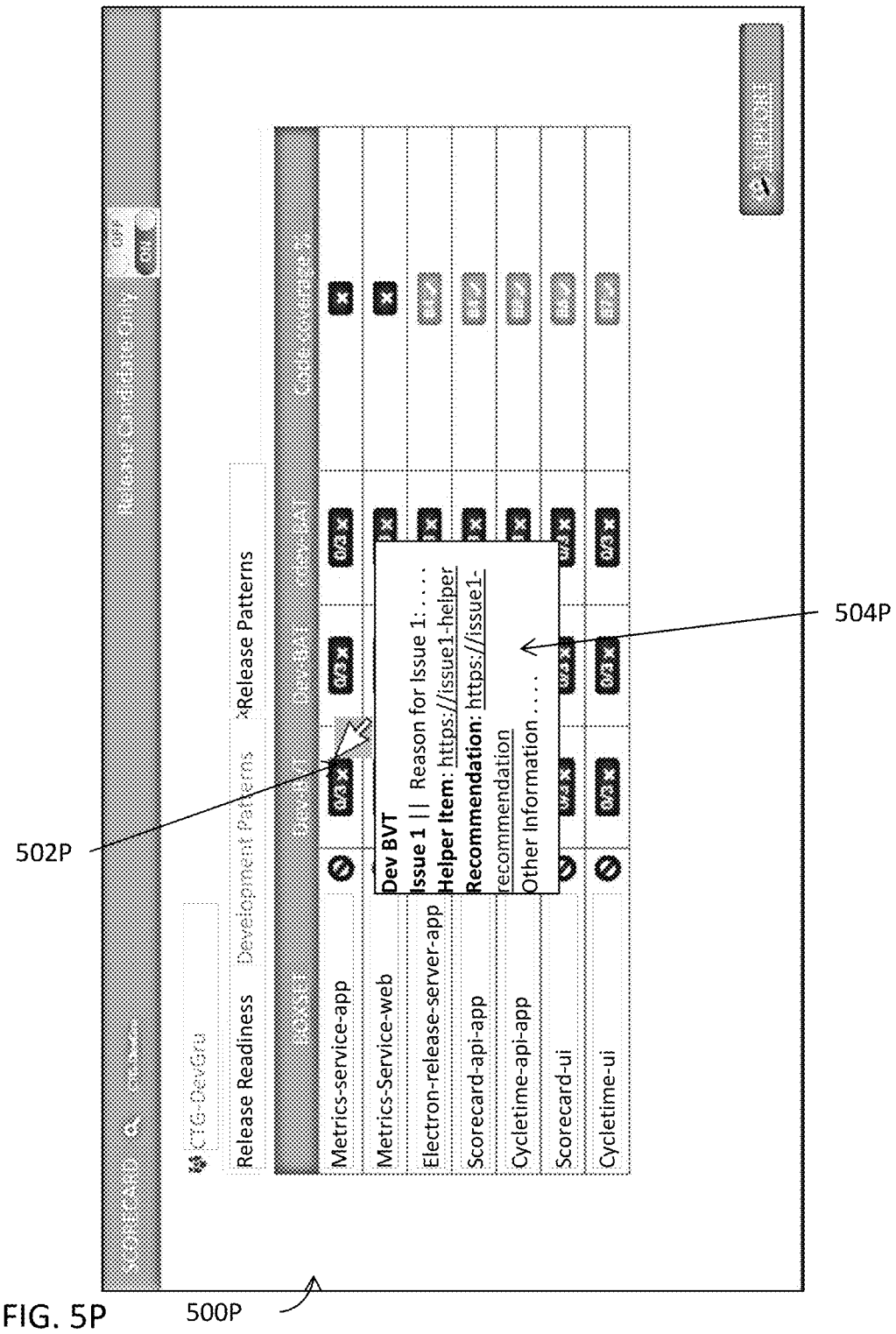
Figure 5Q:
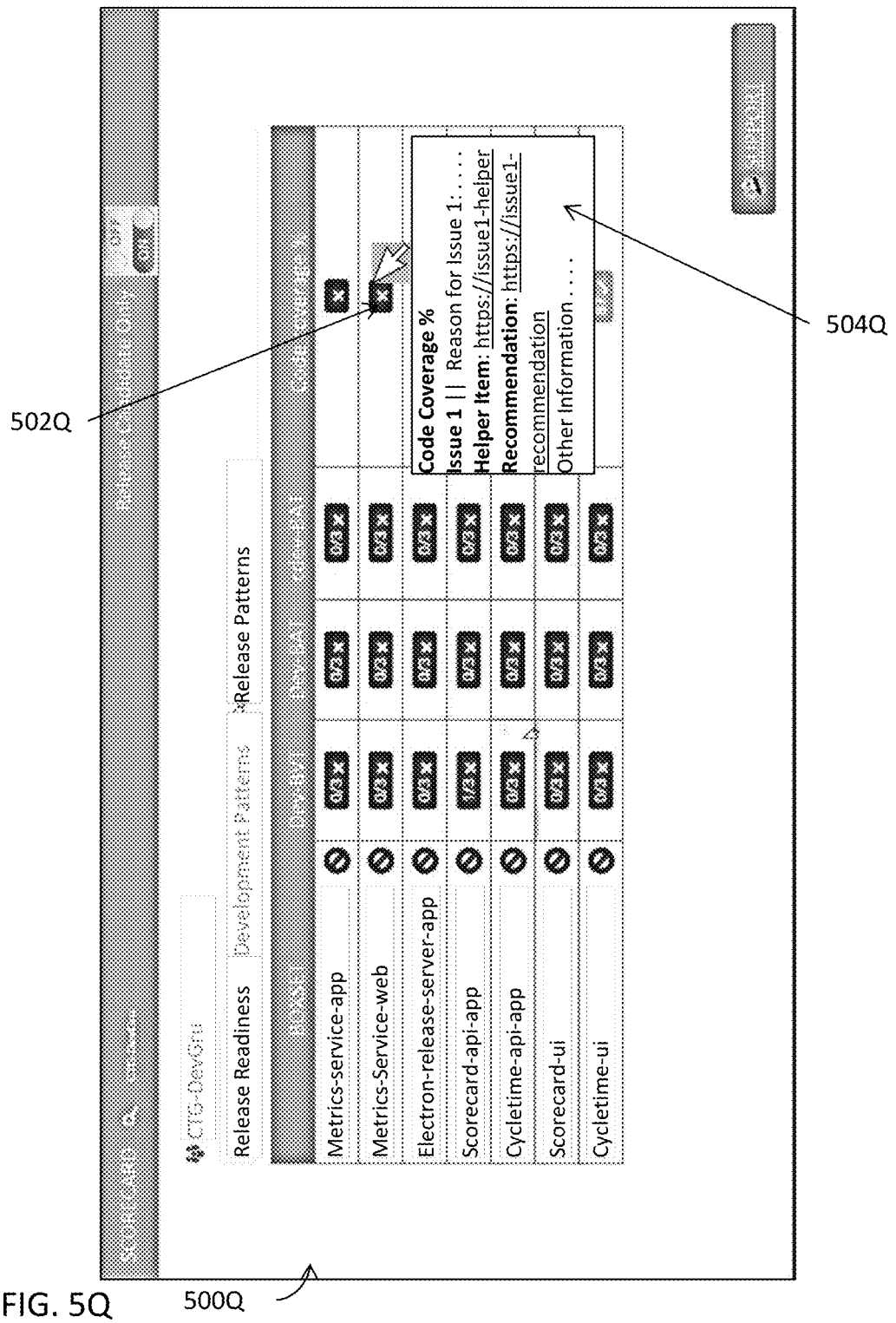
Figure 5S:
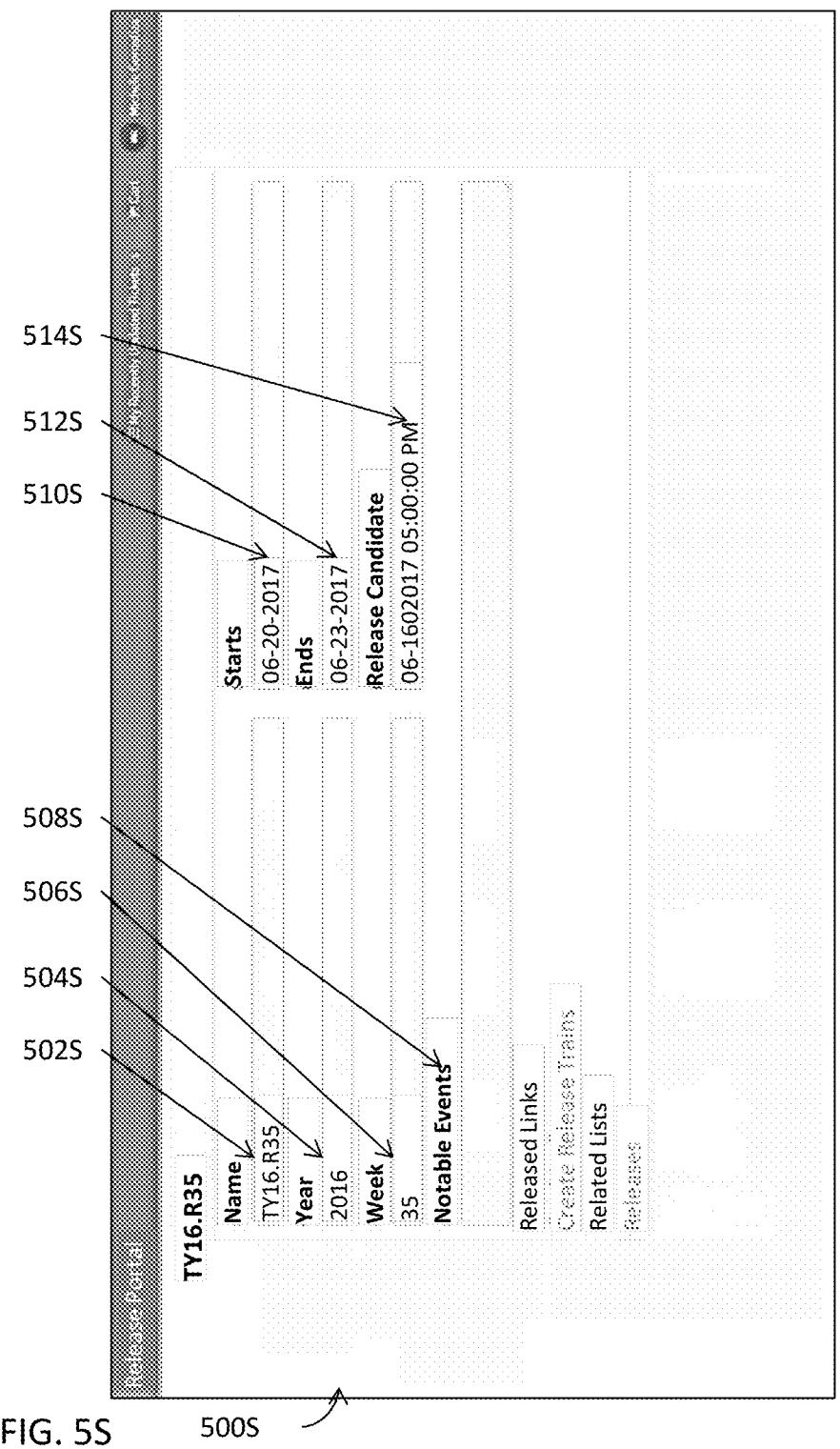
Figure 5T:
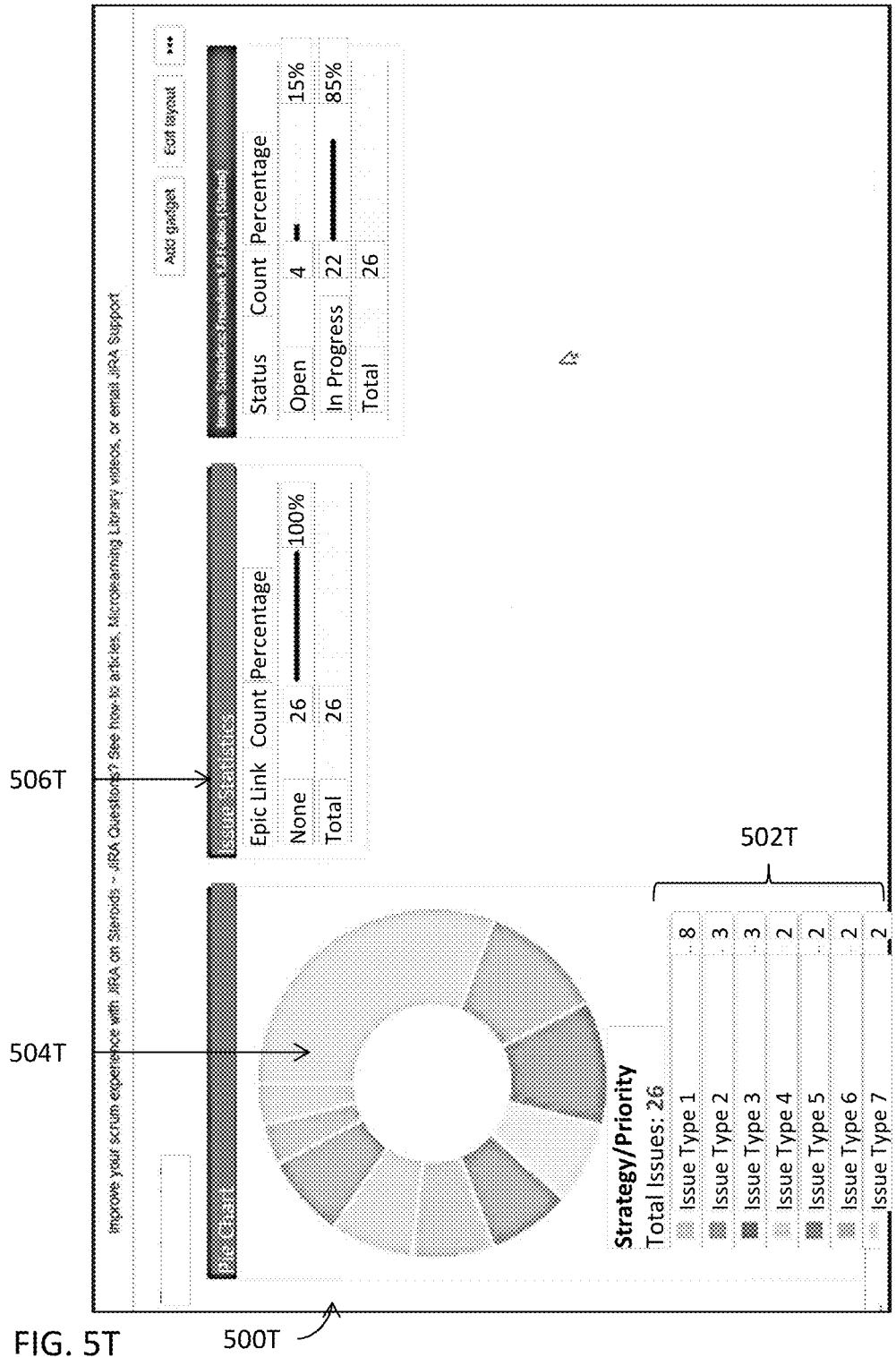
Figure 5U:
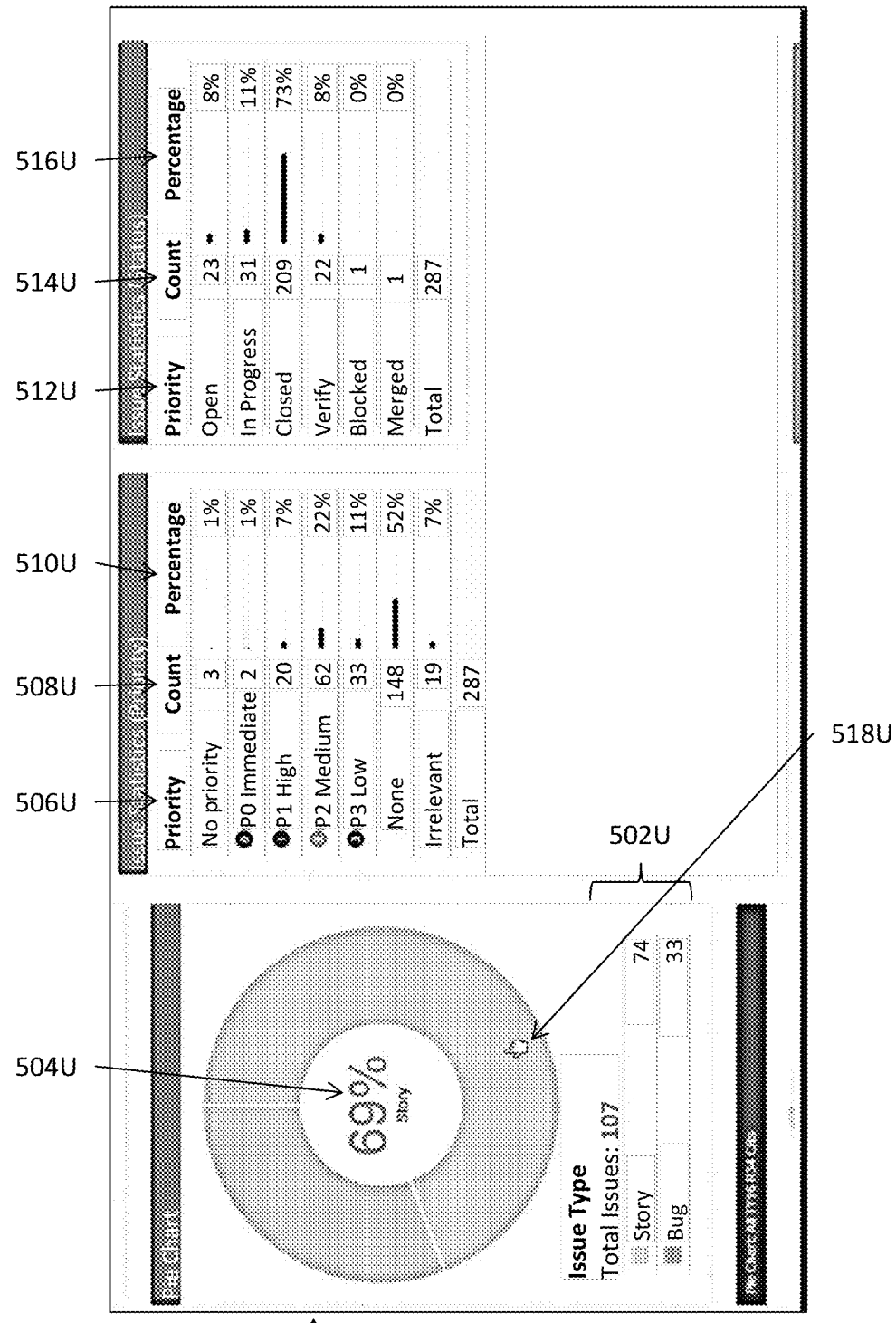
Figure 5V:
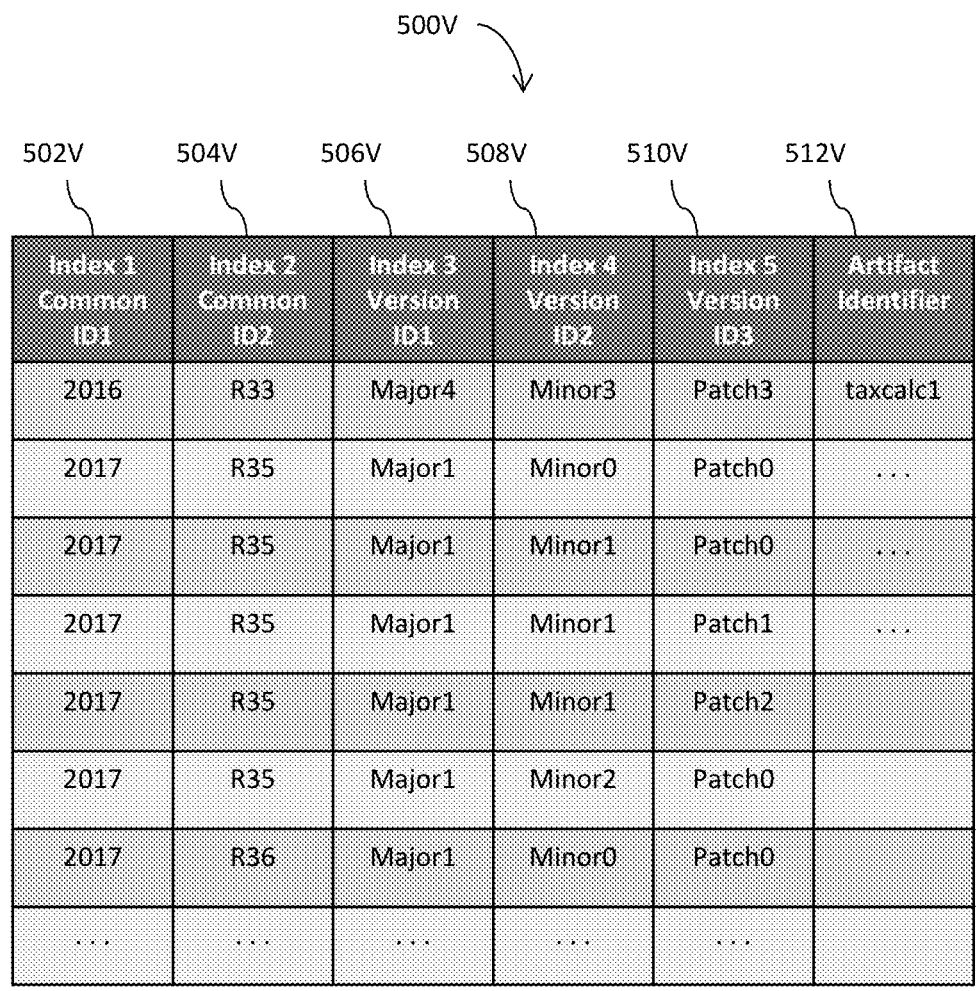
Figure 5W:
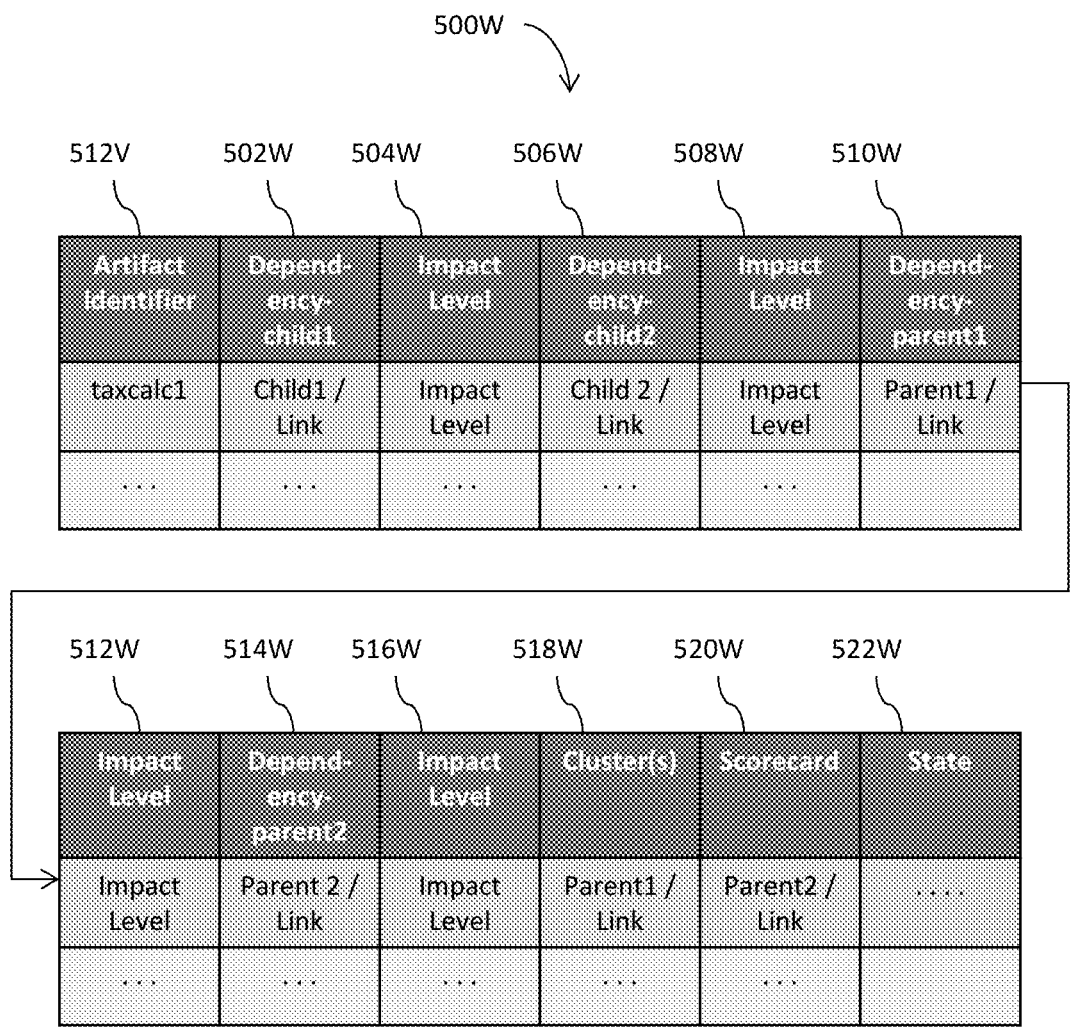

FIGS. 5A-5U illustrate some examples of user interfaces of various modules in one or more embodiments. FIG. 5A illustrates an example user interface for a portal 500A that further hosts release trains 502A managed by one or more release train modules, a release calendar 504A managed by one or more release calendar modules, a release center 506A managed by one or more release resource center modules, and creating new releases 508A managed by one or more release creation modules. More details about each of these modules are further described and illustrated below with reference to FIGS. 5B-5T.

FIG. 5B illustrates an example user interface for a screen of a release creation module 500B. In this example screen, a release creation module may automatically, autonomously, or programmatically populate one or more of tenant information 502B, new features or information therefor in a new release 504B, link(s) to test results of various tests 506B, link(s) to release note(s) 508B, and/or components in the new release 510B. Any of these fields may be automatically, autonomously, or programmatically populated in some embodiments with the capability of manual override with, for example, manual entries or manual inputs from a pull-down menu. Each of these links may lead to the display of the corresponding information in a separate screen or pop-up window in the current screen. For example, a link to a specific test result may bring up a separate screen or a pop-up window having graphical and/or textual representations to show various pieces of information, summary, etc. of the specific test result.

FIG. 5C illustrates further details about example user interface 500C for a screen of a release creation module 500B. More specifically, this example illustrated in FIG. 5C shows that the components referenced or used in a release may be automatically, autonomously, or programmatically populated by, for example, a release creation module. This information about the components may also be over-ridden with a manual input via a pull-down menu 502C. In some embodiments, this pull-down menu may be dynamically updated with the creation of one or more new components for the identified release.

FIG. 5D illustrates an example user interface for a screen of a release creation module 500D. More specifically, this example illustrated in FIG. 5D shows that the boxset 502D for a release may be automatically, autonomously, or programmatically created by, for example, a release creation module. This information about the boxset may also be over-ridden with a manual input via a pull-down menu 504D.

FIG. 5E illustrates an example user interface for a screen of a release creation module 500E. More specifically, this example illustrated in FIG. 5E shows that the planned release date 502E for a release may be automatically, autonomously, or programmatically determined by, for example, a release creation module by referencing other information about the release. This planned release date information may also be manually selected with a manual selection of the planned release date from a pop-up calendar 504E by, for example, clicking on the calendar icon 506E.

FIG. 5F illustrates an example user interface for a screen of a release creation module 500F. More specifically, this example illustrated in FIG. 5F shows that the planned release date 502E for a release as identified in the pop-up calendar 504E as well as automatically, autonomously, or programmatically populated information or manual selection of components 5106 from a pull-down menu 502C.

FIG. 5G illustrates an example user interface for another screen of a release creation module 500G. More specifically, this example illustrated in FIG. 5G shows the open tickets 504G for the release activities of a logged-in tenant for a release after clicking on a clickable link 502G to display "My Recently Updated Tickets". This example user interface 500G further includes another link 506G to show closed tickets for the logged-in tenant.

FIG. 5H illustrates an example user interface for another screen of a release creation module 500H. More specifically, this example illustrated in FIG. 5H shows a configurable display for the open ticket(s) 504H for a logged-in tenant with a criterion or configuration 504H that instructs the system to display open tickets for release activities whose state is not "completed", "canceled", or "closed" for the logged-in tenant. FIG. 5H further illustrates the short description 506H for an open ticket, the component(s) 508H involved in an open ticket, the associated boxset 510H for the open ticket, the information about the release train 512H, and the planned release date 514H by the tenant. Each open ticket may correspond to one or more release activities of the logged-in tenant for a release.

FIG. 5I illustrates an example user interface for a screen of a release resource center module 500I. More specifically, this example illustrated in FIG. 5I shows that the release resource center module may automatically, autonomously, or programmatically populate the screen with information including the name of the release 502I, the planned release date information 524I, the state of the release 504I, information about the component(s) 516I involved in this release, which tenant(s) the identified component is assigned to 506I, the assigned tenant group for the identified component 508I, the tenant information 510I, the boxset 512I involved with this identified component, information about the release train 514I, a short description 522I for the release, a more detailed description 520I for the release, and links 518I to release notes 522I.

FIG. 5J illustrates the example user interface for the screen of a release resource center module 500J which is an extension of the example screen 500I illustrated in FIG. 5I. In addition to the information included in the example screen of the user interface illustrated in FIG. 5I, this example illustrated in FIG. 5J shows that the release resource center module may automatically, autonomously, or programmatically populate the screen with additional information including links to test results 502J, a submit button 504J to submit the request to create a new release, and information about the logged-in tenant 506J.

FIG. 5K illustrates an example user interface for a screen of a release calendar module 500K as well as various entries 502K that may be automatically, autonomously, or programmatically populated into the example release calendar. These entries may be filtered based on one or more criteria. For example, a tenant may configure the release calendar to show only open tickets of release activities for which the tenant is responsible.

FIG. 5L illustrates an example user interface for a screen of a release resource center module 500L. More specifically, this example illustrated in FIG. 5L shows that the release resource center module may automatically, autonomously, or programmatically populate the screen with information including the name of the release 502L, the planned release date information 524L, the state of the release 504L, information about the component(s) 516L involved in this release, which tenant(s) the identified component is assigned to 506L, the assigned tenant group for the identified component 508L, the tenant information 510L, the boxset 512L involved with this identified component, information about the release train 514L, a short description 522L for the release, a more detailed description 526L for the release, links 520L to release notes, links 518L to test results, and dependencies 528L.

FIG. 5M illustrates an example user interface for the screen of the release resource center module 500M. In addition to the information illustrated in FIG. 5L, this example illustrated in FIG. 5M shows that the release resource center module may automatically, autonomously, or programmatically populate the screen with additional dependency information including, for example, information about deploy notes 502M, that the components (e.g., the identified component 516L in FIG. 5L) are to be deployed after the deployment of certain components 504M, that the identified components are to be deployed with one or more first components 506M, and that the identified components are to be deployed before one or more second components 508M. The additional information may further include release activities that are categorized by the tenants, the state of the release activities 512L, and the assessed impact level of a release activity 510L.

FIG. 5N illustrates an example user interface for the screen of the release resource center module 500N. In addition to the information illustrated in FIGS. 5L-5M, this example illustrated in FIG. 5N shows that the release resource center module may automatically, autonomously, or programmatically populate the screen with additional information including, for example, approver information 502N. This additional approver information 502N may include a list of approvers of various release activities initiated by a logged-in tenant, the respective states 504N for each listed item, the respective approvers 506N, the respective tenants 508N who opened the release activities, the respective due dates of the release activities 510N, the respective short descriptions 512N, the respective configuration item(s) 514N, and the respective date and time information 516N for the listed release activities.

FIG. 5O illustrates an example user interface for a screen of a scorecard module 500O. More specifically, this example screen shows a list of boxsets 502O with respective graphical indicators 504O showing whether the boxset is ready for deployment to the next stage. The example scorecard screen 500O may further include corresponding tenants 506O ("Dev-BVT"), 508O ("Dev-BAT"), and 510O ("cdev-BAT") as shown in FIG. 5O. The example scorecard screen may also include the code coverage percentage 512O listing respective code coverage percentages for each of the listed boxsets that may be involved in a release of a software application delivery model.

A field in the code coverage percentage may include a graphical and/or textual indication of the code coverage for the corresponding boxset. This graphical and/or textual indication may represent the state or status of code coverage and may use different symbolic and/or numeric indications to indicate the respective code coverage based on some threshold limits. For example, a boxset having a code coverage percentage below a first threshold limit (e.g., 60%) may be indicated with a "do not proceed" indicator 516O; a boxset having a code coverage percentage above a second threshold limit (e.g., 80%) may be indicated with a "proceed" indicator 518O; a boxset having a code coverage percentage between the first threshold limit and the second threshold limit may be indicated with a different indicator (e.g., "in progress").

One or more of these indicators may also be associated and displayed with a numeric value of the code coverage percentage such as 518O. A scorecard module may also populate the example screen with the states of boxsets for which a tenant is responsible. The states may be represented with graphical and/or textual information 514O to indicate, for example, how many release tasks are to be performed by a tenant (e.g., as indicated by "3" as shown by 514O in FIG. 5O), how may release tasks have been completed (as indicated by "0" as shown by 514O), whether the boxset for which a specific tenant is responsible is ready to proceed (as indicated by the "X" mark in 514O).

FIG. 5P further illustrates that the state or status indicator 502P in the example scorecard screen 500P may include a link which, when clicked upon, brings up a pop-up menu 504P including various pieces of information pertaining to this particular state or status. These various pieces of information in the pop-up window 504P may include, for example, the identification of the tenant responsible for the release or deployment of the corresponding boxset, one or more helper items providing information about the release activities or explanations for the readiness or the lack thereof to proceed along the release pipeline or reasons that hinder the deployment or release of the corresponding boxset, one or more recommendations to help the tenant to clear the activities so that the corresponding boxset is ready for deployment or release.

FIG. 5Q further illustrates that the state or status indicator 502Q in the example scorecard screen 500Q may include a link which, when clicked upon, brings up a pop-up menu 504P including various pieces of information pertaining to this particular state or status of the code coverage percentage field. These various pieces of information in the pop-up window 504Q may include, for example, the code coverage percentage determined by one or more modules described herein, one or more issues or reasons that result in the determined code coverage percentage, the identification of the tenant responsible for the release or deployment of the corresponding boxset, one or more helper items providing information about the determined code coverage percentage, one or more recommendations to help the tenant to improve, if necessary, the code coverage percentage for the corresponding boxset.

FIG. 5R illustrates an example user interface for a screen of a release train module 500R. More specifically, this example screen shows a list of releases 502R as well as information including, for example, the respective names 504R, the respective start dates 506R, the respective end dates 508R, the respective release candidates 510R, and information of the respective events 512R.

FIG. 5S illustrates an example user interface for a screen of a release resource center module 500S. More specifically, this example screen shows that the release resource center module may provide information such as the name of a selected release 502S, the year 504S and week 504S of the release, the start date of the release 510S, the end date of the release 512S, the identification of the release candidate 514S, and information about notable events 508S.

FIG. 5T illustrates an example user interface for a screen of a scorecard module 500T. More specifically, this example screen shows a list of issue types 502T with respective number of issues. This example screen also shows the total number of issues as well as a pie chart 504T that illustrates the proportional portions of the list of issues types based on their respective number of issues relative to the total number of issues. FIG. 5T also shows issue statistics 506T that include, for example, the number or the percentage of open issues and the number or the percentage of issues in progress.

FIG. 5U illustrates an example user interface for a screen of a scorecard module 500U. More specifically, this example screen shows a list of issue types 502U including "story" issue type and "bug" issue type with respective number of issues as well as the total number of issues. This example screen also shows the percentage of the issues (69%) 504U when the pointing device cursor 518U hovers the corresponding portion representing a type of issues in the pie chart the total number of issues that are further divided into groups based on their respective priorities 506U. The number of issues 508U corresponding to each priority and the relative percentage 510U may also be included as the issue statistics as illustrated in FIG. 5U. The total number of issues may further be classified by their states (e.g., open, in progress, closed, verify, blocked, merged, etc.) 512U with their respective issue counts 514U and respective percentages 516U.

FIGS. 5V-5W jointly illustrate some examples of an indexed data structure that facilitates accesses to various pieces of information or data in one or more embodiments. In these examples, an indexed data structure 500V may include one or more columns storing indices that may be used to index the data structure or one or more other data structures or database tables. These one or more columns may include, for example, a plurality of index columns storing a plurality of version identifiers or a portion thereof.

For an example of a version identifier like yyyy.release-number.major.minor.patch, column 502V may store the tax year identifier ("yyyy"); column 504V may store the release number identifier ("release.number"); column 506V may store the major revision identifier ("major"); column 508V may store the minor revision identifier ("minor"); and column 510V may store the patch revision identifier ("patch"). This index data structure 500V may further store, in the same index structure or in a separate data structure or a separate database table, the artifact identifier 512V that corresponds to a specific revision identifier.

This index structure 500V may be used to index the remaining portion of the data structure or to index one or more other data structures or database tables described herein to facilitate the access to and identification of data records with operations such as database query operations. For example, the data structure or database table may be indexed in such a way so that the data records therein are sorted with respect to one or more keys so that any query seeking to identify a specific data record needs not traverse an entire column (e.g., an identifier column) to identify the desired data record. Rather, indices may be used to quickly locate the desired data record for both random lookup and access of such ordered data records in the data structure or database table, without having to search every row in the data structure or database table each time the data structure or database table is accessed. In some embodiments, these index columns may be included in the data structure or database table. In some other embodiments, these index columns may be stored in a separate data structure or database table.

FIG. 5W further illustrates that the data structure or database table 500V illustrated in FIG. 5V or one or more other data structures or database tables may be further augmented with additional information to further facilitate the access to and identification of data records with operations such as database query operations. For example, the data structure 500W illustrated in FIG. 5W may include, for example, the first child dependency 502W that may be impacted by the artifact in column 512V, the assessed impact level 504W associated with the second child dependency in 502W, the second child dependency 506W that may be impacted by the artifact in column 512V, and the assessed impact level 504W associated with the first child dependency in 508W.

The data structure 500W illustrated in FIG. 5W may further include, for example, the parent child dependency 510W that may impact the artifact in column 512V, the assessed impact level 512W associated with the first parent dependency in 510W, the second parent dependency 514W that may impact the artifact in column 512V, and the assessed impact level 516W associated with the second parent dependency in 514W. This data structure 500W may also include the one or more clusters or links therefor 518W of the corresponding artifact, the scorecard information or link thereof 520W for the corresponding artifact, and the state information or link thereof 522W for the artifact.

With the indexing capability, this data structure or any other data structures or database tables described herein may be used to facilitate relatively quicker access to and identification of data records with operations such as database query operations using indices to quickly locate the desired data record for both random lookup and access of such ordered data records in the data structure or database table, without having to search every row in the data structure or database table each time the data structure or database table is accessed.

Figure 6:
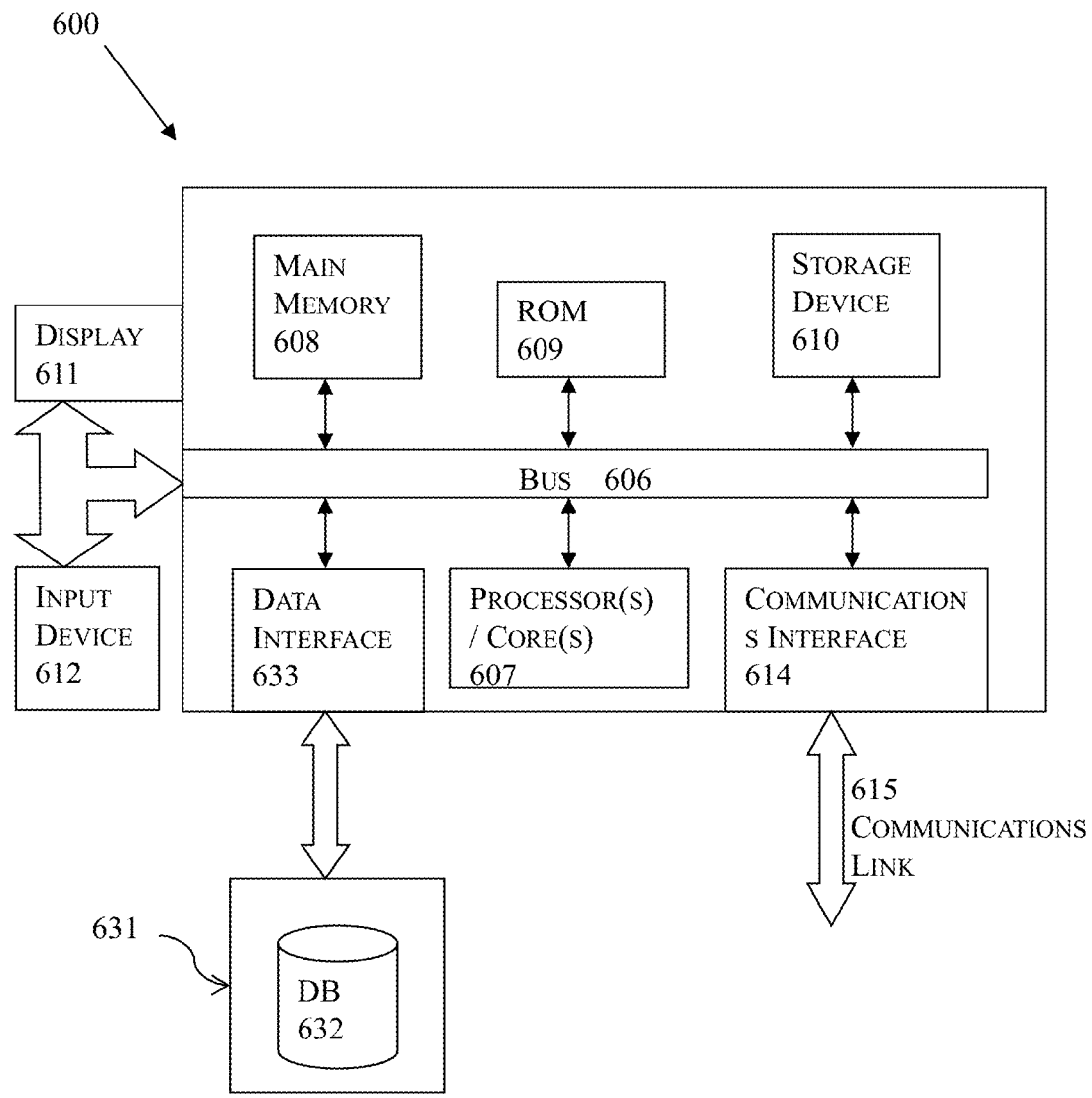
FIG. 6 illustrates a block diagram of an illustrative computing system suitable for integrated platform for continuous deployment of software application delivery models and for automating the release and deployment of a software application delivery model for the continuous release and deployment of the software application delivery model described herein.

Referring to FIG. 6, a block diagram of components of an illustrative computing system 600 suitable for implementing various embodiments of the invention is illustrated. For example, the exemplary computing system 600 may be used to implement various processes as described in the preceding paragraphs and the figures such as various processes or modules of classification modules, dependency determination modules, impact assessment modules, etc. as described in the remainder of the Application. Computer system 600 includes a bus 606 or other communication mechanism for communicating information, which interconnects subsystems and devices, such as processor 607, system memory 608 (e.g., RAM), static storage device 909 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

According to one embodiment of the invention, computer system 600 performs specific operations by one or more processors or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 607 may be used to perform various actions such as various actions, processes, or modules involving determining, analyzing, performing actions, etc. In some embodiments, at least one of the one or more processors or processor cores 607 has the multithreading capability.

In one embodiment, the term "logic" shall mean any combination of software or hardware that is used to implement all or part of the invention. In the single embodiment or in some embodiments, the one or more processors or processor cores 607 may be used to perform various acts such as various acts involving determining, analyzing, performing actions, etc. In some embodiments, at least one of the one or more processors or processor cores 607 has the multithreading capability to execute a plurality of threads to perform various tasks as described in the preceding sections.

Various actions as described in the preceding paragraphs may be performed by using one or more processors, one or more processor cores, or combination thereof 607. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that contains a database 632 that is readily accessible by the computer system 600. The computer system 600 communicates with the data storage system 631 through a data interface 633. A data interface 933, which is coupled to the bus 606, transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

It shall also be noted that although various examples described or drawings illustrated herein refer to a merchant's pairing a connected device (e.g., a cellular phone) with a wireless peripheral (e.g., a wireless transaction card reader), various aspects described apply with full and equal effects to any users who are pairing their connected devices to various types of wireless peripherals. Therefore, the reference to a merchant or a wireless transaction card reader are not intended to and shall not be interpreted as limiting the scope of the application or the scope of the claims, unless otherwise specifically recited or claimed.

Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. Accordingly, embodiments are intended to exemplify alternatives, modifications, and equivalents that may fall within the scope of the claims.

What is claimed is:

1. A computer implemented method for automating the release and deployment of a software application delivery model for the continuous release and deployment of the software application delivery model, comprising:
   identifying, by a portal comprising computer-executable instructions stored at partially in memory and executed by at least one microprocessor, a release of a software application delivery model and pertinent information describing content of the release, describing activity related to the release, and/or produced during development of the release;
   determining dependencies among at least some of the pertinent information, the dependencies defining how components of the release affect other processing;
   generating tracking records at least by tracking the release based in part or in whole upon the dependencies;
   determining, from the tracking records, that a release activity hindering advancement of the release or a portion of the release is cleared, wherein the release activity is hindering advancement due to work on code for the release being incomplete, and the release activity is cleared in response to the work on the code being completed; and
   advancing the release or the portion of the release from a current stage to a next stage along a release pipeline in response to the determining that the release activity is cleared.

2. The computer implemented method of claim 1, wherein determining the dependencies comprises:
   clustering the at least some of the pertinent information into one or more clusters;
   determining at least some of the dependencies using the one or more clusters; and
   identifying a plurality of artifacts, one or more code modules, the release activity, or relevant information associated with the release.

3. The computer implemented method of claim 2, wherein determining the dependencies further comprises:
   identifying one or more version identifiers or one or more synonyms for the plurality of artifacts, the one or more code modules, the release activity, or the relevant information; and
   determining some or all of the dependencies based in part or in whole upon the one or more version identifiers, the one or more synonyms, or code scanning.

4. The computer implemented method of claim 3, wherein determining the some or all of the dependencies comprises:
   identifying a release activity or first information pertaining to the release; and
   identifying one or more version identifiers or one or more common identifiers pertaining to the release activity or the first information.

5. The computer implemented method of claim 4, wherein determining the some or all of the dependencies further comprises:
   identifying a set of artifacts or code modules that has been branched into a boxset based in part or in whole upon the one or more version identifiers or the one or more common identifiers; and
   identifying identifiers or synonyms of the set of artifacts or code modules from a database that is managed by a release resource module and maintains detailed information of the release.

6. The computer implemented method of claim 5, wherein determining the some or all of the dependencies further comprises:
   determining at least some of the dependencies at least by querying the database to select one or more release activities, artifacts, code modules, or a combination thereof with the identifiers or the synonyms or by code scanning; and
   identifying pertinent release activities, artifacts, code modules, or a combination thereof into one or more columns in a dependency data structure or in the database.

7. The computer implemented method of claim 6, wherein determining the some or all of the dependencies comprises:
   indexing the dependency data structure or the database with one or more key columns that corresponding to the one or more columns for the pertinent release activities, artifacts, code modules, or a combination thereof.

8. The computer implemented method of claim 1, wherein generating the tracking records comprises:
   identifying a plurality of tenants corresponding to the release;
   identifying a plurality of artifacts, a plurality of code modules, or a combination of one or more artifacts of the plurality of artifacts and one or more code modules of the plurality of code modules;
   identifying one or more issues or one or more states with one or more threshold limits; and
   classifying the one or more issues or the one or more states into one or more types.

9. The computer implemented method of claim 8, wherein generating the tracking records comprises:
   tracking at least one type of the one or more types to generate and store at least some tracking records of the tracking records; and
   executing one or more actions in response to the one or more issues or the one or more states based in part or in whole upon one or more criteria.

10. The computer implemented method of claim 9, wherein generating the tracking records comprises:
   monitoring one or more branching version identifiers for the plurality of artifacts, the plurality of code modules, or the combination; and
   monitoring one or more version identifiers for the one or more branching version identifiers.

11. The computer implemented method of claim 10, wherein generating the tracking records comprises:
   identifying first information pertaining to an issue or a state of the one or more issues or the one or more states; and
   identifying or determining one or more dependency relations affecting or affected by the first information.

12. The computer implemented method of claim 11, wherein generating the tracking records comprises:

determining a priority level for the issue or the state based at least in part upon the one or more dependency relations; and identifying the plurality of artifacts, the plurality of code modules, or the combination one or more artifacts and one or more code modules corresponding to the one or more branching version identifiers.

13. The computer implemented method of claim 12, wherein generating the tracking records comprises:

tracking one or more states of the branching version identifiers, the plurality of artifacts, the plurality of code modules, or the combination one or more artifacts and one or more code modules for the issue or the state; and identifying a first set of one or more artifacts, one or more code modules, or a combination of at least one artifact and at least one code module based in part or in whole upon a triggering event based in part or in whole upon one or more states.

14. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for automating the release and deployment of a software application delivery model for the continuous release and deployment of the software application delivery model, the set of acts comprising:

identifying, by a portal comprising computer-executable instructions stored at partially in memory and executed by at least one microprocessor, a release of a software application delivery model and pertinent information describing content of the release, describing activity related to the release, and/or produced during development of the release;

determining dependencies among at least some of the pertinent information, the dependencies defining how components of the release affect other processing;

generating tracking records at least by tracking the release based in part or in whole upon the dependencies;

determining, from the tracking records, that a release activity hindering advancement of the release or a portion of the release is cleared, wherein the release activity is hindering advancement due to work on code for the release being incomplete, and the release activity is cleared in response to the work on the code being completed; and advancing the release or the portion of the release from a current stage to a next stage along a release pipeline in response to the determining that the release activity is cleared.

15. The article of manufacture of claim 14, wherein the set of acts further comprises:

clustering the at least some of the pertinent information into one or more clusters;

determining at least some of the dependencies using the one or more clusters; and identifying a plurality of artifacts, one or more code modules, the release activity, or relevant information associated with the release.

16. The article of manufacture of claim 15, wherein the set of acts further comprises:

identifying one or more version identifiers or one or more synonyms for the plurality of artifacts, the one or more code modules, the release activity, or the relevant information;

determining some or all of the dependencies based in part or in whole upon the one or more version identifiers, the one or more synonyms, or code scanning;

identifying a release activity or first information pertaining to the release; and identifying one or more version identifiers or one or more common identifiers pertaining to the release activity or the first information.

17. The article of manufacture of claim 16, wherein the set of acts further comprises:

identifying a set of artifacts or code modules that has been branched into a boxset based in part or in whole upon the one or more version identifiers or the one or more common identifiers;

identifying identifiers or synonyms of the set of artifacts or code modules from a database that is managed by a release resource module and maintains detailed information of the release; and determining at least some of the dependencies at least by querying the database to select one or more release activities, artifacts, code modules, or a combination thereof with the identifiers or the synonyms or by code scanning.

18. The article of manufacture of claim 17, wherein the set of acts further comprises:

identifying pertinent release activities, artifacts, code modules, or a combination thereof into one or more columns in a dependency data structure or in the database; and indexing the dependency data structure or the database with one or more key columns that corresponding to the one or more columns for the pertinent release activities, artifacts, code modules, or a combination thereof.

19. The article of manufacture of claim 14, wherein the set of acts further comprises: identifying a plurality of tenants corresponding to the release;

identifying a plurality of artifacts, a plurality of code modules, or a combination of one or more artifacts of the plurality of artifacts and one or more code modules of the plurality of code modules;

identifying one or more issues or one or more states with one or more threshold limits; and classifying the one or more issues or the one or more states into one or more types.

20. The article of manufacture of claim 19, wherein the set of acts further comprises:

tracking at least one type of the one or more types to generate and store at least some tracking records of the tracking records;

executing one or more actions in response to the one or more issues or the one or more states based in part or in whole upon one or more criteria;

monitoring one or more branching version identifiers for the plurality of artifacts, the plurality of code modules, or the combination; and monitoring one or more version identifiers for the one or more branching version identifiers.

21. The article of manufacture of claim 20, wherein the set of acts further comprises:

identifying first information pertaining to an issue or a state of the one or more issues or the one or more states;

identifying or determining one or more dependency relations affecting or affected by the first information;

determining a priority level for the issue or the state based at least in part upon the one or more dependency relations;

identifying the plurality of artifacts, the plurality of code modules, or the combination one or more artifacts and one or more code modules corresponding to the one or more branching version identifiers.

22. The article of manufacture of claim 21, wherein the set of acts further comprises:
   tracking one or more states of the branching version identifiers, the plurality of artifacts, the plurality of code modules, or the combination one or more artifacts and one or more code modules for the issue or the state; and
   identifying a first set of one or more artifacts, one or more code modules, or a combination of at least one artifact and at least one code module based in part or in whole upon a triggering event.

23. A system for automating the release and deployment of a software application delivery model for the continuous release and deployment of the software application delivery model, comprising:
   a plurality of modules, at least one of which is stored at least partially in memory and comprises at least one microprocessor including one or more processor cores executing one or more threads;
   a non-transitory computer accessible storage medium storing thereupon program code that includes a sequence of instructions that, when executed by the at least one microprocessor, causes the at least one microprocessor at least to:
   identify, by a portal comprising computer-executable instructions stored at partially in memory and executed by at least one microprocessor, a release of a software application delivery model and pertinent information describing content of the release, describing activity related to the release, and/or produced during development of the release;
   determine dependencies among at least some of the pertinent information, the dependencies defining how components of the release affect other processing;
   generate tracking records at least by tracking the release based in part or in whole upon the dependencies;
   determine, from the tracking records, that a release activity hindering advancement of the release or a portion of the release is cleared, wherein the release activity is hindering advancement due to work on code for the release being incomplete, and the release activity is cleared in response to the work on the code being completed; and
   advance the release or the portion of the release from a current stage to a next stage along a release pipeline in response to the determining that the release activity is cleared.

24. The system of claim 23, wherein the program code includes further instructions that, when executed by the at least one microprocessor or processor core, cause the at least one processor or processor core at least further to:
   cluster the at least some of the pertinent information into one or more clusters;
   determine at least some of the dependencies using the one or more clusters;
   identify a plurality of artifacts, one or more code modules, the release activity, or relevant information associated with the release;
   identify one or more version identifiers or one or more synonyms for the plurality of artifacts, the one or more code modules, the release activity, or the relevant information; and
   determine some or all of the dependencies based in part or in whole upon the one or more version identifiers, the one or more synonyms, or code scanning.

25. The system of claim 24, wherein the program code includes further instructions that, when executed by the at least one microprocessor or processor core, cause the at least one processor or processor core at least further to:
   identify a release activity or first information pertaining to the release; and
   identify one or more version identifiers or one or more common identifiers pertaining to the release activity or the first information;
   identify a set of artifacts or code modules that has been branched into a boxset based in part or in whole upon the one or more version identifiers or the one or more common identifiers; and
   identify identifiers or synonyms of the set of artifacts or code modules from a database that is managed by a release resource module and maintains detailed information of the release.

26. The system of claim 25, wherein the program code includes further instructions that, when executed by the at least one microprocessor or processor core, cause the at least one processor or processor core at least further to:
   determine at least some of the dependencies at least by querying the database to select one or more release activities, artifacts, code modules, or a combination thereof with the identifiers or the synonyms or by code scanning; and
   identify pertinent release activities, artifacts, code modules, or a combination thereof into one or more columns in a dependency data structure or in the database;
   index the dependency data structure or the database with one or more key columns that corresponding to the one or more columns for the pertinent release activities, artifacts, code modules, or a combination thereof.

27. The system of claim 23, wherein the program code includes further instructions that, when executed by the at least one microprocessor or processor core, cause the at least one processor or processor core at least further to:
   identify a plurality of tenants corresponding to the release;
   identify a plurality of artifacts, a plurality of code modules, or a combination of one or more artifacts of the plurality of artifacts and one or more code modules of the plurality of code modules;
   identify one or more issues or one or more states with one or more threshold limits; and
   classify the one or more issues or the one or more states into one or more types.

28. The system of claim 27, wherein the program code includes further instructions that, when executed by the at least one microprocessor or processor core, cause the at least one processor or processor core at least further to:
   track at least one type of the one or more types to generate and store at least some tracking records of the tracking records;
   execute one or more actions in response to the one or more issues or the one or more states based in part or in whole upon one or more criteria;
   monitor one or more branching version identifiers for the plurality of artifacts, the plurality of code modules, or the combination; and
   monitor one or more version identifiers for the one or more branching version identifiers.

29. The system of claim 28, wherein the program code includes further instructions that, when executed by the at least one microprocessor or processor core, cause the at least one processor or processor core at least further to:
 identify first information pertaining to an issue or a state of the one or more issues or the one or more states;
 identify or determining one or more dependency relations affecting or affected by the first information; and
 determine a priority level for the issue or the state based at least in part upon the one or more dependency relations.

30. The system of claim 29, wherein the program code includes further instructions that, when executed by the at least one microprocessor or processor core, cause the at least one processor or processor core at least further to:
 identify the plurality of artifacts, the plurality of code modules, or the combination one or more artifacts and one or more code modules corresponding to the one or more branching version identifiers;
track one or more states of the branching version identifiers, the plurality of artifacts, the plurality of code modules, or the combination one or more artifacts and one or more code modules for the issue or the state; and
identify a first set of one or more artifacts, one or more code modules, or a combination of at least one artifact and at least one code module based in part or in whole upon a triggering event.

* * * * *